US006897466B2

(12) United States Patent  
Teramae et al.

(10) Patent No.: US 6,897,466 B2  
(45) Date of Patent: May 24, 2005

(54) INSTRUMENT AND METHOD FOR MEASURING EJECTION VELOCITY OF LIQUID

(75) Inventors: Hirofumi Teramae, Nagano (JP); Satoru Hosono, Nagano (JP); Hironori Endo, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 10/198,081

(22) Filed: Jul. 19, 2002

(65) Prior Publication Data

US 2003/0071984 A1 Apr. 17, 2003

(30) Foreign Application Priority Data

| Jul. 19, 2001 | (JP) | P2001-219987 |
| Jul. 24, 2001 | (JP) | P2001-223148 |
| Aug. 2, 2001 | (JP) | P2001-235221 |
| Nov. 9, 2001 | (JP) | P2001-345157 |

(51) Int. Cl.⁷ .......................................... B41J 29/393
(52) U.S. Cl. .......................... 250/576; 347/19; 347/81; 347/74
(58) Field of Search ................................. 250/573, 574, 250/576; 347/19, 20, 74–81; 356/27, 28

(56) References Cited

U.S. PATENT DOCUMENTS

| 4,255,754 A | * | 3/1981 | Crean et al. ................... 347/81 |
| 4,509,057 A | * | 4/1985 | Sohl et al. ..................... 347/19 |
| 5,353,052 A | * | 10/1994 | Suzuki et al. .................. 347/19 |
| 5,621,524 A | * | 4/1997 | Mitani ........................ 356/338 |
| 5,631,675 A | * | 5/1997 | Futagawa ..................... 347/10 |
| 6,227,643 B1 | * | 5/2001 | Purcell et al. ................. 347/19 |
| 6,305,777 B1 | * | 10/2001 | Lee ............................. 347/19 |
| 6,624,434 B1 | * | 9/2003 | Shen et al. .................. 250/573 |
| 6,672,698 B1 | * | 1/2004 | Sugiyama .................... 347/19 |

FOREIGN PATENT DOCUMENTS

| JP | 4-191051 A | 7/1992 |
| JP | 09-094948 | 4/1997 |
| JP | 11-300944 A | 11/1999 |
| JP | 2000-85116 A | 3/2000 |
| JP | 2000-272134 A | 10/2000 |
| JP | 2001-38930 A | 2/2001 |

* cited by examiner

Primary Examiner—Thanh X. Luu  
Assistant Examiner—Stephen Yam  
(74) Attorney, Agent, or Firm—Sughrue Mion, PLLC

(57) ABSTRACT

In an apparatus for measuring an ejection velocity of a liquid droplet ejected from a nozzle orifice of a head device which is provided with a pressure chamber communicated with the nozzle orifice and an actuator which varies pressure of liquid contained in the pressure chamber, a driver generates a drive signal to drive the actuator to eject a liquid droplet from the nozzle orifice. A photo emitter emits a light beam so as to intersect a space through which the liquid droplet passes. A photo receiver receives the light beam which has been passed through the space. A calculator calculates an ejection velocity of the liquid droplet based on a timing at which the actuator is driven and a change in a photo-receiving state of the photo receiver.

27 Claims, 31 Drawing Sheets

INSTRUMENT AND METHOD FOR MEASURING EJECTION VELOCITY OF LIQUID

BACKGROUND OF THE INVENTION

The invention relates to an ejection velocity measuring device to be provided on a liquid jetting apparatus which comprises: a nozzle orifice; a pressure generating chamber which is in communication with the nozzle orifice and stores liquid therein; a liquid supply channel for supplying liquid to the pressure generating chamber; and a pressure generator for ejecting a liquid droplet from the nozzle orifice by changing the pressure of liquid stored in the pressure generating chamber.

Such a liquid jetting apparatus is used in various applications. For example, a head member for ejecting an ink droplet as a liquid droplet is used as a recording head of an ink jet recording apparatus for recording data on recording paper or the like.

In such a liquid jetting apparatus, measurement of velocity of a liquid droplet ejected from a nozzle orifice is effective for controlling ejection of a liquid droplet with enhanced accuracy.

However, there has not yet been embodied a device for measuring the velocity of a liquid droplet ejected from the nozzle orifice with sufficient accuracy and durability.

In relation to such a liquid jetting apparatus, modification of a drive signal for ejecting liquid on the basis of an actual ejection velocity of a liquid droplet is effective for controlling ejection of a liquid droplet with enhanced accuracy.

However, there has not yet been embodied a liquid jetting apparatus which corrects a drive signal for ejecting liquid on the basis of an actual ejection velocity of a liquid droplet in a more appropriate manner.

SUMMARY OF THE INVENTION

Accordingly, a first object of the invention is to provide an ejection velocity measuring device which measures the velocity of a liquid droplet ejected from a nozzle orifice with sufficient accuracy and durability.

A second object of the invention is to provide a liquid jetting apparatus capable of correcting a drive signal for ejecting liquid, on the basis of the ejection velocity of a liquid droplet and in an extremely easy manner.

In order to achieve the above objects, according to the present invention, there is provided an apparatus for measuring an ejection velocity of a liquid droplet ejected from a nozzle orifice of a head device which is provided with a pressure chamber communicated with the nozzle orifice and an actuator which varies pressure of liquid contained in the pressure chamber, the apparatus comprising:

a driver, which generates a drive signal to drive the actuator to eject a liquid droplet from the nozzle orifice;

a photo emitter, which emits a light beam so as to intersect a space through which the liquid droplet passes;

a photo receiver, which receives the light beam which has been passed through the space; and a calculator, which calculates an ejection velocity of the liquid droplet based on a timing at which the actuator is driven and a change in a photo-receiving state of the photo receiver.

By the configuration, the velocity of a liquid droplet is calculated on the basis of a status of light received by the photo receiver. Hence, the velocity of a liquid droplet can be measured with sufficient accuracy and sufficient durability.

Preferably, the change in the photo-receiving state is so configured that a reception of the light beam in the photo receiver is interrupted when the liquid droplets intersects the light beam.

Here, it is preferable that the photo receiver generates a pulse signal having a pulse width corresponding to a time period during which the reception of the light beam is interrupted.

In this case, it is preferable that the calculator calculates the ejection velocity based on the timing at which the actuator is driven and a timing of an initial edge of the pulse signal.

Alternatively, the calculator calculates the ejection velocity based on the timing at which the actuator is driven and a timing of a center portion the pulse width.

Preferably, the apparatus further comprises a position adjuster, which adjusts a distance between the nozzle orifice and the light beam.

Here, it is preferable that the position adjuster provides a first distance and a second distance. The driver drives the actuator each of when the first distance is provided and when the second distance is provided. The calculator calculates the ejection velocity based on a change in a photo-receiving state of the photo receiver when the first distance is provided and a change in a photo-receiving state of the photo receiver when the second distance is provided.

In such a configuration, even when a timing at which a liquid droplet is to be ejected cannot be ascertained accurately, the velocity of a liquid droplet can be measured with sufficient accuracy and durability.

Preferably, the apparatus further comprises a shutter disposed between the photo emitter and the space to prevent liquid mist from going to the photo emitter. In this case, there can be prevented adhesion of ink mist to the photo emitter or the photo receiver.

Preferably, the photo emitter has high directivity and is easy to converge a light beam, such as a semiconductor laser.

Preferably, the photo receiver has superior high-speed response; for example, a photo-diode.

Preferably, the photo emitter includes a first photo emitter, which emits a first light beam so as to intersect a first space which is away from the nozzle orifice at a first distance, and a second photo emitter, which emits a second light beam so as to intersect a second space which is away from the nozzle orifice at a second distance. The photo receiver includes a first photo receiver, which receives the first light beam which has been passed through the first space, and a second photo receiver, which receives the second light beam which has been passed through the second space. The calculator calculates the ejection velocity based on a change in a photo-receiving state of the first photo receiver and a change in a photo-receiving state of the second photo receiver.

In such a configuration, the velocity of a liquid droplet is derived on the basis of the status of light received by the first photo receiver and the status of light received by the second photo receiver. Even when a timing at which a liquid droplet is to be ejected cannot be ascertained accurately, the velocity of a liquid droplet can be measured with sufficient accuracy and durability.

Preferably, the liquid is ink containing a coloring material.

Preferably, the calculator calculates the ejection velocity based on the pulse width of the pulse signal.

In this case, the velocity of a liquid droplet is calculated by measuring the width of a pulse waveform stemming from passage of the liquid droplet through a light beam, the velocity of the liquid droplet can be measured accurately within a considerably short period of time.

Here, It is preferable that the calculator calculates the ejection velocity based on a pulse signal having the largest pulse width among pulse signals obtained within a predetermined time period. In this case, the influence of so-called satellite droplets can be eliminated.

Preferably, the driver generates a plurality of drive signals so as to eject a liquid droplet under a plurality of conditions. The calculator calculates the ejection velocity with respect to each of the conditions.

In such a configuration, a natural period of liquid stored in the pressure generating chamber can be derived on the basis of a mutual relationship between a plurality of types of drive signals and the obtained velocity of a liquid droplet.

Here, it is preferable that each of the drive signals has a first waveform element which decompresses the pressure chamber, a second waveform element which holds a decompressed state of the pressure chamber, and a third waveform element which compress the pressure chamber. The plurality of conditions are defined by varying a duration of the second waveform element.

Preferably, the apparatus further comprises a signal corrector which corrects the drive signal based on the ejection velocity calculated by the calculator.

Here, it is preferable that the drive signal includes a first drive signal which is used to calculate the ejection velocity and a second drive signal which is adjustable by the signal corrector.

In such a configuration, the second drive signal is corrected on the basis of the velocity of the liquid droplet obtained by the first drive signal. Hence, more preferably correction of the drive signal becomes possible.

Further, it is preferable that the head device is provided with a plurality of nozzle orifices. The calculator calculates the ejection velocity with respect to each of the nozzle orifices. The signal corrector corrects the drive signal with respect to each of the nozzle orifices.

Alternatively, it is preferable that the head device is provided with a plurality of nozzle rows each including a plurality of nozzle orifices. The calculator calculates the ejection velocity with respect to each of the nozzle rows. The signal corrector corrects the drive signal with respect to each of the nozzle rows.

In general, for reasons of manufacture of a head device, liquid droplet ejection characteristics of respective nozzle rows tend to coincide with each other. Accordingly, correcting the liquid jetting drive signal on a per-nozzle-row basis is effective for controlling ejection of a liquid droplet more readily. For example, nozzle orifices forming an identical nozzle row eject an identical kind of liquid, or nozzle orifices forming an identical nozzle row eject an identical color of ink.

Preferably, the apparatus further comprises:
a support, which supports a target member onto which the liquid drop is landed; and
a mechanism, which reciprocally moves the head device with respect to the target member, in a first direction and a second direction opposite to the first direction.

Here, the signal corrector separately corrects the drive signal used in the movement of the head device in the first direction and the drive signal used in the movement of the head device in the second direction.

In this case, the landing position can be adjusted in both directions with respect to a scanning direction with extremely high precision.

Preferably, the apparatus further comprises a mechanism, which reciprocally moves the head device in a first direction and a second direction opposite to the first direction.

Here, the head device is provided with a plurality of nozzle rows each including a plurality of nozzle orifices. The nozzle orifices are divided into a plurality of groups, each including nozzle orifices which are periodically selected from every n nozzles (n is an integer not less than 2) among all the nozzle orifices in nozzle rows which are periodically selected from m nozzle rows (m is an integer not less than 2) among all the nozzle orifice rows. The calculator calculates the ejection velocity of the nozzle orifices belonging to one of the groups, every time when the head device is once moved in either the first direction or the second direction Preferably, the photo emitter includes: a light emitter, which emits the light beam; a condenser, which converges the light beam; and a shade, which shades a periphery of a cross section of the light beam.

In this case, the beam size can be made more uniform with respect to the direction of trajectory by the condenser and the shade. If the beam size is substantially uniform, a wider range of trajectory of the light can be utilized for deriving the velocity of a liquid droplet under substantially uniform conditions.

Preferably, the photo receiver includes: a photo receiving element, which receives the light beam; and a condenser, which converges the light beam onto the photo receiving element.

In this case, even if misalignment has arisen between the light trajectory and the photo receiver, the light receiving function of the light receiving element can be maintained.

According to the present invention, there is also provided a method of measuring an ejection velocity of a liquid droplet ejected from a nozzle orifice of a head device, comprising the steps of:

providing a head device provided with a pressure chamber communicated with a nozzle orifice and an actuator which varies pressure of liquid contained in the pressure chamber;

providing a first photo emitter and a first photo receiver;

emitting a first light beam from the first photo emitter so as to intersect a first space between the first photo emitter and the first photo receiver;

receiving the first light beam which has been passed through the first space by the first photo receiver;

generating a drive signal to drive the actuator to eject a liquid droplet from the nozzle orifice; and calculating an ejection velocity of the liquid droplet based on a timing at which the actuator is driven and a change in a photo-receiving state of the first photo receiver caused by the ejected liquid droplet passes through the first light beam.

Preferably, the method further comprises the step of generating a pulse signal having a pulse width corresponding to a time period during which the change in the photo-receiving state is occurred.

Here, it is preferable that the ejection velocity is calculated based on the timing at which the actuator is driven and a timing of an initial edge of the pulse signal.

Alternatively, it is preferable that the ejection velocity is calculated based on the timing at which the actuator is driven and a timing of a center portion of the pulse width.

Preferably, the method further comprises the steps of positioning the head device such that a distance between the nozzle orifice and the first light beam becomes a first distance and a second distance. Here, the drive signal is generated both of when the distance is the first distance and when the distance is the second distance. The ejection velocity is calculated both of when the distance is the first distance and when the distance is the second distance.

Preferably, the method further comprises the steps of:

providing a second photo emitter and a second photo receiver;

emitting a second light beam from the second photo emitter so as to intersect a second space between the second photo emitter and the second photo receiver; and receiving the second light beam which has been passed through the second space by the second photo receiver.

Here, the ejection velocity is calculated further based on a timing at which the actuator is driven and a change in a photo-receiving state of the second photo receiver caused by the ejected liquid droplet passes through the second light beam.

Preferably, the ejection velocity is calculated based on the pulse width of the pulse signal.

Here, it is preferable that the method further comprises the step of selecting one pulse signal having the largest pulse width among pulse signals obtained within a predetermined time period. The ejection velocity is calculated based on the largest pulse width.

Preferably, a plurality of drive signals so as to eject a liquid droplet under a plurality of conditions. The ejection velocity is calculated with respect to each of the conditions.

Here, each of the drive signals has a first waveform element which decompresses the pressure chamber, a second waveform element which holds a decompressed state of the pressure chamber, and a third waveform element which compress the pressure chamber. The plurality of conditions are defined by varying a duration of the second waveform element.

Preferably, the method further comprises the step of correcting the drive signal based on the calculated ejection velocity.

Here, it is preferable that the head device is provided with a plurality of nozzle orifices. The ejection velocity is calculated with respect to each of the nozzle orifices. The drive signal is corrected with respect to each of the nozzle orifices.

Alternatively, it is preferable that the head device is provided with a plurality of nozzle rows each including a plurality of nozzle orifices. The ejection velocity is calculated with respect to each of the nozzle rows. The drive signal is corrected with respect to each of the nozzle rows.

Further, it is preferable that the method further comprises the step of moving the head device reciprocally in a first direction and a second direction opposite to the first direction. The drive signal used in the movement of the head device in the first direction and the drive signal used in the movement of the head device in the second direction are separately corrected.

Further, it is preferable that the method further comprises the steps of:

providing a head device is provided with a plurality of nozzle rows each including a plurality of nozzle orifices;

dividing the nozzle orifices into a plurality of groups, each including nozzle orifices which are periodically selected from every n nozzles (n is an integer not less than 2) among all the nozzle orifices in nozzle rows which are periodically selected from m nozzle rows (m is an integer not less than 2) among all the nozzle orifice rows; and moving the head device reciprocally in a first direction and a second direction opposite to the first direction.

Here, the ejection velocity of the nozzle orifices belonging to one of the groups is calculated every time when the head device is once moved in either the first direction or the second direction.

DETAILED DESCRIPTION OF THE PREFERRED EMBODIMENTS

Embodiments of the invention will be described hereinbelow by reference to the drawings.

Figure 1:
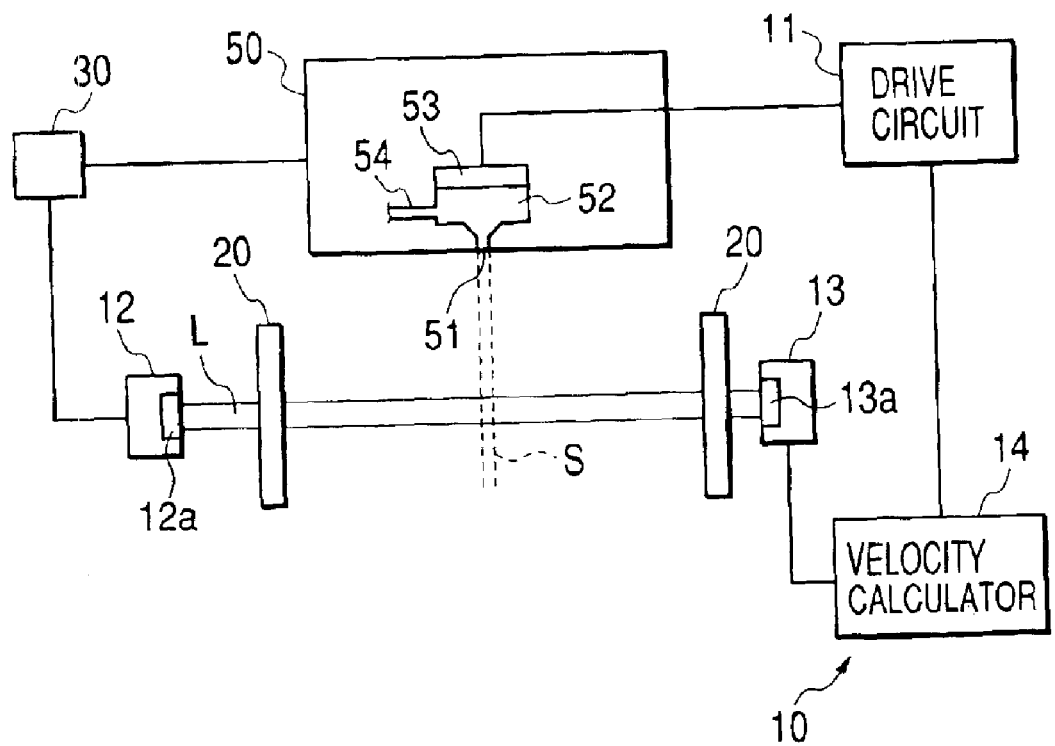
FIG. 1 is a schematic block diagram showing an ejection velocity measuring device according to a first embodiment of the invention.

As shown in FIG. 1, an ejection velocity measuring device 10 according to a first embodiment of the invention is provided for a head member 50.

The head member 50 comprises nozzle orifice 51; a pressure generating chamber 52 which is in communication with the nozzle orifice 51 and stores liquid therein; a liquid supply channel 54 for supplying liquid to the pressure generating chamber 52; and a pressure generator 53 which ejects a liquid droplet from the nozzle orifice 51 by changing the pressure of the liquid stored in the pressure generating chamber 52. Here, the pressure generator 53 is a piezoelectric vibrator. The pressure generator 53 may be constituted of a heater or the like. For example, a liquid droplet is an ink droplet including coloring material for drawing an image on recording paper.

The ejection velocity measuring device 10 comprises a drive circuit 11 for driving the pressure generator 53; a light emitter 12 for emitting light along a trajectory L (hereinafter called a "optical path") crossing a passage space S through which a liquid droplet passes (hereinafter referred to as a "liquid droplet passage space S"); a light receiver 13 for receiving the light that has crossed the liquid droplet passage space S; and a velocity calculator 14 which calculates the velocity of a liquid droplet to be ejected from the nozzle orifice 51 on the basis of a timing at which the pressure generator 53 is actuated by the drive circuit 11 and the state of the light received by the light receiver 13.

Specifically, the light emitter 12 has a semiconductor laser 12a, and the light receiver 13 has a photodiode 13a. The light emitted from the semiconductor laser 12a is received by the photodiode 13a after crossing the liquid droplet passage space S.

In the embodiment, the light trajectory L, the liquid droplet passage space S, and the light receiver 13 are arranged such that light is interrupted by the light receiver 13.

The light receiver 13 outputs a pulse waveform P (see FIG. 3) having a width corresponding to a time period of interruption of an operation for receiving light by photoelectric conversion processing performed by the photodiode 13a.

In the embodiment, at least one shielding plate 20 is interposed between the light emitter 12 and the liquid droplet passage space S and between the light receiver 13 and the liquid droplet passage space S. An opening for the light trajectory L is provided in each of the shielding plates 20.

Figure 2:
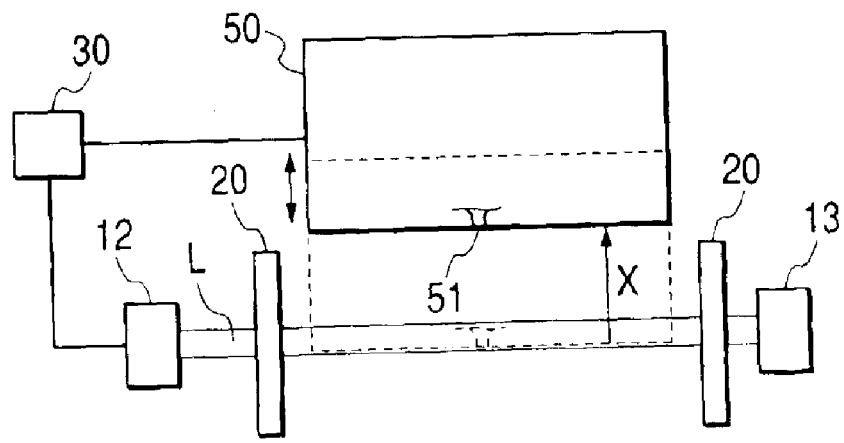
FIG. 2 is a view showing a position adjuster for adjusting a distance between a head member and an optical path in the ejection velocity measuring device shown in FIG. 1.

As shown in FIG. 2, in the embodiment, a high-precision position adjuster 30 is provided for adjusting a distance between the position of the nozzle orifice 51 of the head member 50 and the trajectory L of light originating from the light emitter 12. In this case, the surface of the head member 50 having the nozzle orifice 51 formed therein is made in parallel with the light trajectory L. The position adjuster 30 highly accurately actuates the side having the nozzle orifice 51 formed therein, in the direction perpendicular to the light trajectory L.

When the light trajectory L is interrupted by the head member 50 (indicated by dashed lines shown in FIG. 2) as a result of relative actuation of the head member 50 by the position adjuster 30, the surface having the nozzle orifice 51 formed therein can be admitted to coincide with the light trajectory L. Subsequently, the surface having the nozzle orifice 51 formed therein and the light trajectory L can be positioned so as to become spaced apart by predetermined interval "x" by the position adjuster 30.

Figure 3:
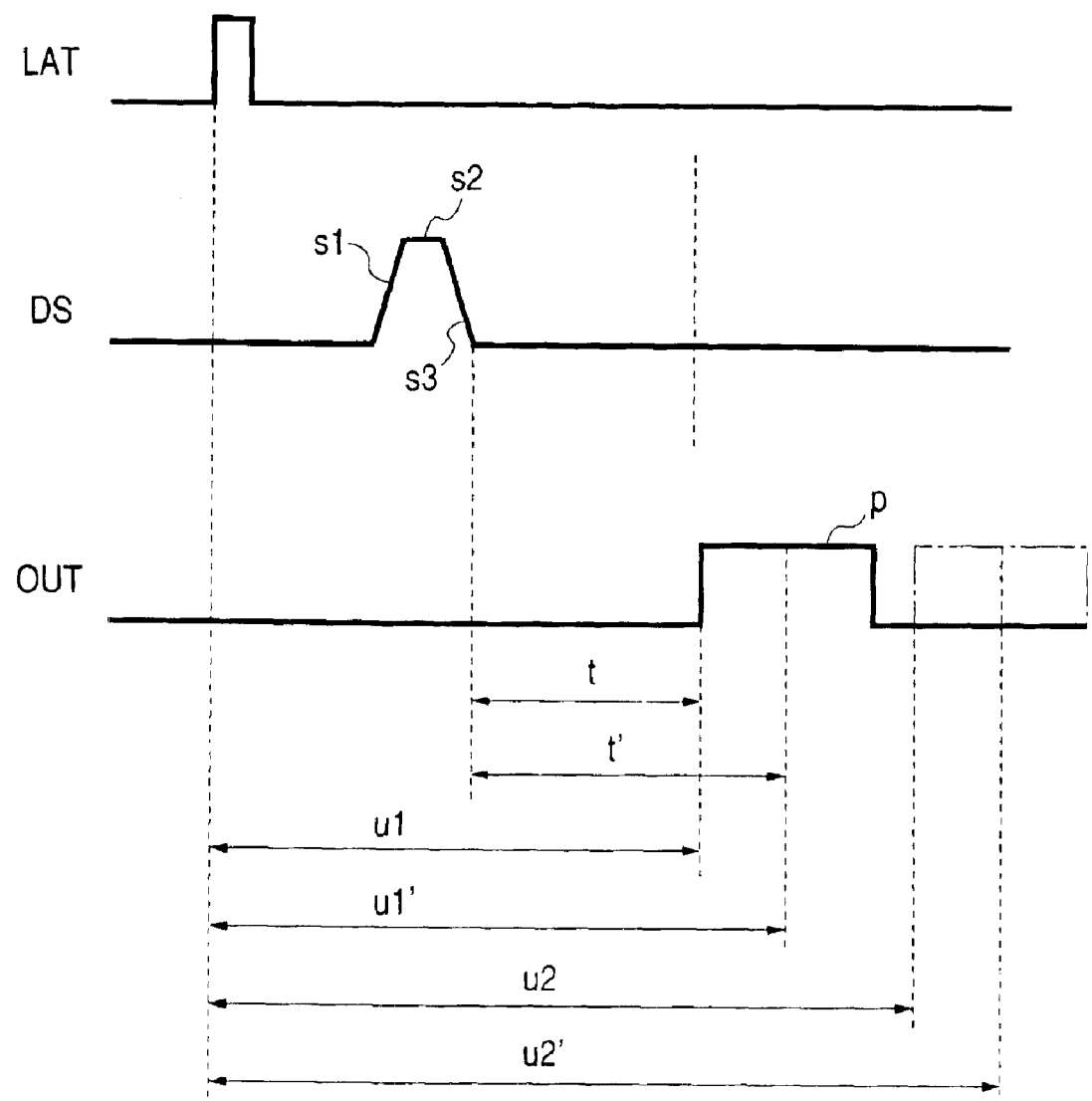
FIG. 3 is a view showing one specific example of a latch signal, that of a common drive signal, and that of an output pulse waveform produced in the ejection velocity measuring device shown in FIG. 1.

As shown in FIG. 3, the drive circuit 11 of the embodiment renders beforehand, in an enable state, a common drive signal DS for driving a piezoelectric vibrator serving as the pressure generator 53. A latch signal LAT is taken as a trigger, as required, and the common drive signal DS is sent to the pressure generator 53.

In this case, the common drive signal DS comprises a first gradient voltage section s1 for supplying, to a piezoelectric vibrator, a gradient voltage for expanding the pressure generating chamber 52 to decompress therein; a first voltage holding section s2 for supplying a voltage, to the piezoelectric vibrator, which maintains a decompressed state; a second gradient voltage section s3 for supplying, to the piezoelectric vibrator, a gradient voltage for contracting the pressure generating chamber 52 to compress therein and restore an original state.

Figure 4:
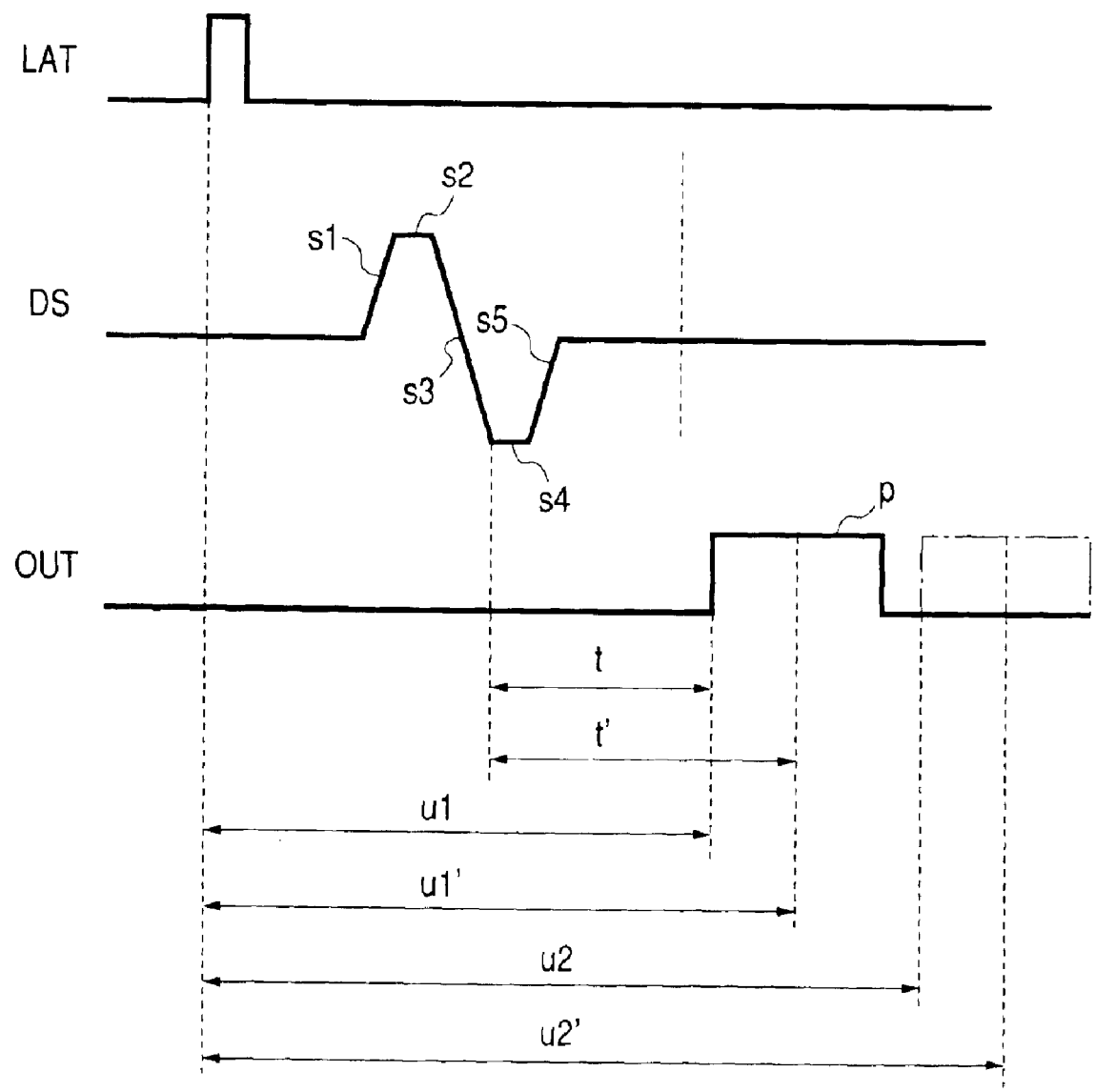
FIG. 4 is a view showing another specific example of a latch signal, that of a common drive signal, and that of an output pulse waveform produced in the ejection velocity measuring device shown in FIG. 1.

Alternatively, as shown in FIG. 4, the common drive signal DS comprises a first gradient voltage section s1 for supplying, to a piezoelectric vibrator, a gradient voltage for expanding the pressure generating chamber 52 to decompress therein; a first voltage holding section s2 for supplying a voltage, to the piezoelectric vibrator, which maintains a decompressed state; a second gradient voltage section s3 for supplying, to the piezoelectric vibrator, a gradient voltage for contracting the pressure generating chamber 52 to compress therein; a second voltage holding section s4 for supplying, to the piezoelectric vibrator, a voltage which maintains the compressed state; and a third gradient voltage section s5 for supplying, to a piezoelectric vibrator, a gradient voltage which causes the pressure generating chamber 52 to restore an original state.

When the pressure generator 53 is driven by the common drive signal DS, a liquid droplet are ejected from the nozzle orifice 51. More accurately, a liquid droplet is ejected in the vicinity of a timing at which the second gradient voltage section s3 is finished (a timing at which there is effected switching from the second gradient voltage section s3 to the second voltage holding section s4 in the case shown in FIG. 4).

The velocity calculator 14 derives the velocity of a liquid droplet to be ejected from the nozzle orifice 51 from a timing at which the drive circuit 11 activates the pressure generator 53 and a timing of leading edge of the pulse waveform. On the basis of a time "t" from a timing at which the second gradient voltage s3 ends (i.e., a timing at which switching from the second gradient voltage section s3 to the second voltage holding section s4 is effected) to a timing at which the pulse waveform P of the light receiver 13 rises and of a distance "x" between the nozzle orifice 51 to the light trajectory L, x/t is derived as the velocity of a liquid droplet.

The operation of the velocity measuring device will now be described.

As mentioned above, the state in which the light trajectory L is interrupted by the head member 50 (i.e., the state designated by dashed lines shown in FIG. 2) as a result of relative actuation of the head member 50 being performed by the position adjuster 30 is admitted such that a distance between the surface having the nozzle orifice 51 formed therein and the light trajectory L is zero. Thus, zero adjustment is performed. Subsequently, the surface having the nozzle orifice 51 formed therein and the light trajectory L is positioned at a predetermined interval "x" with high accuracy by the position adjuster 30.

Light which is to pass through the liquid droplet passage space S is emitted from the light emitter 12. The light is continuously received by the light receiver 13.

In this state, the drive circuit 11 sends the common drive signal DS to the pressure generator 53 while an appropriate latch signal LAT is taken as a trigger. As a result, the pressure generator 53 changes the pressure of liquid stored in the pressure generating chamber 52, thereby ejecting a liquid droplet from the nozzle orifice 51.

The thus-ejected a liquid droplet interrupts light while passing through the liquid droplet passage space S. As a result, receipt of light performed by the light receiver 13 is interrupted, and the light receiver 13 outputs a pulse waveform P having a width corresponding to an interruption duration.

The velocity calculator 14 derives x/t as the velocity of a droplet on the basis of a time "t" from a timing at which the second gradient voltage s3 ends (a timing at which there is effected switching from the second gradient voltage section s3 to the second voltage holding section s4 in the case shown in FIG. 4) to a timing at which a pulse waveform P rises, and a distance "x" between the nozzle orifice 51 to the light trajectory L.

As mentioned above, according to the embodiment, the velocity of a droplet is derived on the basis of the state of light received by the light receiver 13. Hence, the velocity of liquid droplet can be measured with sufficiently high precision and sufficient durability.

In the embodiment, receipt of light performed by the light receiver is interrupted for a period during which a liquid droplet passes through the liquid droplet passage space S. A determination is readily made as to whether or not a droplet is passing across the light trajectory L.

The shielding plates 20 are interposed between the light emitter 13 and the liquid droplet passage space S and between the light receiver 14 and the liquid droplet passage space S, so that adhesion of liquid mist onto the light emitter 12 or the light receiver 13 can be avoided.

In the embodiment, the velocity calculator 14 calculates the velocity of a liquid droplet with use of a time "t" from a timing at which the second gradient voltage s3 ends (a timing at which there is effected switching from the second gradient voltage section s3 to the second voltage holding section s4 in the case shown in FIG. 4) to a timing at which a pulse waveform P rises. However, when high-precision positioning of the optical axis of the light trajectory L is possible, the velocity of a liquid droplet is preferably derived by use of a time t' (see FIGS. 3 and 4) from a timing at which the second gradient voltage s3 ends (a timing at which there is effected switching from the second gradient voltage section s3 to the second voltage holding section s4 in the case shown in FIG. 4) to the center of a pulse waveform P of the light receiver 13.

In the embodiment, the timing at which a liquid droplet is to be ejected is taken as a timing at which the second gradient voltage s3 ends (a timing at which there is effected switching from the second gradient voltage section s3 to the second voltage holding section s4 in the case shown in FIG. 4). However, an actual timing at which a liquid droplet is to be ejected may slightly deviate from such a timing.

For this reason, by reference to FIG. 5, there will now be described a second embodiment of the invention particularly taking into consideration of such a case.

Figure 5:
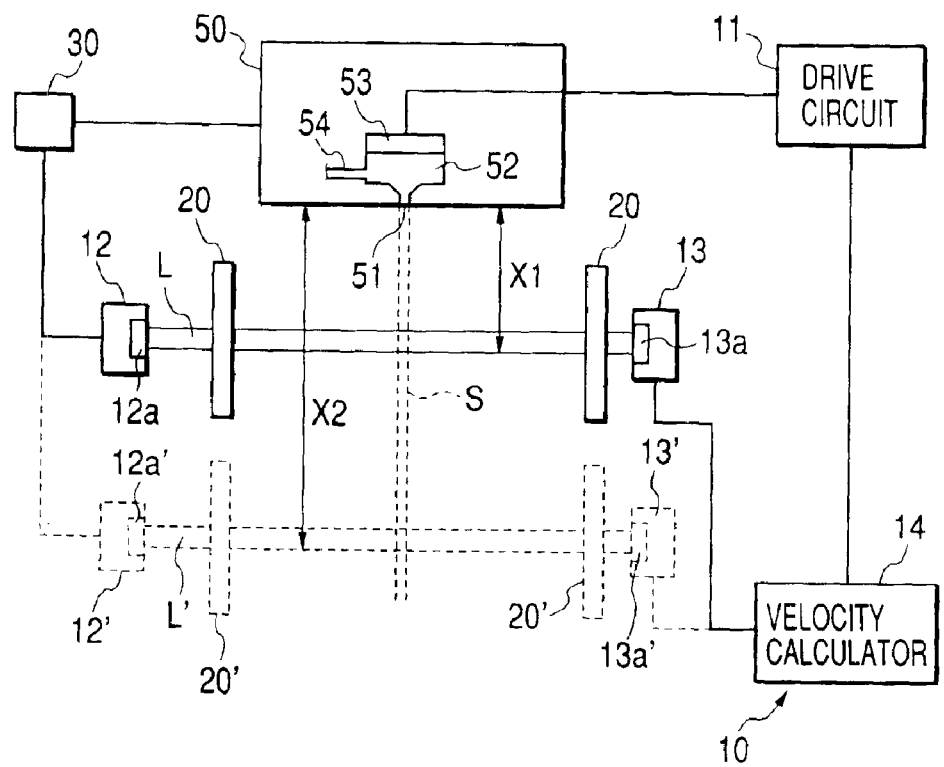
FIG. 5 is a schematic block diagram showing an ejection velocity measuring device according to a second embodiment of the invention.

A position adjuster 30 of the embodiment shown in FIG. 5 is arranged so as to enable at least two ways of setting of a distance between the position of the nozzle orifice 51 of the head member 50 and the trajectory L of light originating from the light emitter 12. On the basis of the state of light received by the light receiver 13 according to the two ways of setting, the velocity calculator derives the velocity of a liquid droplet ejected from the nozzle orifice 51.

As shown in FIG. 5, the distance between the position of the nozzle orifice 51 and the trajectory L of the light originating from the light emitter 12 is assumed to be set to x1 and x2. In connection with the setting of distance x1, the velocity calculator 14 calculates a time period u1 from a timing at which the latch signal LAT is supplied to a timing at which the pulse waveform P of the light receiver 13 rises or another time period u1' from a timing at which the latch signal LAT is supplied to a timing of center of the pulse waveform P of the light receiver 13 (see FIGS. 3 and 4).

In connection with setting of distance x2, the velocity calculator 14 calculates a time period u2 from a timing at which the latch signal LAT is supplied to a timing at which the pulse waveform P of the light receiver 13 rises, or another time period u2' from a timing at which the latch signal LAT is supplied to a timing of center of the pulse waveform P of the light receiver 13 (see FIGS. 3 and 4).

The velocity calculator derives (x1-x2)/(u1-u2) or (x1-x2)/(u1'-u2') as the velocity of a liquid droplet.

In other respects, the ejection velocity measuring device of the embodiment is substantially identical in configuration with that of the first embodiment which has been described by reference to FIGS. 1 through 4. In the embodiment, those elements which are the same as those described in connection with the first embodiment are assigned the same reference numerals, and their detailed explanations are omitted.

According to the embodiment, the velocity of a liquid droplet can be measured with considerably enhanced accuracy regardless of a timing at which an actual liquid droplet is ejected.

Figure 6:
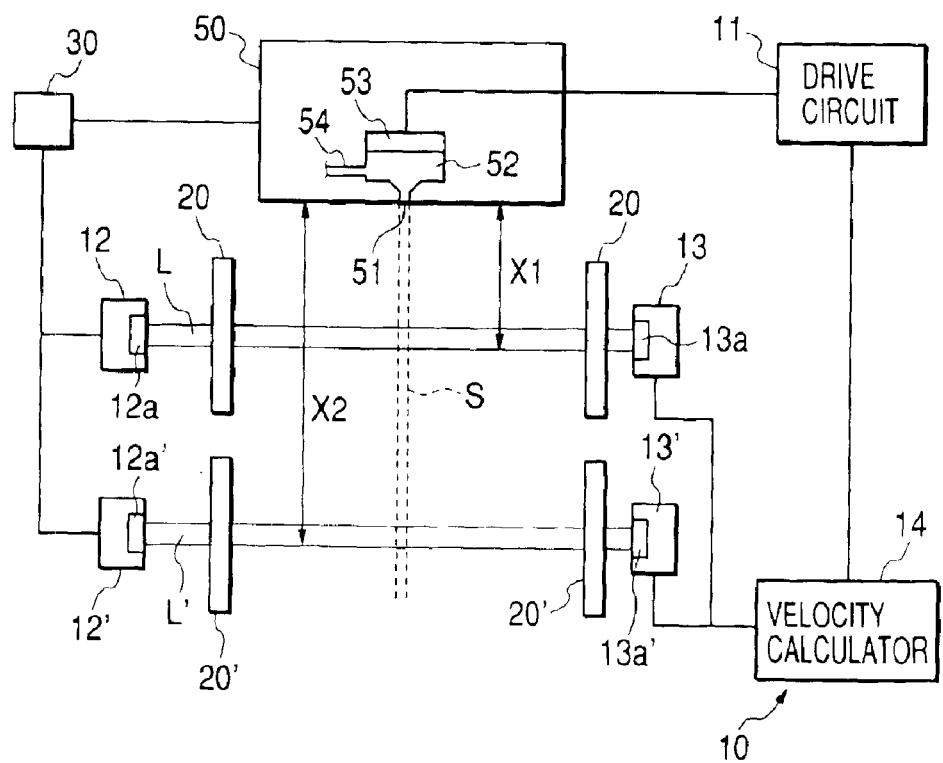
FIG. 6 is a schematic block diagram showing an ejection velocity measuring device according to a third embodiment of the invention.

In place of the distance between the position of the nozzle orifice 51 and the trajectory L of the light originating from the light emitter 12 being set in two ways, two trajectories of light may be prepared beforehand. Such a configuration will now be shown in FIG. 6 as a third embodiment.

The ejection velocity measuring device 10 of the embodiment further comprises: a second light emitter 12' for emitting light on a second trajectory L' which crosses the liquid droplet passage space S; and a second light receiver 13' for receiving light of second trajectory L' crossing the liquid droplet passage space S.

More specifically, the second light emitter 12' also has a semiconductor laser 12a', and the second light receiver 13' also has a photodiode 13a'. The light emitted from the semiconductor laser 12a' is received by the photodiode 13a' while crossing the liquid droplet passage space S.

The layout of a second trajectory L' of light (hereinafter called a "second light trajectory"), the liquid droplet passage space S, and the second light receiver 13' is adjusted such that receipt of light performed by the second light receiver 13' is interrupted while a liquid droplet is passing through the liquid droplet passage space S.

In the embodiment, at least one shielding plates 20' is interposed between the second light emitter 12' and the liquid droplet passage space S and between the second light receiver 13' and the liquid droplet passage space S. An opening for the second light trajectory L' is provided in each of the shielding plates 20'.

On the basis of the state of the light received by the (first) light receiver 13 and the state of the light received by the second light receiver 13', the velocity calculator 14 derives the velocity of a liquid droplet ejected from the nozzle orifice 51.

In the embodiment, the distance between the position of the nozzle orifice 51 and the (first) trajectory L of the light originating from the light emitter 12 is assumed to be x1 and the distance between the position of the nozzle orifice 51 and the (second) trajectory L' of the light originating from the light emitter 12' is assumed to be x2.

In other respects, the ejection velocity measuring device of the embodiment is substantially identical in configuration with that of the first embodiment which has been described by reference to FIGS. 1 through 4. In the embodiment, those elements which are the same as those described in connection with the first embodiment are assigned the same reference numerals, and their detailed explanations are omitted.

According to the embodiment, the velocity calculator calculates a time period u1 from a timing at which the latch signal LAT is supplied to a timing at which the pulse waveform P of the light receiver 13 rises, or another time period u1' from a timing at which the latch signal LAT is supplied to a timing of center of the pulse waveform P of the light receiver 13 (see FIGS. 3 and 4).

The velocity calculator calculates a time period u2 from a timing at which the latch signal LAT is supplied to a timing at which the pulse waveform P of the light receiver 13 rises, or another time period u2' from a timing at which the latch signal LAT is supplied to a timing of center of the pulse waveform P of the light receiver 13 (see FIGS. 3 and 4).

The velocity calculator derives (x1-x2)/(u1-u2) or (x1-x2)/(u1'-u2') as the velocity of a liquid droplet.

According to the embodiment, as well as the second embodiment, the velocity of a liquid droplet can be measured with considerably enhanced accuracy regardless of a timing at which an actual liquid droplet is ejected.

Alternatively, with use of an expression calibrated by any method or a corresponding table, the velocity calculator 14 may derive the ejection velocity of a liquid droplet on the basis of a time "u" from a timing at which a latch signal LAT is to be supplied to a timing at which the pulse waveform P of the light receiver 13 rises, or a time "u'" from a timing at which the latch signal LAT is to be supplied to a timing of center of the pulse waveform P of the light receiver 13.

In other respects, the ejection velocity measuring device of the embodiment is substantially identical in configuration with that of the first embodiment which has been described by reference to FIGS. 1 through 4. In the embodiment, those elements which are the same as those described in connection with the first embodiment are assigned the same reference numerals, and their detailed explanations are omitted.

In the embodiment, the ejection velocity of a droplet is derived on the basis of the ejection velocity of a liquid droplet on the basis of a time "u" from a timing at which a latch signal LAT is to be supplied to a timing at which the pulse waveform P of the light receiver 13 rises, or a time "u'" from a timing at which the latch signal LAT is to be supplied to a timing of center of the pulse waveform P of the light receiver 13. However, the ejection velocity of a liquid droplet may be derived on the basis of the width "w" of the pulse waveform P (see FIGS. 3 and 4). Such a configuration of the ejection velocity measuring device is shown in FIG. 7 as a fourth embodiment.

Figure 7:
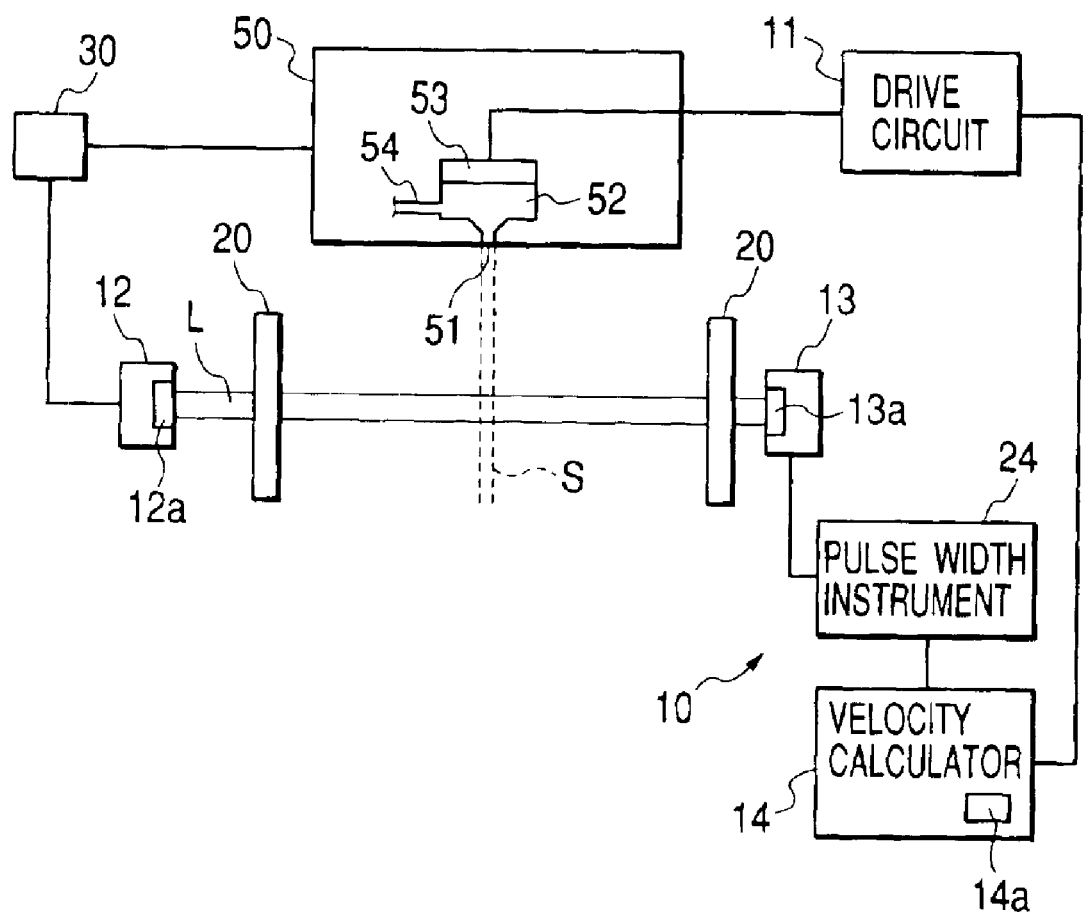
FIG. 7 is a schematic block diagram showing an ejection velocity measuring device according to a fourth embodiment of the invention.

As shown in FIG. 7, a pulse width instrument 24 connected to the light receiver 13 measures the width "w" of the pulse waveform P from a leading edge to a trailing edge thereof.

On the basis of the width "w" of the pulse waveform P measured by the pulse width instrument 24, the velocity calculator 14 derives the velocity of each liquid droplet ejected from the nozzle orifice 51. Here, the width "w" of the pulse waveform corresponds to a period during which the light trajectory L is interrupted by the liquid droplet. In other words, the calculation utilizes the fact that the width of a pulse waveform depends on the velocity of a liquid droplet. More specifically, the velocity of a liquid droplet corresponding to the width "w" of the pulse waveform is determined by use of an expression or corresponding table stored in a storage 14a provided in the velocity calculator 14. A distance "x" between the nozzle orifice 51 and the light trajectory L is used as a parameter, as required.

In the embodiment, the velocity of a liquid droplet is measured by measuring the width "w" of the pulse waveform P arising as a result of a liquid droplet passing across the light trajectory L. Hence, the velocity of a liquid droplet can be measured accurately within an extremely short period of time.

In other respects, the ejection velocity measuring device of the embodiment is substantially identical in configuration with that of the first embodiment which has been described by reference to FIGS. 1 through 4. In the embodiment, those elements which are the same as those described in connection with the first embodiment are assigned the same reference numerals, and their detailed explanations are omitted.

The foregoing embodiment describes a case where a single pulse waveform P is produced as a result of the liquid droplet, which is ejected from the nozzle orifice 51 by the drive signal DS, passing across the light trajectory L.

However, there may be a case where the liquid droplet ejected from the nozzle orifice according to each of the drive signals DS entails a so-called satellite droplet in addition to a main droplet. In such a case, the light receiver 13 produces a plurality of pulse waveforms in response to respective drive signals DS.

By reference to FIGS. 10 through 12, there will be described a fifth embodiment of the invention that copes with such a case.

Figure 10:
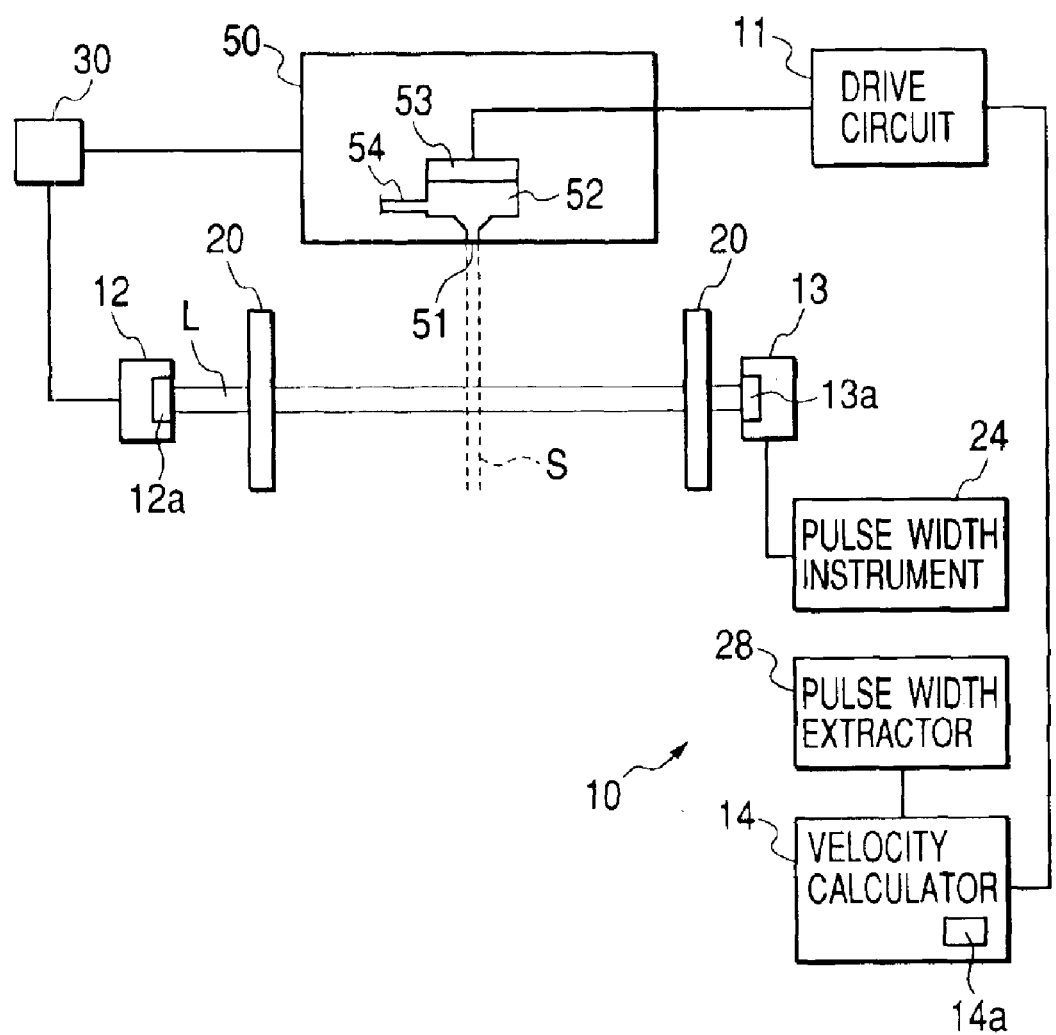
FIG. 10 is a schematic block diagram showing an ejection velocity measuring device according to a fifth embodiment of the invention.

As shown in FIG. 10, an ejection velocity measuring device 10 of the embodiment comprises a pulse width extractor 28 which is interposed between the pulse width instrument 24 and the velocity calculator 14 and extracts a width $w_{max}$ of the maximum pulse waveform for each drive signal. On the basis of the width $w_{max}$ of the maximum pulse waveform, the velocity calculator 14 of the embodiment derives the velocity of a liquid droplet to be ejected from the nozzle orifice 51.

Figure 8:
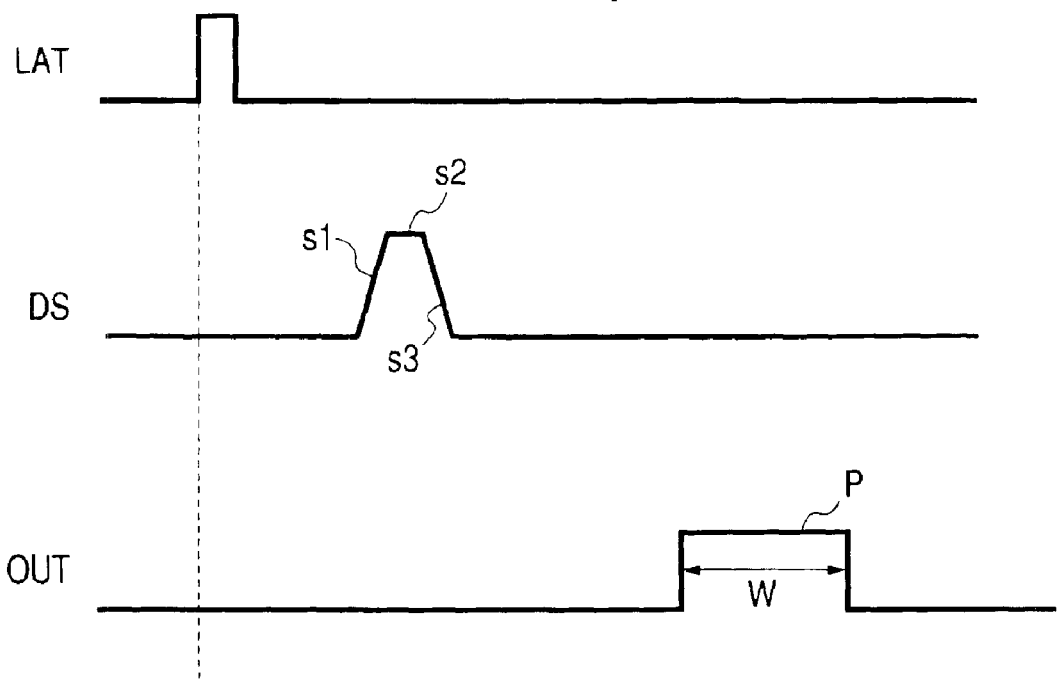
FIG. 8 is a view showing one specific example of a latch signal, that of a common drive signal, and that of an output pulse waveform produced in the ejection velocity measuring device shown in FIG. 7.
Figure 9:
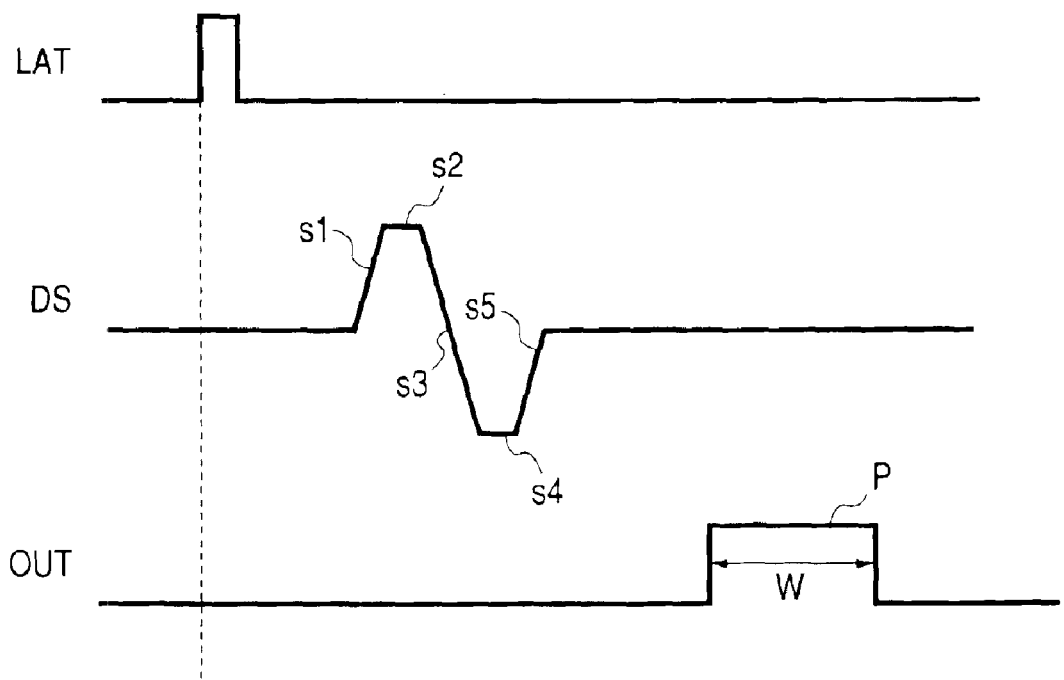
FIG. 9 is a view showing another specific example of a latch signal, that of a common drive signal, and that of an output pulse waveform produced in the ejection velocity measuring device shown in FIG. 7.
Figure 11:
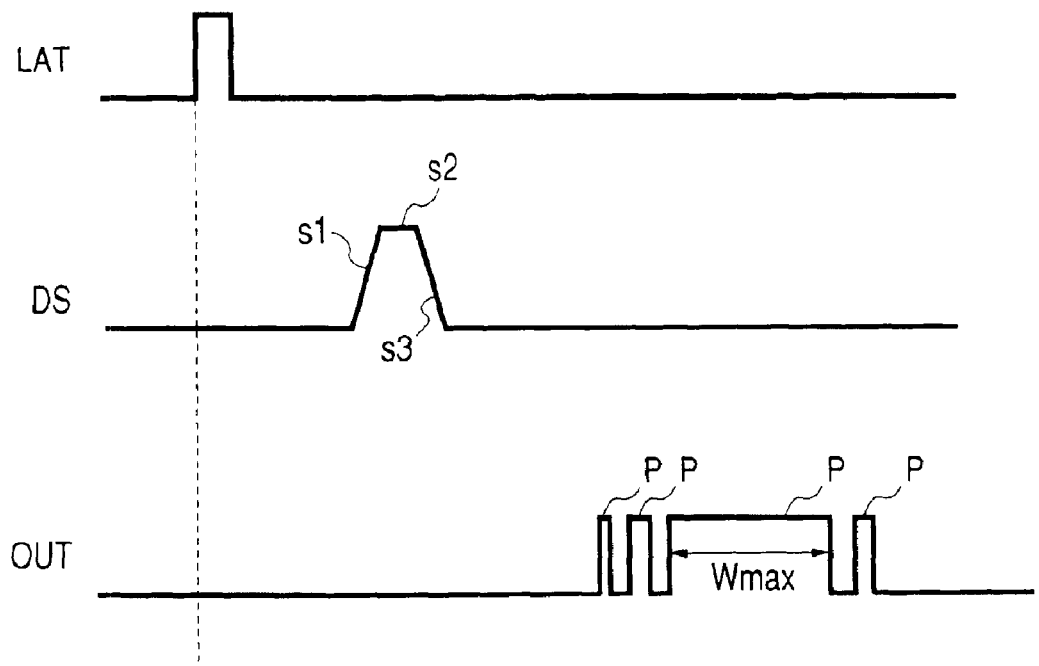
FIG. 11 is a view showing one specific example of a latch signal, that of a common drive signal, and that of an output pulse waveform produced in the ejection velocity measuring device shown in FIG. 10.
Figure 12:
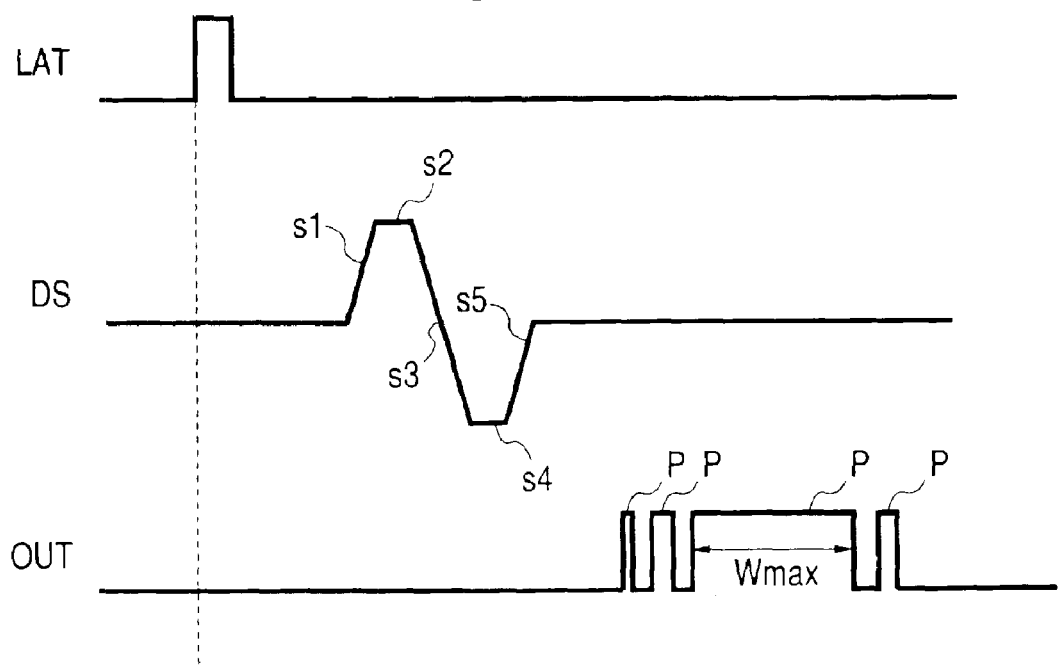
FIG. 12 is a view showing another specific example of a latch signal, that of a common drive signal, and that of an output pulse waveform produced in the ejection velocity measuring device shown in FIG. 10.

As shown in FIGS. 11 and 12 corresponding to FIGS. 8 and 9, according to the embodiment, even when a plurality of pulse waveforms P are produced as a result of presence of a satellite droplet, the width of the pulse waveform P corresponding to the main droplet can be ascertained at all times as the width $w_{max}$ of the maximum pulse waveform. Accordingly, the velocity of a liquid droplet to be ejected can be measured with high accuracy at all times without regard to presence of a satellite droplet.

In other respects, the ejection velocity measuring device of the embodiment is substantially identical in configuration with that of the fourth embodiment which has been described by reference to FIGS. 7 through 9. In the embodiment, those elements which are the same as those described in connection with the fourth embodiment are assigned the same reference numerals, and their detailed explanations are omitted.

The configurations of the ejection velocity measuring device described in connection with the second and third embodiments, in which the velocity of a liquid droplet to be ejected is derived on the basis of at least two light-receiving states, may be combined with those described in connection with the fourth and fifth embodiments.

In general, when a liquid droplet is ejected from the nozzle orifice 51 by supplying the drive signal DS to the piezoelectric member 53 and when a duration of the second voltage maintaining section s4 coincides with a natural period Tc of liquid stored in the pressure generating chamber 52, a highly superior damping operation can be achieved. Consequently, the natural period Tc of the liquid stored in the pressure generating chamber 52 is measured accurately, thereby enabling a noticeable improvement in capability of ejecting a liquid droplet from the nozzle orifice 51.

Figure 13:
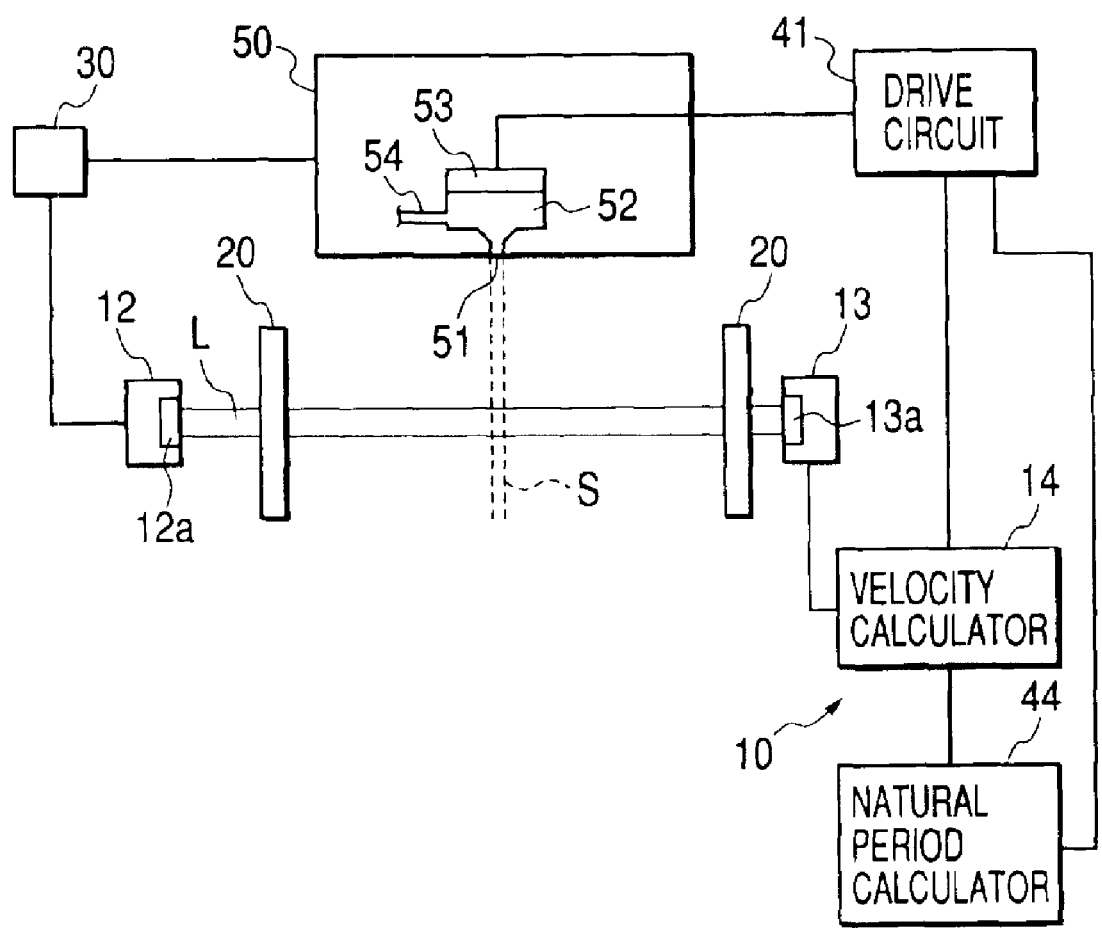
FIG. 13 is a schematic block diagram showing an ejection velocity measuring device according to a sixth embodiment of the invention.

The configuration of the ejection velocity measuring device capable of deriving the natural period Tc through use of the ejection velocity of a liquid droplet measured by use of the principle set forth is shown in FIG. 13 as a sixth embodiment.

Figure 14:
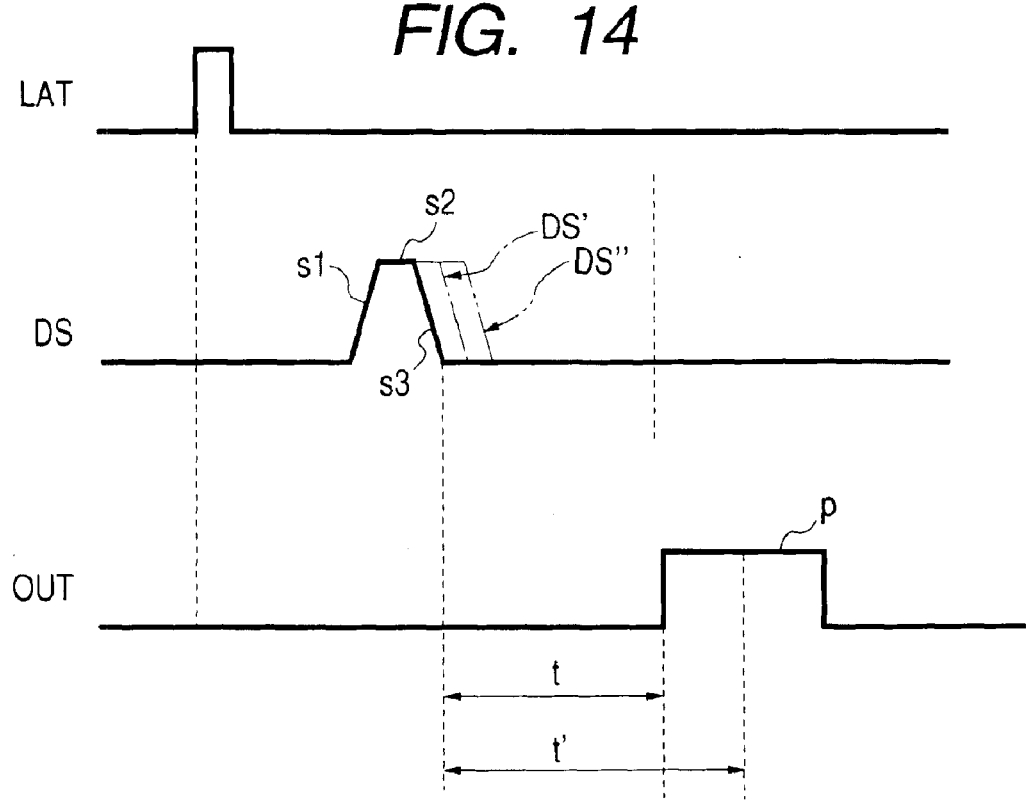
FIG. 14 is a view showing one specific example of a latch signal, that of a common drive signal, and that of an output pulse waveform produced in the ejection velocity measuring device shown in FIG. 13.
Figure 15:
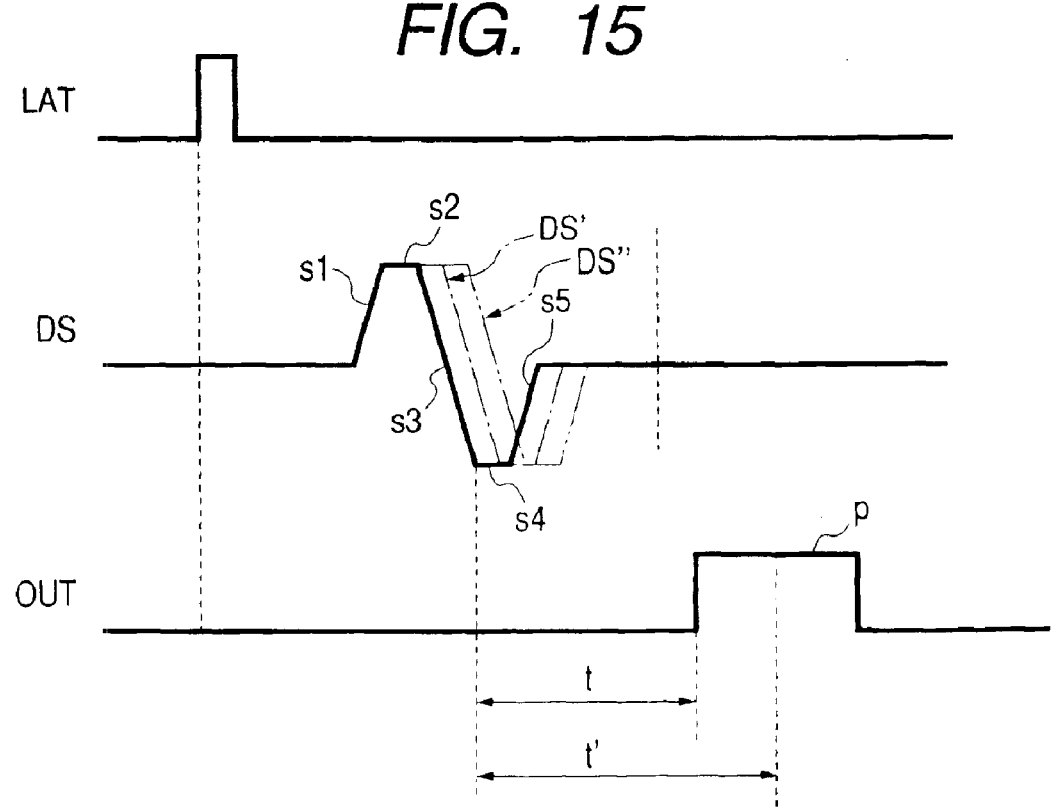
FIG. 15 is a view showing another specific example of a latch signal, that of a common drive signal, and that of an output pulse waveform produced in the ejection velocity measuring device shown in FIG. 13.

As shown in FIGS. 14 and 15, a drive circuit 41 of the embodiment can use a plurality of types of drive signals DS for driving the piezoelectric member 53. Each of the drive signals DS is sent to the piezoelectric member 53 while an appropriate latch signal LAT is taken as a trigger.

Even in either one of the cases shown in FIGS. 14 and 15, the plurality of drive signals DS differ from each other in terms of a duration of the first voltage holding section s2. Specifically, the duration of the first voltage holding section s2 in each of the plurality of drive signals DS is selected (set) so that two maximum values can be specified for the duration in connection with the velocity of a liquid droplet obtained by the velocity measuring device 10, as will be described later.

In the embodiment, a natural period calculator 44 is provided so as to derive a natural period of the liquid stored in the pressure generating chamber 52 in accordance with a correlation (see FIG. 16) among liquid droplet velocities obtained from a plurality of types of drive signals DS.

Specifically, the natural period calculator 44 specifies two maximal values in the duration with regard to the velocity of a liquid droplet to be obtained by the velocity measuring device 10. A difference between the durations of the two first voltage holding sections corresponding to the two maximal values is output as a natural period Tc of the liquid stored in the pressure generating chamber.

In other respects, the ejection velocity measuring device of the embodiment is substantially identical in configuration with that of the first embodiment which has been described by reference to FIGS. 1 through 4. In the embodiment, those elements which are the same as those described in connection with the first embodiment are assigned the same reference numerals, and their detailed explanations are omitted.

The operation of the ejection velocity measuring device will now be described.

As mentioned previously, to begin with, the state in which the light trajectory L is interrupted by the head member 50

(i.e., the state designated by dashed lines shown in FIG. 2) as a result of the head member 50 being relatively actuated by the position adjuster 30 is admitted such that a distance between the surface having the nozzle orifice 51 formed therein and the light trajectory L is zero. Thus, zero adjustment is performed. Subsequently, the surface having the nozzle orifice 51 formed therein and the light trajectory L are positioned at a predetermined interval "x" with high accuracy.

Then, light which is to pass through the liquid droplet passage space S is emitted from the light emitter 12. The light is continuously received by the light receiver 13.

In this state, the drive circuit 41 sends a first drive signal DS to the piezoelectric member 53 while an appropriate latch signal LAT is taken as a trigger. As a result, the pressure generator 53 deforms the pressure generating chamber 52, thereby ejecting a liquid droplet from the nozzle orifice 51.

The thus-ejected a liquid droplet interrupts light while passing through the liquid droplet passage space S. As a result, receipt of light performed by the light receiver 13 is interrupted, and the light receiver 13 outputs the pulse waveform P having a width corresponding to an interruption duration.

The velocity calculator derives x/t as the velocity of a droplet on the basis of a time "t" from a timing at which the second gradient voltage s3 ends (a timing at which there is effected switching from the second gradient voltage section s3 to the second voltage holding section s4 in the case shown in FIG. 15) to a timing at which a pulse waveform P rises, and a distance "x" between the nozzle orifice 51 and the light trajectory L.

The drive circuit 41 sends a second drive signal DS' to the piezoelectric member 53 while an appropriate latch signal LAT is taken as a trigger. The second drive signal DS' is longer than the first drive signal DS in terms of the duration of the first voltage holding section s2. As a result, the piezoelectric member 53 deforms the pressure generating chamber 52, whereby a liquid droplet is ejected from the nozzle orifice 51.

The velocity of a liquid droplet ejected in accordance with the second drive signal DS' is measured in the same manner as in the case of measurement of velocity of a liquid droplet ejected in accordance with the first drive signal DS.

Subsequently, the drive circuit 41 sends a third drive signal DS" to the piezoelectric member 53 while an appropriate latch signal LAT is taken as a trigger. The third drive signal DS" is longer than the second drive signal DS' in terms of the duration of the first voltage holding section s2. As a result, the piezoelectric member 53 deforms the pressure generating chamber 52, whereby a liquid droplet is ejected from the nozzle orifice 51.

In subsequent steps, supply of remaining drive signals DS to the piezoelectric member 53 and measurement of velocity of a liquid droplet ejected in accordance with the respective drive signals DS are performed sequentially. Since the respective drive signals DS have a duration of the order of microseconds, processing pertaining to the foregoing processes can be performed within an extremely short period of time.

Figure 16:
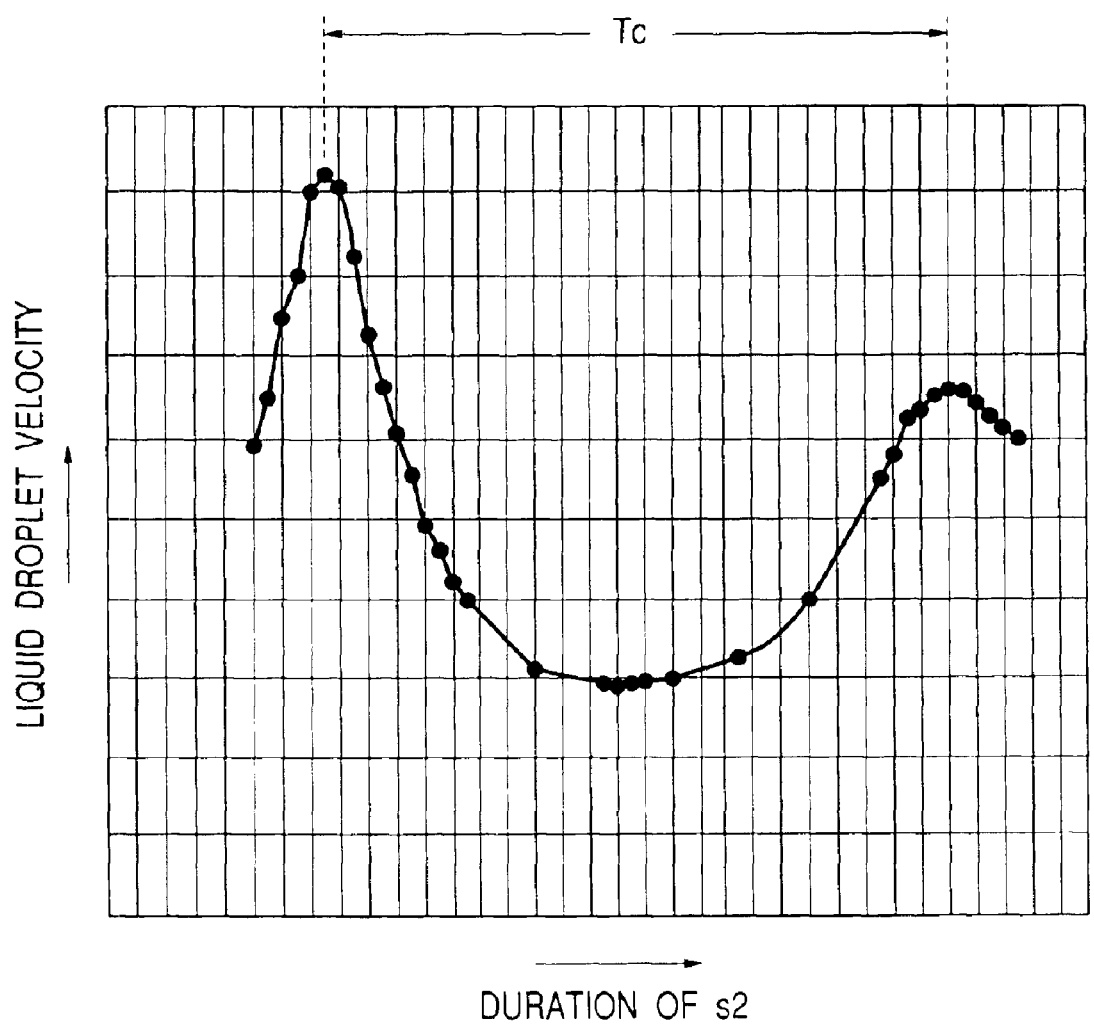
FIG. 16 is a view showing one example of a plot graph taking a duration of a first voltage holding section as a horizontal axis and the velocity of a droplet as a vertical axis.

The natural period calculator 44 prepares a graph on the basis of a plurality of types of drive signals DS and the velocity of a liquid droplet obtained by the ejection velocity measuring device 10, wherein the duration of the first voltage holding section s2 is taken as a horizontal axis and the velocity of a liquid droplet is taken as a vertical axis. An example of such a graph is shown in FIG. 16.

The natural period calculator 44 specifies two maximal values in the duration with regard to the velocity of a liquid droplet. A difference between the durations of the two first voltage holding sections corresponding to the two maximal values is output as a natural period Tc of the liquid stored in the pressure generating chamber 52.

As mentioned above, according to the embodiment, the natural period calculator 44 derives a natural period of the liquid stored in the pressure generating chamber 52 on the basis of a correlation between a plurality of types of drive signals DS and the velocity of a liquid droplet obtained by the ejection velocity measuring device 10. Hence, the natural period of the liquid stored in the pressure generating chamber 52 can be obtained with sufficient accuracy.

In the embodiment, the velocity of a liquid droplet is measured by determining passage of the liquid droplet across the light trajectory L. Hence, the velocity of a liquid droplet can be measured within an extremely short period of time. Consequently, the natural period of the liquid stored in the pressure generating chamber 52 can be measured within an extremely short period of time.

When highly-accurate positioning of the center axis of the light trajectory L is possible, the velocity of a liquid droplet is preferably derived by use of a time "t'" (see FIGS. 14 and 15) from a timing at which the second gradient voltage s3 ends (a timing at which there is effected switching from the second gradient voltage section s3 to the second voltage holding section s4 in the case shown in FIG. 15) to the center of a pulse waveform P of the light receiver 13.

The configurations of the ejection velocity measuring device described in connection with the second and third embodiments, in which the velocity of a liquid droplet to be ejected is derived on the basis of at least two light-received states, may be combined with those described in connection with the sixth embodiment.

Figure 17:
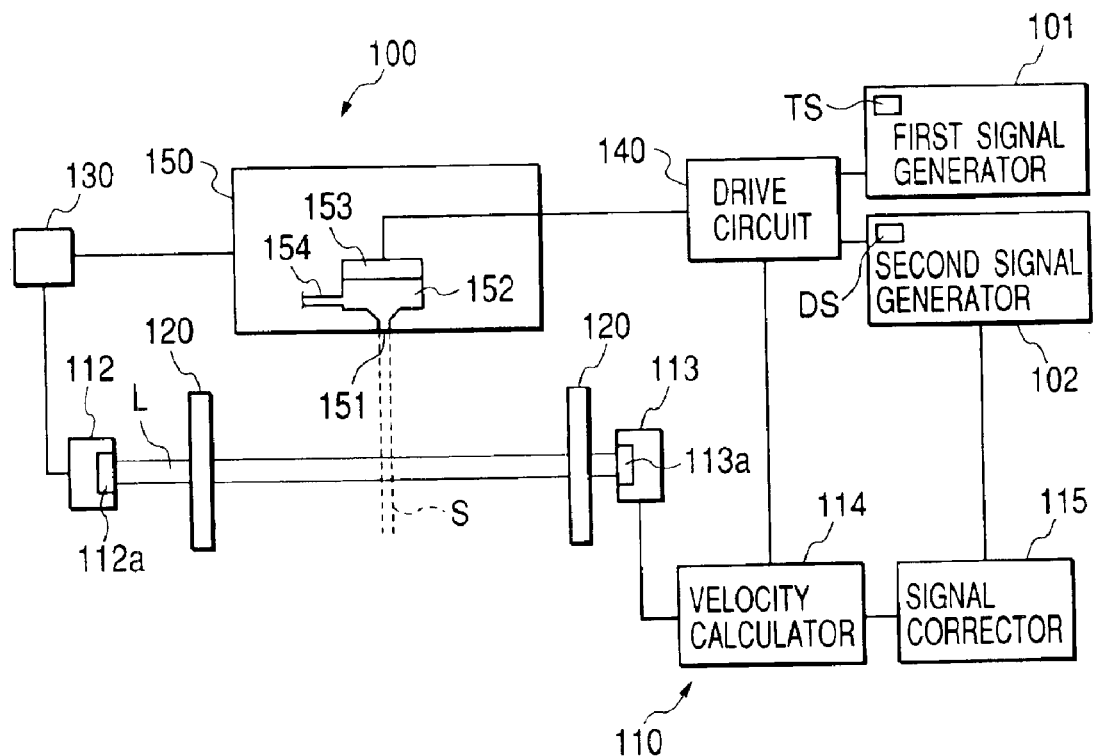
FIG. 17 is a schematic block diagram showing an ejection velocity measuring device according to a seventh embodiment of the invention.

A group of embodiments in which a drive signal to be used for ejecting a liquid droplet is corrected in accordance with the ejection velocity of a liquid droplet will now be described. As shown in FIG. 17, a liquid jetting apparatus 100 according to a seventh embodiment of the invention has a head member 150.

The head member 150 comprises a nozzle orifice 151; a pressure generating chamber 152 which is in communication with the nozzle orifice 151 and stores liquid therein; a liquid supply channel 154 which supplies liquid to the pressure generating chamber 152; and a pressure generator 153 which ejects a liquid droplet from the nozzle orifice 151 by changing the pressure of the liquid stored in the pressure generating chamber 152. In this case, the pressure generator 153 is a piezoelectric vibrator. As a matter of course, the pressure generator 153 may be constituted of a heater. A liquid droplet is an ink droplet including coloring material to be used for drawing an image on, e.g., recording paper.

The liquid jetting apparatus 100 comprises a first signal generator 101 for producing a drive signal TS to be used for measuring the velocity of an ink droplet (hereinafter often called a "velocity measuring drive signal TS"); a drive circuit 140 which is connected to the first signal generator 101 and is capable of actuating the pressure generator 153 in accordance with the drive signal TS for measuring a velocity; and a ejection velocity measuring device 110 which measures the velocity of a liquid droplet ejected from the nozzle orifice 151 as a result of actuation of the pressure generator 153 in accordance with the velocity measuring drive signal TS.

The ejection velocity measuring device 110 comprises a light emitter 112 for emitting light along a trajectory L (hereinafter called a "light trajectory") crossing a passage space S through which a liquid droplet pass (hereinafter referred to as a "liquid droplet passage space S"); a light receiver 113 for receiving the light that has crossed the liquid droplet passage space S; and a velocity calculator 114 for calculating the velocity of a liquid droplet to be ejected from the nozzle orifice 151 on the basis of a timing at which the pressure generator 153 is actuated by the drive circuit 140 and the state of the light received by the light receiver 113.

Specifically, the light emitter 112 has a semiconductor laser 112a, and the light receiver 113 has a photodiode 113a. The light originating from the semiconductor laser 112a is received by the photodiode 113a after crossing the liquid droplet passage space S.

In the embodiment, the light trajectory L, the liquid droplet passage space S, and the light receiver 113 are arranged such that the light-receiving operation of the light receiver 113 is interrupted during a liquid droplet passes across the liquid droplet passage space S.

The light receiver 113 outputs a pulse waveform P (see FIG. 19) having a width corresponding to a period of interruption of an operation for receiving light, by photoelectric conversion processing performed by the photodiode 113a.

In the embodiment, at least one shielding plate 120 is interposed between the light emitter 112 and the liquid droplet passage space S and between the light receiver 113 and the liquid droplet passage space S. An opening for the light trajectory L is provided in each of the shielding plates 120.

Figure 18:
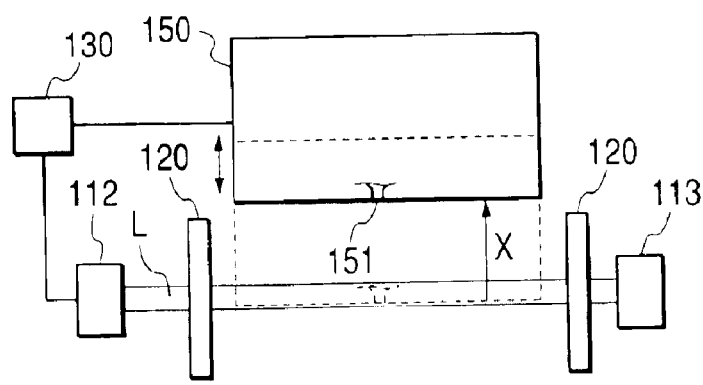
FIG. 18 is a view showing a position adjuster for adjusting a distance between a head member and an optical path in the ejection velocity measuring device shown in FIG. 17.

As shown in FIG. 18, in the embodiment, a high-precision position adjuster 130 is provided for adjusting a distance between the position of the nozzle orifice 151 of the head member 150 and the trajectory L of light originating from the light emitter 112. In this case, the surface of the head member 150 having the nozzle orifice 151 formed therein is brought in parallel with the light trajectory L. The position adjuster 130 highly accurately actuates the side having the nozzle orifice 151 formed therein, in the direction perpendicular to the light trajectory L.

When the light trajectory L is interrupted by the head member 150 (indicated by dashed lines shown in FIG. 18) as a result of relative actuation of the head member 150 by the position adjuster 130, the surface having the nozzle orifice 151 formed therein can be admitted to coincide with the light trajectory L. Subsequently, the surface having the nozzle orifice 151 formed therein and the light trajectory L can be positioned by the position adjuster 130 so as to become spaced apart by predetermined interval "x."

Figure 19:
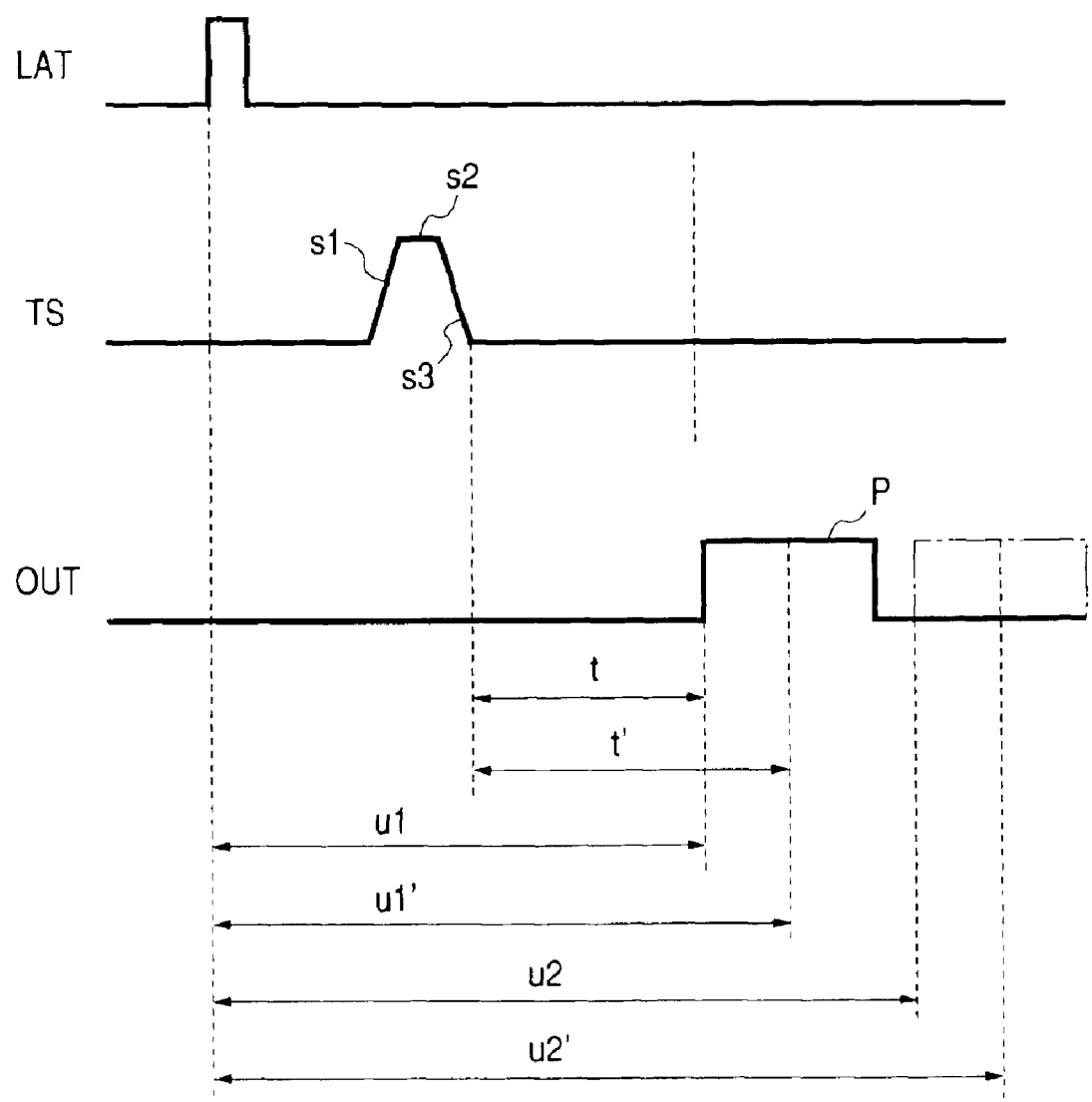
FIG. 19 is a view showing one specific example of a latch signal, that of a common drive signal, and that of an output pulse waveform produced in the ejection velocity measuring device shown in FIG. 17.

As shown in FIG. 17, the drive circuit 140 of the embodiment is connected to the first signal generator 101 for generating the velocity measuring drive signal TS for actuating the pressure generator 153 embodied by a piezoelectric vibrator. As shown in FIG. 19, the drive circuit 140 sends the drive signal TS to the pressure generator 153 for measuring the velocity of a liquid droplet while an appropriate latch signal LAT is taken as a trigger.

In this case, the velocity measuring drive signal TS comprises a first gradient voltage section s1 for supplying, to a piezoelectric vibrator, a gradient voltage for expanding the pressure generating chamber 152 to decompress therein; a first voltage holding section s2 for supplying a voltage, to the piezoelectric vibrator, which maintains the decompressed state; and a second gradient voltage section s3 for supplying, to the piezoelectric vibrator, a gradient voltage which causes the pressure generating chamber 152 to restore an original state.

Figure 20:
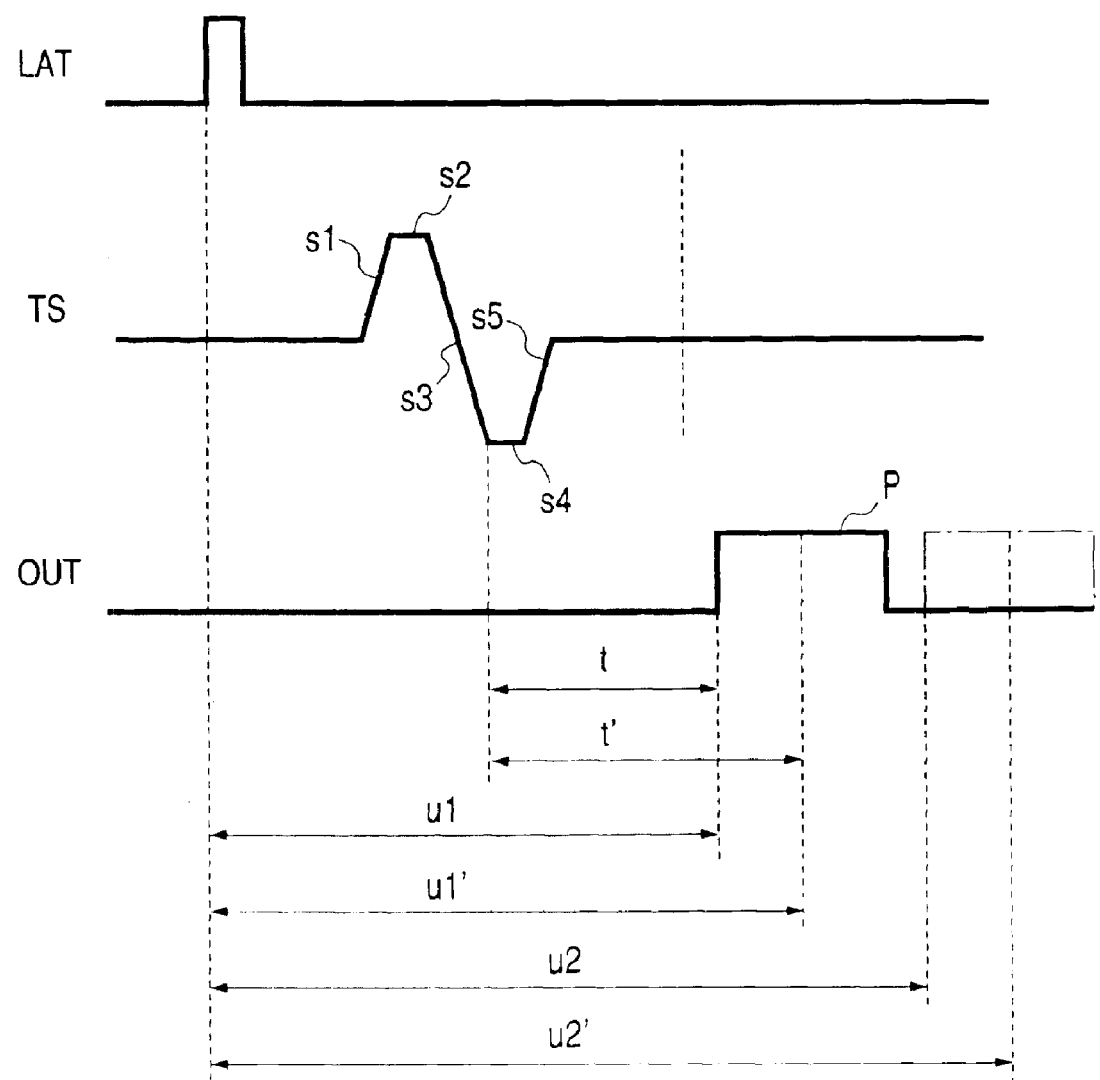
FIG. 20 is a view showing another specific example of a latch signal, that of a common drive signal, and that of an output pulse waveform produced in the ejection velocity measuring device shown in FIG. 17.

Alternatively, as shown in FIG. 20, the velocity measuring drive signal TS comprises a first gradient voltage section s1 for supplying, to a piezoelectric vibrator, a gradient voltage for expanding the pressure generating chamber 152 to decompress therein; a first voltage holding section s2 for supplying a voltage, to the piezoelectric vibrator, which maintains the decompressed state; a second gradient voltage section s3 for supplying, to the piezoelectric vibrator, a gradient voltage for contracting of the pressure generating chamber 152 to compress therein; a second voltage holding section s4 for supplying, to the piezoelectric vibrator, a voltage which maintains the compressed state; and a third gradient voltage section s5 for supplying, to a piezoelectric vibrator, a gradient voltage which causes the pressure generating chamber 152 to restore an original state.

In either one of the cases shown in FIGS. 19 and 20, when the pressure generator 153 is actuated by the velocity measuring drive signal TS, a liquid droplet are ejected from the nozzle orifice 151. More accurately, an ink droplet are ejected in the vicinity of a timing at which the second gradient voltage section s3 is finished (a timing at which there is effected switching from the second gradient voltage section s3 to the second voltage holding section s4 in the case shown in FIG. 20).

The velocity calculator 114 derives the velocity of a liquid droplet to be ejected from the nozzle orifice 151 from a timing at which the drive circuit 140 activates the pressure generator 153 and a timing of leading edge of the pulse waveform. On the basis of a time "t" from a timing at which the second gradient voltage s3 ends (i.e., a timing at which switching from the second gradient voltage section s3 to the second voltage holding section s4 is effected in FIG. 20) to a timing at which the pulse waveform P of the light receiver 13 rises, and a distance "x" between the nozzle orifice 51 and the light trajectory L, x/t is derived as the velocity of a liquid droplet.

As shown in FIG. 17, the drive circuit 140 of the embodiment is connected to a second signal generator 102 which generates a drive signal DS for actuating the pressure generator 153 embodied by a piezoelectric vibrator. The drive circuit 140 sends the drive signal DS to the pressure generator 153 while an appropriate latch signal LAT is taken as a trigger for effecting a desired liquid jetting operation.

The velocity calculator 114 is connected to a signal corrector 115 for correcting the drive signal DS on the basis of measured velocity of a liquid droplet. In other words, the signal corrector 115 corrects the drive signal DS in the second signal generator 102 on the basis of the velocity of the liquid droplet derived by the velocity calculator 114.

The operation of the liquid jetting apparatus will now be described.

As mentioned above, the state in which the light trajectory L is interrupted by the head member 150 (i.e., the state designated by dashed lines shown in FIG. 18) as a result of relative actuation of the head member 150 being performed by the position adjuster 130 is admitted such that a distance between the surface having the nozzle orifice 151 formed therein and the light trajectory L is zero. Thus, zero adjustment is performed. Subsequently, the surface having the nozzle orifice 151 formed therein and the light trajectory L are positioned at a predetermined interval "x" with high accuracy by the position adjuster 130.

Light which is to pass through the liquid droplet passage space S is emitted from the light emitter 112. The light is continuously received by the light receiver 113.

In this state, the drive circuit 140 sends the velocity measuring drive signal TS to the pressure generator 153 while an appropriate latch signal LAT is taken as a trigger. As a result, the pressure generator 153 changes the pressure of liquid stored in the pressure generating chamber 152, thereby ejecting a liquid droplet from the nozzle orifice 151.

The thus-ejected liquid droplet interrupts light while passing through the liquid droplet passage space S. As a result, receipt of light performed by the light receiver 113 is interrupted, and the light receiver 113 outputs a pulse waveform P having a width corresponding to an interruption duration.

The velocity calculator 114 derives x/t as the velocity of a droplet on the basis of a time "t" from a timing at which the second gradient voltage s3 ends (a timing at which there is effected switching from the second gradient voltage section s3 to the second voltage holding section s4 in the case shown in FIG. 20) to a timing at which a pulse waveform P rises, and a distance "x" between the nozzle orifice 151 and the light trajectory L.

On the basis of the velocity of a liquid droplet derived by the velocity calculator 114, the signal corrector 115 corrects the liquid jetting drive signal DS to be produced by the second signal generator 102.

For example, when a liquid jetting operation is performed while the nozzle orifice 151 and a target member (e.g., recording paper) against which a liquid droplet ejected from the nozzle orifice 151 is to impact are moved relative to each other, a timing at which the drive signal DS is to be supplied can be corrected such that a liquid droplet is ejected at an appropriate timing during a relative movement operation.

As mentioned above, in the embodiment, the signal corrector 115 corrects the liquid jetting drive signal DS on the basis of actually-measured velocity of a liquid droplet. Hence, the liquid jetting drive signal can be corrected in a more preferable manner.

In particular, when only the timing at which the liquid jetting drive signal DS is to be supplied is corrected while the waveform of the velocity measuring drive signal TS and the liquid jetting drive signal DS are caused to assume identical waveforms, the ejection velocity corresponding to the liquid jetting drive signal DS has already been available. Hence, an extremely high precision modification can be effected.

Alternatively, even when the drive signals TS and DS are not identical in waveform with each other, if a correlation between an ejection velocity determined by the velocity measuring drive signal TS and an ejection velocity determined by the liquid jetting drive signal DS has already been known, extremely high precision modification of the timing can be effected.

According to the embodiment, the velocity of a liquid droplet is derived on the basis of the state of light received by the light receiver 113. Hence, the liquid jetting drive signal can be corrected with sufficient accuracy.

In the embodiment, receipt of light performed by the light receiver 113 is interrupted for a period during which a liquid droplet passes through the liquid droplet passage space S. A determination is readily made as to whether or not a droplet is passing across the light trajectory L.

Since the shielding plates 120 are interposed between the light emitter 113 and the liquid droplet passage space S and between the light receiver 114 and the liquid droplet passage space S, adhesion of liquid mist to the light emitter 113 and the light receiver 114 is avoided.

In the embodiment, the calculator 114 calculates the velocity of a liquid droplet with use of a time "t" from a timing at which the second gradient voltage s3 ends (a timing at which there is effected switching from the second gradient voltage section s3 to the second voltage holding section s4 in the case shown in FIG. 20) to a timing at which a pulse waveform P of the light receiver 113 rises. However, when high-precision positioning of the center axis of the light trajectory L is possible, the velocity of a liquid droplet is preferably derived by use of a time "t'" (see FIG. 19) from a timing at which the second gradient voltage s3 ends (a timing at which there is effected switching from the second gradient voltage section s3 to the second voltage holding section s4 in the case shown in FIG. 20) to the center of a pulse waveform P of the light receiver 113.

In the embodiment, the timing at which a liquid droplet is to be ejected is taken as a timing at which the second gradient voltage s3 ends (a timing at which there is effected switching from the second gradient voltage section s3 to the second voltage holding section s4 in the case shown in FIG. 20). However, an actual timing at which a liquid droplet is to be ejected may slightly deviate from such a timing.

Figure 21:
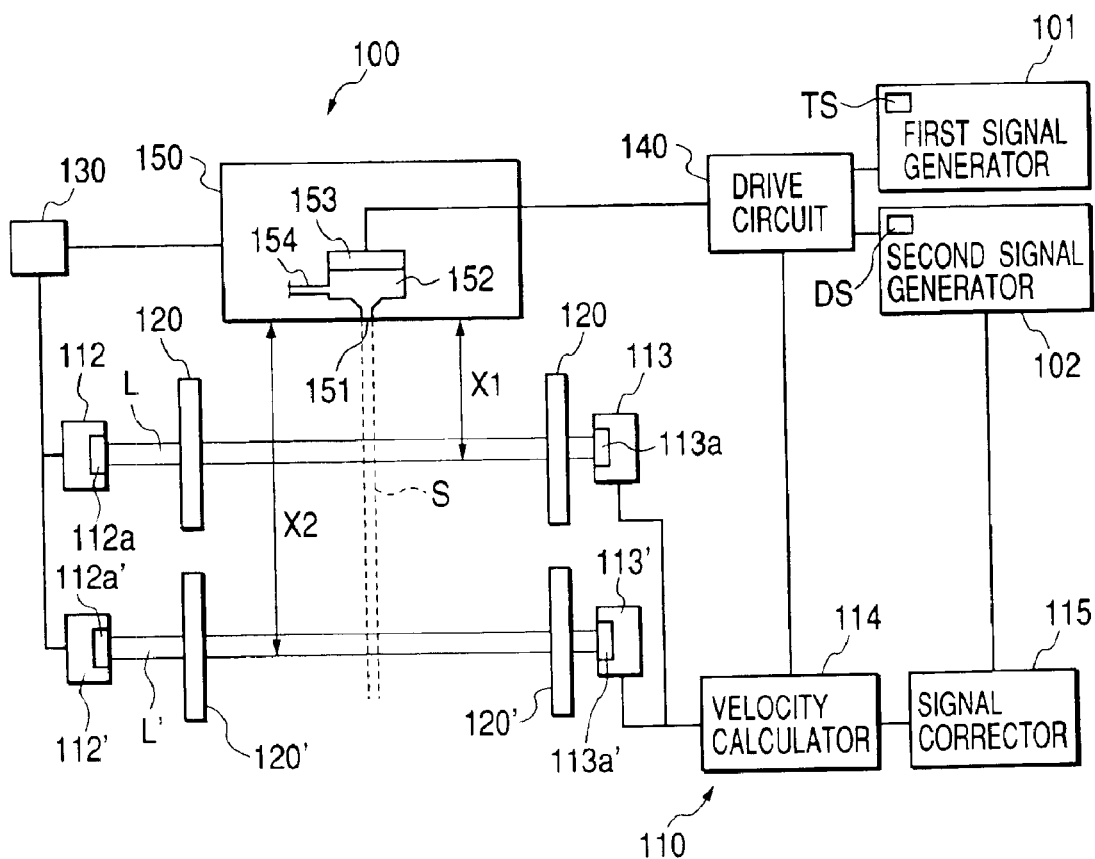
FIG. 21 is a schematic block diagram showing an ejection velocity measuring device according to an eighth embodiment of the invention.

For this reason, by reference to FIG. 21 there will now be described an eighth embodiment of the invention which takes such a case into particular consideration.

The ejection velocity measuring device 110 of the embodiment further comprises a second light emitter 112' for emitting light on a second trajectory L' which crosses the space S across which a liquid droplet ejected from the nozzle orifice 151 passes; and a second light receiver 113' for receiving light of the second trajectory L' crossing the liquid droplet passage space S.

More specifically, the second light emitter 112' also has a semiconductor laser 112a', and the second light emitter 113' also has a photodiode 113a'. The light emitted from the semiconductor laser 112a' is received by the photodiode 113a' after crossing the liquid droplet passage space S.

The layout of a second trajectory L' of light (hereinafter called a "second light trajectory"), the liquid droplet passage space S, and the second light receiver 113' is adjusted such that receipt of light performed by the second light receiver 113' is interrupted while a liquid droplet is passing through the liquid droplet passage space S.

The second light receiver 113' outputs a pulse waveform P (see FIG. 19) having a width corresponding to a period during which receipt of light is interrupted, by photoelectric conversion processing performed by the photodiode 113' (see FIG. 19).

In the embodiment, at least one shielding plate 120' is interposed between the second light emitter 112' and the liquid droplet passage space S and between the second light receiver 113' and the liquid-droplet passage space S. An opening for the second light trajectory L' is provided in each of the shielding plates 120'.

On the basis of the state of the light received by the (first) light receiver 113 and the state of the light received by the second light receiver 113', a velocity calculator 114 derives the velocity of a liquid droplet ejected from the nozzle orifice 151.

More specifically, for example, the distance between the position of the nozzle orifice 151 and the (first) trajectory L of the light originating from the light emitter 112 is assumed to be x1 and the distance between the position of the nozzle orifice 151 and the (second) trajectory L' of the light originating from the light emitter 112' is assumed to be x2.

The velocity calculator 114 calculates a time period u1 from a timing at which the latch signal LAT is supplied to a timing at which the pulse waveform P of the light receiver 113 rises, or another time period u1' from a timing at which the latch signal LAT is supplied to a timing of center of the pulse waveform P of the light receiver 113 (see FIGS. 19 and 20).

The velocity calculator 114 calculates a time period u2 from a timing at which the latch signal LAT is supplied to a timing at which the pulse waveform P of the light receiver 13' rises, or another time period u2' from a timing at which the latch signal LAT is supplied to a timing of center of the pulse waveform P of the light receiver 13' (see FIGS. 19 and 20).

The velocity calculator 114 derives (x1-x2)/(u1-u2) or (x1-x2)/(u1'-u2') as the velocity of a liquid droplet.

In other respects, the ejection velocity measuring device of the embodiment is substantially identical in configuration with that of the seventh embodiment which has been described by reference to FIGS. 17 through 20. In the embodiment, those elements which are the same as those described in connection with the seventh embodiment are assigned the same reference numerals, and their detailed explanations are omitted.

According to the embodiment, the velocity of a liquid droplet can be measured with considerably enhanced accuracy regardless of a timing at which an actual liquid droplet is ejected.

Alternatively, with use of an expression calibrated by any method or a corresponding table, the velocity calculator 114 may derive the ejection velocity of a liquid droplet on the basis of a time "u" from a timing at which a latch signal LAT is to be supplied to a timing at which the pulse waveform P of the light receiver 113 rises, or on the basis of a time "u'" from a timing at which the latch signal LAT is to be supplied to a timing of center of the pulse waveform P of the light receiver 113.

Figure 22:
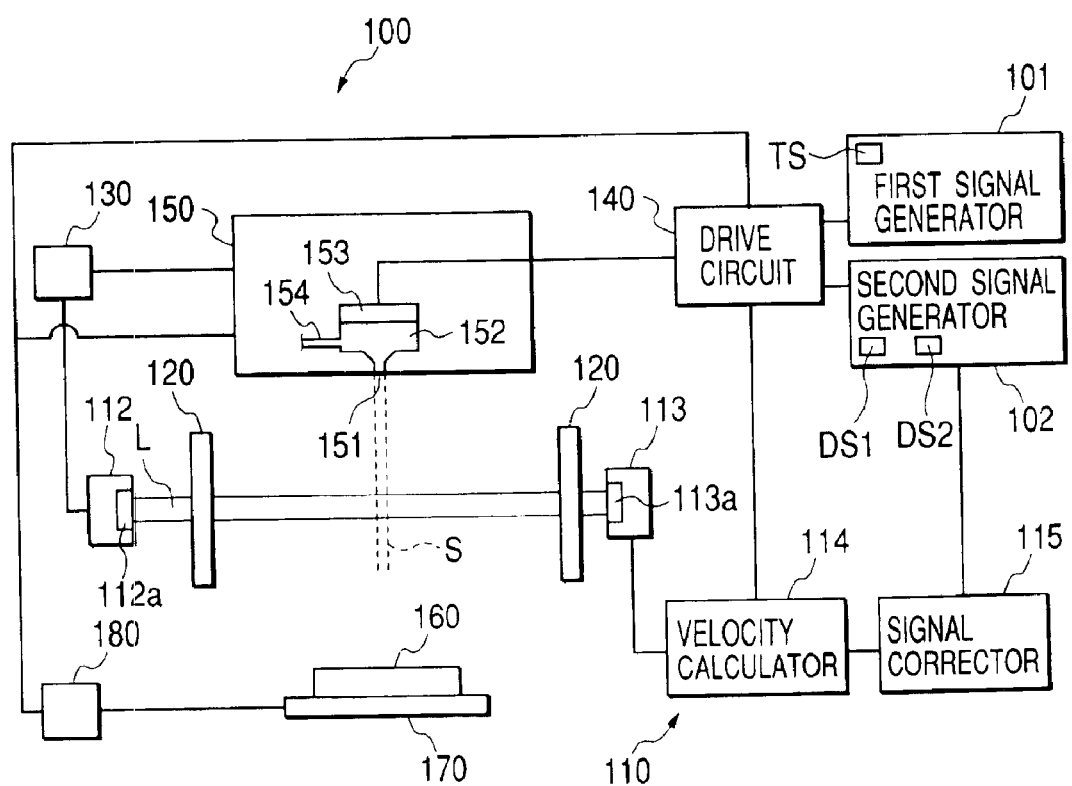
FIG. 22 is a schematic block diagram showing an ejection velocity measuring device according to a ninth embodiment of the invention.

A ninth embodiment of the invention will now be described by reference to FIG. 22. As shown in FIG. 22, in the embodiment, the liquid jetting apparatus further comprises a supporter 170 which supports a target member 160 against which an ejected liquid droplet is to impact; and a carriage 180 capable of actuating the head member 150 in both forward and backward directions relative to the target member 160.

The signal corrector 115 of the embodiment corrects a drive signal DS1 for effecting a liquid jetting operation in a forward direction and another drive signal DS2 for effecting a liquid jetting operation in a backward direction such that the drive signals become different from each other.

According to the embodiment, a supply timing of the drive signal DS1 is corrected such that a liquid droplet is ejected at an optimal timing in connection with movement of the head member 150 in a forward direction. Further, in connection with movement of the head member 150 in a backward direction, a supply timing of the drive signal DS2 is corrected such that a liquid droplet is ejected at an optimal timing. In other words, an impact area can be adjusted in both directions with extremely high accuracy.

There will now be described a tenth embodiment, in which the head member has a plurality of nozzle orifices.

Figure 23:
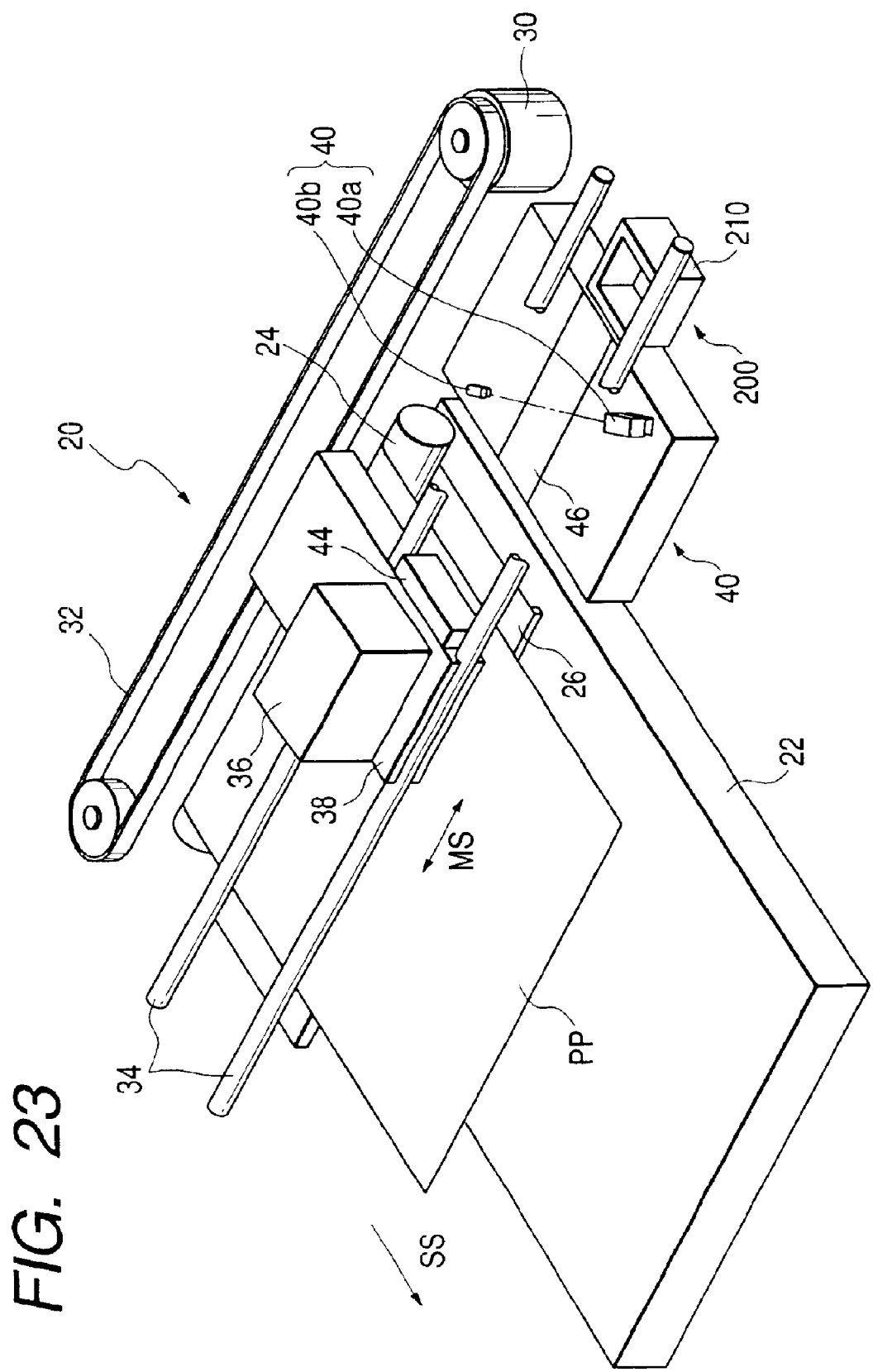
FIG. 23 is a schematic perspective view showing the principal configuration of a color ink jet printer which serves as a tenth embodiment of the invention.

FIG. 23 is a schematic perspective view showing the principal configuration of a color ink jet printer 20 according to the tenth embodiment of the invention. The printer 20 comprises a paper stacker 22; a paper feed roller 24 to be actuated by a paper feed motor 31 (see FIG. 24); a platen plate 26; a carriage 38; a stepping motor 30; a traction belt 32 to be actuated by the stepping motor 30; and guide rails 34 for the carriage 38. A print head 36 having a plurality of nozzles formed therein is mounted on the carriage 38.

Print paper PP is taken up from the paper stacker 22 by the paper feed roller 24 and is transported over the surface of the platen plate 26 in one direction. This direction is called a "subscanning direction" and is designated by arrow SS in FIG. 23. The carriage 38 is towed by the traction belt 32 to be actuated by the stepping motor 30 and moved in a direction perpendicular to the subscanning direction along the guide rails 34. The direction perpendicular to the subscanning direction is called a "main scanning direction" and is designated by arrow MS in the drawing. While the carriage 38 is traveling in the main scanning direction (i.e., while the carriage 38 is performing main scanning operation), the print head 36 performs printing operation on the print paper PP placed on the platen plate 26. Here, an area on the platen plate 26 in which printing operation is possible is called a "print region" PR.

A dot ejection inspector 40 and a cleaner 200 are provided outside of the print region PR (i.e., an area located on the right-hand side in FIG. 23). FIG. 23 shows only a head cap 210 as the cleaner 200. The remaining portion of configuration of the printer 20 is omitted from the drawing. Of the path on the guide rails 34 along which the print head 36 moves in the main scanning direction, a region where the dot ejection inspector 40 and the head cap 210 are provided is called an "adjustment region AJ," in contrast to the "print region PR."

The dot ejection inspector 40 has a waste ink receiver 46 provided below the two guide rails 34 so as to oppose the same. The waste ink receiver 46 is for receiving ink droplets ejected from the print head 36 at the time of inspection of ejection of ink droplets. The dot ejection inspector 40 has a light emitter 40a and a light receiver 40b. The light emitter 40a and the light receiver 40b are provided so as to oppose each other with a space located above the waste ink receiver 46 (and below the print head 36) sandwiched therebetween. The light emitter 40a emits a laser beam. A light emitter is, for example, a semiconductor laser. The light receiver 40b receives the laser beam. The light receiver 40b may be embodied by, e.g., a photo-diode, so long as the element changes an output in accordance with the amount of received light.

A laser beam which originates from the light emitter 40a and is received by the light receiver 40b runs across the space between the two guide rails 34 and the waste ink receiver 46 at an angle of about 26° with respect to the subscanning direction. The ejection velocity of an ink droplet is measured in the space located above the waste ink receiver 46, by use of a laser beam. Accordingly, of the range of movement of the print head 36 in the main scanning direction along the guide rails 34, an area located above the waste ink receiver 46 is called an "inspection region IS." A detailed configuration of the dot ejection inspector 40 and a method of measuring an ejection velocity will be described later. Other constituent elements of the dot ejection inspector 40 are omitted from FIG. 23.

The head cap 210 is a hermetic cap and is placed on the print head 36 for preventing drying of ink stored in the nozzle when printing is not performed. If the nozzle is clogged, the head cap 210 is placed on the print head 36, thus effecting cleaning operation. The nozzle is cleaned in the area located above the head cap 210. Hence, of the range of movement of the print head 36 in the main scanning direction along the guide rails 34, an area located above the head cap 210 is called a "cleaning region CL."

Figure 24:
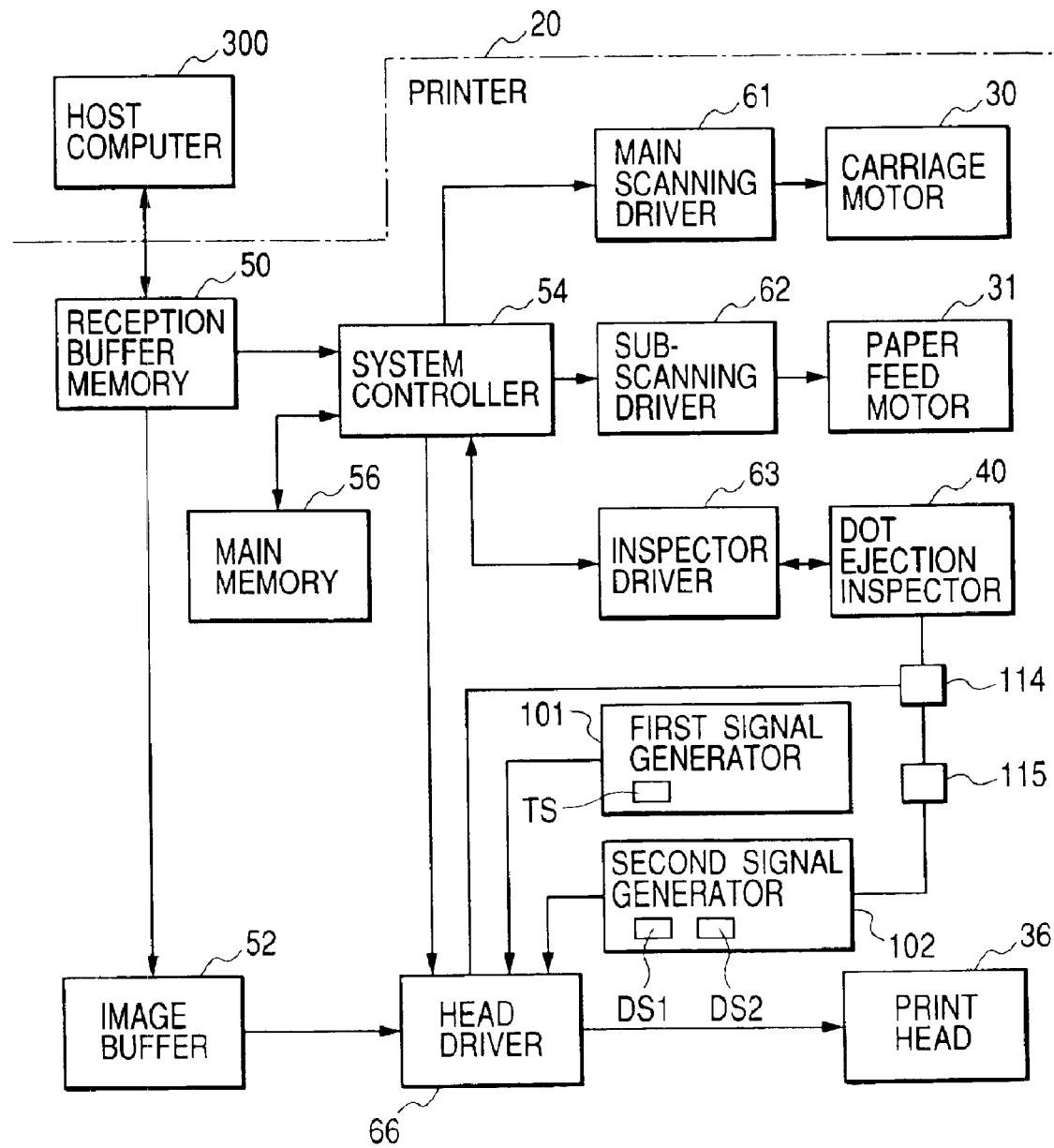
FIG. 24 is a block diagram showing an electrical configuration of the printer shown in FIG. 23.

FIG. 24 is a schematic block diagram showing an electrical configuration of the printer 20. The printer 20 is connected to a reception buffer memory 50 for receiving a signal supplied from a host computer 300; an image buffer 52 for storing print data; a system controller 54 for controlling the entire operation of the printer 20; and a main memory 56. The system controller 54 is connected to a main scanning driver 61 for driving the carriage motor 30; a subscanning driver 62 for driving the paper feed motor 31; an inspector driver 63 for driving the dot ejection inspector 40; and a head driver 66 (drive circuit) for driving the print head 36.

A printer driver (not shown) of the host computer 300 determines various parameters for specifying a printing operation on the basis of a print mode (e.g., a high-speed print mode or a high-quality print mode) specified by the user. On the basis of the parameters, the printer driver produces print data to be used for effecting a printing operation in a certain print mode and transfers the data to the printer 20. The thus-transferred print data are temporarily stored in the reception buffer memory 50. In the printer 20, the system controller 54 reads necessary information from the print data stored in the reception buffer memory 50 and sends a control signal to the respective drivers.

Print data pertaining to a plurality of color components are produced by dissecting the print data received by the reception buffer memory 50 on a per-color-component-basis. In accordance with the control signal sent from the system controller 54, the head driver 66 reads print data from the image buffer 52 for each color component and actuates colors of nozzle arrays (nozzle rows) provided on the print head 36.

Figure 25:
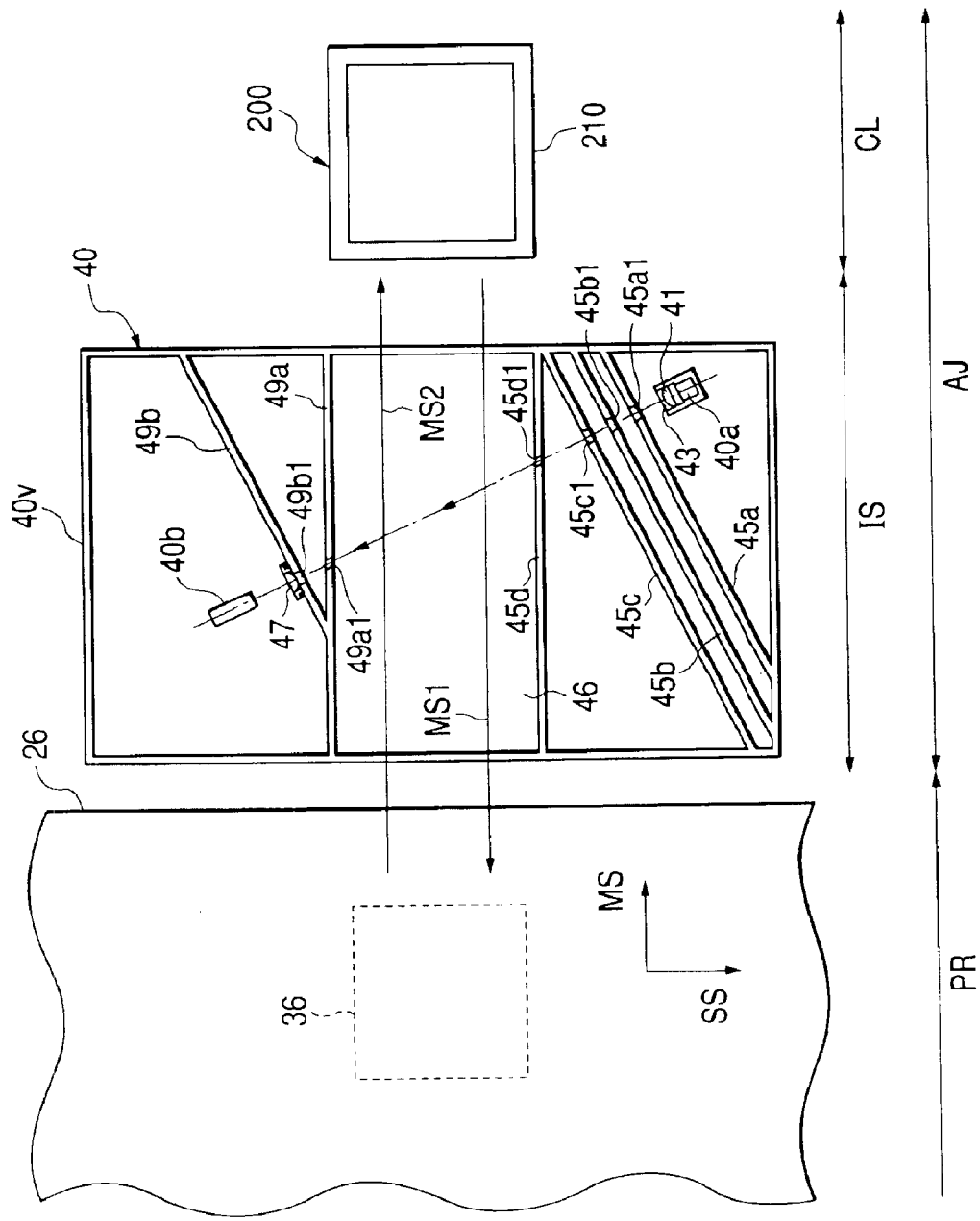
FIG. 25 is a descriptive view showing a positional relationship between a platen plate, a dot ejection inspector, a waste ink receiver, and a head cap, all being provided in the printer shown in FIG. 23.
Figure 26:
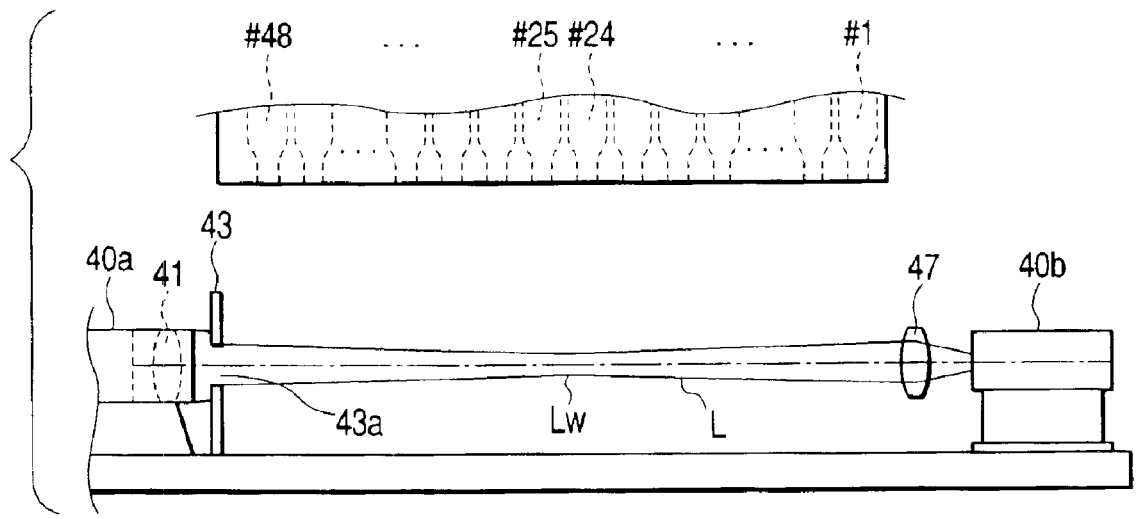
FIG. 26 is a side view showing only the principal configuration of the dot ejection inspector provided in the printer shown in FIG. 23.

FIG. 25 is a schematic plan view showing the configuration of the inspection region IS and a neighborhood thereof in the printer. FIG. 26 is a side view showing the principal configuration of the dot ejection inspector 40. By reference to FIGS. 25 and 26, the configuration of the dot ejection inspector 40 will be described in detail.

As mentioned previously, the light emitter 40a and the light receiver 40b are arranged with the space located above the waste ink receiver 46 interposed therebetween. The light emitter 40a emits a laser beam at an angle of about 26° with respect to the subscanning direction. The light receiver 40b receives the light. As shown in FIG. 26, interposed between the light emitter 40a and the light receiver 40b are, in the sequence with respect to a direction in which the laser beam originating from the light emitter 40a travels, a lens 41 (light condensing section), a shading plate 43 (light shading section), first through fourth shielding plates 45a to 45d, the waste ink receiver 46, second shielding plates 49a, 49b, and a lens 47 (light condensing section).

The lens 41 (first light condenser) is disposed at a downstream position with respect to the light emitter 40a in the direction in which the laser beam travels. The lens 41 converges the laser beam originating from the light emitter 40a.

The shading plate 43 is disposed at a downstream position with respect to the lens 41 in the direction in which the laser beam travels. As shown in FIG. 26, the shading plate 43 has a convergence aperture 43a smaller than the range of radiation of a laser beam. Of the laser beam, only a portion of the beam located in the vicinity of the optical axis passes through the convergence aperture 43a. Consequently, the laser beam becomes narrow, and the size of a light trajectory in the axial direction becomes substantially uniform.

As shown in FIG. 25, the first through third shielding plates 45a, 45b, 45c are provided at lower positions with respect to the shading plate 43 in the direction in which the laser beam travels. The shielding plates 45a, 45b, 45c are all walls perpendicular to the optical axis of the laser beam and are spaced apart from each other by a given interval. The shielding plates 45a, 45b, 45c partition an area which is located above the waste ink receiver 46 and in which an ink droplet is ejected from the print head 36 from the light emitter 40a, the lens 41, and the shading plate 43. An aperture 45a1 is formed at a position on the shielding plate 45a onto which a laser beam is to be incident (or through which a laser beam passes); an aperture 45b1 is formed at a position on the shielding plate 45b onto which a laser beam is to be incident (or through which a laser beam passes); and an aperture 45c1 is formed at a position on the shielding plate 45c onto which a laser beam is to be incident (or through which a laser beam passes). The laser beam heads for the area located above the waste ink receiver 46 by way of the apertures 45a1, 45b1, and 45c1.

The waste ink receiver 46 is sandwiched between the fourth shielding plate 45d, which is a wall parallel to the scanning direction MS, and the fifth shielding plate 49a. As in the case of the first through third ink shielding plates 45a, 45b, and 45c, the fourth shielding plate 45d is provided on the side of the waste ink receiver 46 facing the light emitter 40a and partitions the area which is located above the waste ink receiver 46 and into which an ink droplet is to be ejected from the light emitter 40a, the lens 41, and the shielding plate 43. The fourth shielding plate 45d also has an aperture 45a1 at a position onto which a laser beam is radiated, as in the case of the first through third shielding plates. The laser beam enters the area located above the waste ink receiver 46 by way of the aperture 45a1. In the embodiment, any member which partitions the area which is located above the waste ink receiver 46 and into which an ink droplet is to be ejected from the light emitter 40a, the lens 41, and the shading plate 43 is called an "emitter-side shielding plates." The emitter-side shielding plates 45a, 45b, 45c, and 45d are omitted from all drawings except FIG. 25.

An outer periphery of the dot ejection inspector 40 is covered with an outer peripheral wall 40v. Further, a portion of the dot ejection inspector 40, which ranges from the fourth shielding plate 45d to a downstream area (emitter-side) in the subscanning direction SS, is covered with an emitter-side ceiling plate. The emitter-side shielding plates 45a, 45b, 45c, and 45d cover the light emitter 40a, the lens 41, and the shading plate 43 (light emitting section) in cooperation with the emitter-side ceiling plate and the outer peripheral wall 40v, thus shielding them from the ink mist ejected above the waste ink receiver 46. Here, the emitter-side ceiling plate is omitted from the drawings.

Felt to be used for preventing splashing of an ink droplet is laid on the bottom of the waste ink receiver 46. In the space located above the waste ink receiver 46, the ejection velocity of an ink droplet is measured. The ink droplet ejected at the time of measurement is received by the felt of the waste ink receiver 46.

The fifth shielding plate 49a provided on the side of the waste ink receiver 46 facing the light receiver 40b partitions the area which is located above the waste ink receiver 46 and into which an ink droplet is to be ejected from the lens 47 and the light receiver 40b. An aperture 49a1 is formed at a position on the fifth shielding plate 49a onto which a laser beam is incident. The laser beam passes through the aperture 49a1 and enters the area of the light receiver 40b from the area located above the waste ink receiver 46.

A sixth shielding plate 49b, the lens 47 (a second light condenser), and the light receiver 40b are provided on the side of the fifth shielding plate 49a facing the light receiver 40b. The sixth shielding plate 49b is a wall perpendicular to the optical axis of a laser beam. As in the case of the fifth shielding plate 49a, the sixth shielding plate 49b also partitions the area which is located above the waste ink receiver 46 and into which an ink droplet is to be ejected from the lens 47 and the light receiver 40b. The sixth shielding plate 49b also has an aperture 49b1 at a position where a laser beam is to be incident. The laser beam passes through the aperture 49b1, thereby reaching the lens 47.

In the embodiment, the members partition the area which is located above the waste ink receiver 46 and into which an ink droplet is to be ejected and the lens 47 and the light receiver 40b are called "receiver-side shielding plates." The receiver-side shielding plates 49a, 49b are omitted from all drawings except FIG. 25.

A portion of the dot ejection inspector 40, which ranges from the fifth shielding plate 49a to an upstream area in the subscanning direction SS, is covered with a receiver-side ceiling plate. The receiver-side shielding plates 49a, 49b cover the lens 47 and the light receiver 40b (light receiving section) in cooperation with the receiver-side ceiling plate and the outer peripheral wall 40v, thus shielding them from the ink mist ejected above the waste ink receiver 46. Here, the receiver-side ceiling plate is omitted from the drawings.

The lens 47 has a lens having a light receiving region of predetermined area. The lens 47 is disposed at a downstream position with respect to the sixth shielding plate 49b in a direction in which a laser beam propagates. Upon receipt of the laser beam having passed through the aperture 49b1 of the sixth shielding plate 49b, the lens 47 converges the laser beam. The thus-converged laser beam is received by the light receiver 40b disposed at a downstream position in the direction in which the laser beam propagates. The ejection velocity of an ink droplet is measured by utilization of a change in the quantity of laser light received by the light receiver 40b. A method of measuring the ejection velocity of an ink droplet will now be described in detail.

A relationship between the light emitter 40a, the light receiver 40b, and nozzle rows will now be described.

Figure 27:
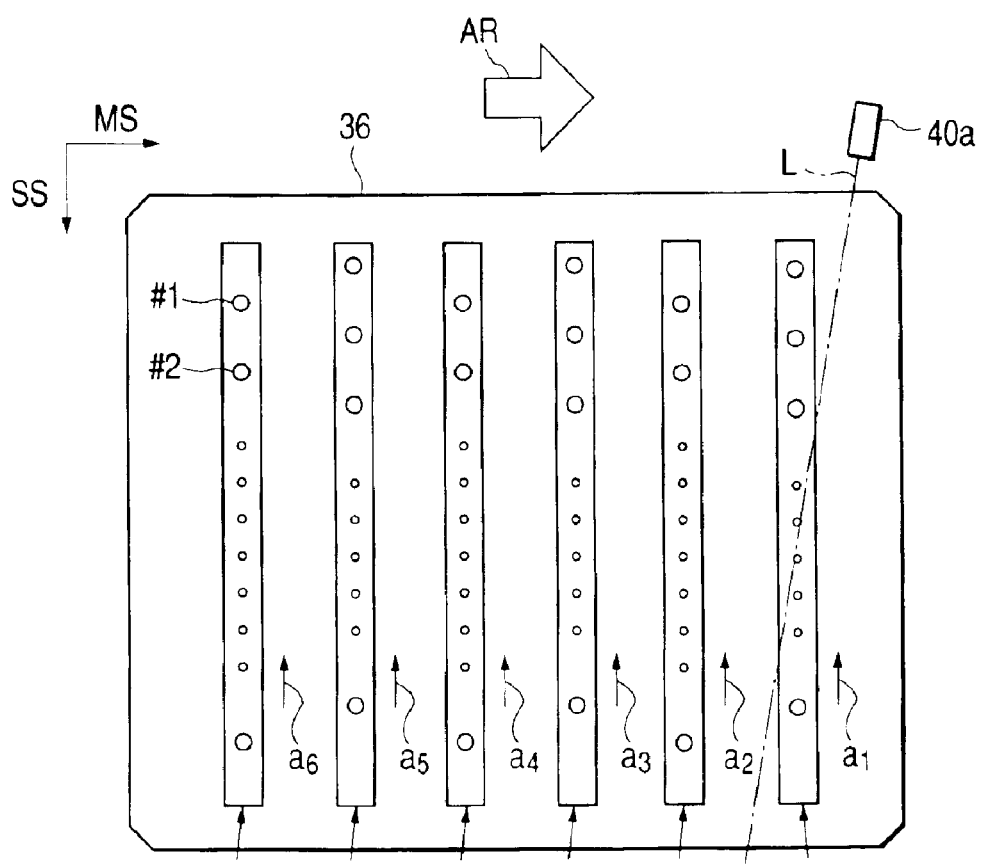
FIG. 27 is a descriptive view showing the configuration of the dot ejection inspector and the principle of a method of measuring a dot ejection velocity.

FIG. 27 is a descriptive view showing the principle of a method for measuring an ejection velocity through use of the dot ejection inspector 40. FIG. 27 is a view of the print head 36 when viewed from below. FIG. 27 schematically shows six colors of nozzle arrays belonging to the print head 36, and the light emitter 40a and the light receiver 40b, which constitute the first dot ejection inspector 40.

Formed in the lower surface of the print head 36 are a group of black-ink nozzles $K_D$ for ejecting black ink; a group of dark cyan-ink nozzles $C_D$ for ejecting dark cyan ink; a group of light cyan-ink nozzles $C_L$ for ejecting light cyan ink; a group of dark magenta-ink nozzles $M_D$ for ejecting dark magenta ink; a group of light magenta-ink nozzles $M_L$ for ejecting light magenta ink; and a group of yellow-ink nozzles $Y_D$ for ejecting yellow ink.

Alphabetic capital letters provided in the designations indicating respective nozzle groups signify colors of ink. Subscript "D" indicates ink having a relatively high density, and subscript "L" indicates ink having a relatively low density. Subscript "D" of the group of yellow-ink nozzles $Y_D$ means that yellow ink ejected from the nozzle groups produces a gray color when mixed in equal amount with dark cyan ink and dark magenta ink. Subscript "D" of the group of black-ink nozzles $K_D$ means that black ink ejected from the nozzle group is not gray color but black color of 100% concentration.

A plurality of nozzles of respective nozzle groups are arranged in the subscanning direction SS. At the time of printing operation, ink droplets are ejected from the respective nozzles while the print head 36 is moved in the main scanning direction MS along with the carriage 38 (FIG. 23).

In this case, the light emitter 40a is a laser for emitting a light beam L having an outer diameter of about 1 mm or less; for example, a semiconductor laser. As shown in FIG. 27, the laser beam L is emitted in a direction inclined at an angle of about 26° with respect to the subscanning direction SS. The laser beam L is received by the light receiver 40b. In other words, the laser beam L is emitted in a direction inclined at an angle of about 26° with respect to the respective nozzle rows arranged in the subscanning direction SS.

Next, there will be described the principle of measurement of ejection velocity of a dot.

Figure 28:
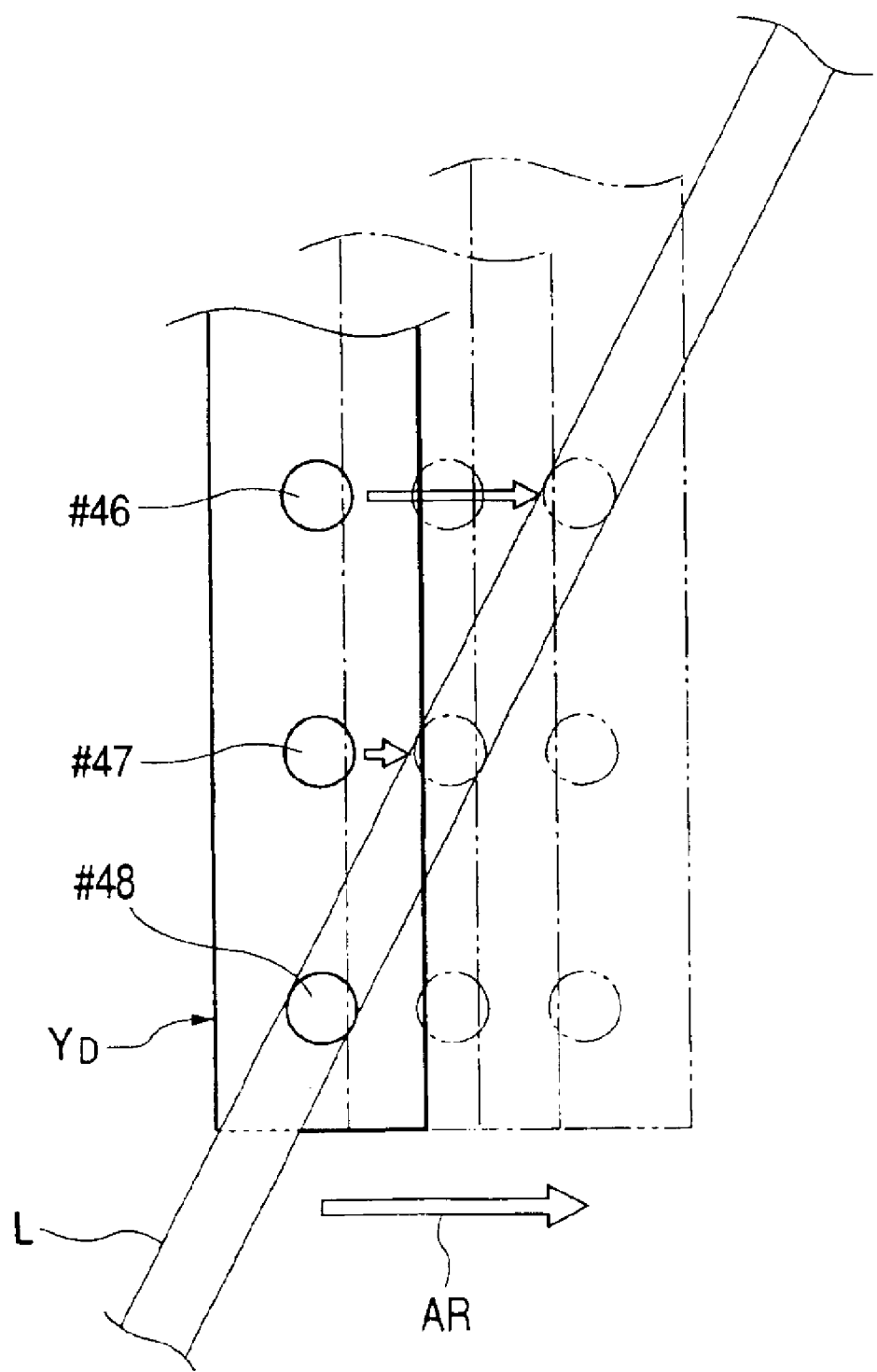
FIG. 28 is an enlarged descriptive view showing the principle of the measuring method.

FIG. 28 is an enlarged view showing the principle of a method of measuring the ejection velocity of an ink drop. At the time of measurement of ejection velocity of an ink drop, the print head 36 is moved at a constant velocity in the direction of an arrowhead AR in FIG. 27, thereby causing the group of nozzles to approach the laser beam L in order from the group of dark yellow-ink nozzles $Y_D$. At this time, as shown in FIG. 28, the laser beam L crosses (relatively) over nozzles in sequence of nozzle #48, nozzle #47, nozzle #46 . . . from the rear end of the group of dark yellow-ink nozzles $Y_D$ as the print head 36 is moved. Here, a group of one color of nozzles (i.e., a nozzle row) of the print head 6 is assumed to have 48 nozzles; that is, nozzle #1 through nozzle #48.

After having crossed nozzle #1 located at the leading end of the group of dark yellow-ink nozzles $Y_D$, the laser beam L crosses over respective nozzles in sequence of nozzle #48, nozzle #47, nozzle #46 . . . from the rear end of the group of light magenta-ink nozzles $M_L$. Similarly, as indicated by arrows a1 through a6 shown in FIG. 27, the laser beam L crosses (relatively) over nozzles one by one until the beam crosses nozzle #1 located at the leading end of the group of black-ink nozzles $K_D$.

An ink droplet ejection instruction is output to each of the nozzles for a given period of time including a timing at which an ink droplet crosses the laser beam L when the laser beam L crosses the trajectory of the ink droplet. Specifically, when a cross arises between an ink droplet passage space and an ink droplet detection space in a laser beam L, a plurality of ink droplets are ejected for a given period of time such that the ink droplets pass through both spaces.

Here, the expression "ink droplet detection space in a laser beam L" means a space in the optical path of a laser beam L, the path having an optical intensity per unit area to such that passage of an ink droplet can be detected. For simplicity, throughout the specification, the expression "ink droplet detection space in a laser beam L" is often described as a "laser beam L." Even in the drawings, the space is labeled simply as "L." Although the laser beam is used for light in the embodiment, even when light other than a laser beam is used, the expression "ink droplet detection space" can be defined as a space in the optical path of light originating from a light emitter, the space having optical intensity of given value or more per unit area.

Moreover, the expression "ink droplet passage space" signifies a "trajectory along which an ink droplet of predetermined size is ejected from a nozzle and passes through a space." In a state in which the "ink droplet passage space" and the "ink droplet detection space" of the laser beam L share a common space, if an ink droplet is ejected from a nozzle normally and within an expected range, the thus-ejected ink droplet crosses the ink droplet detection space of the laser beam L.

When an ejected ink droplet crosses the ink droplet detection space of the laser beam L along the way to a target, receipt of light by the light receiver 40b is temporarily interrupted or the quantity of received light becomes smaller than a predetermined threshold value. By utilization of such a phenomenon, the velocity of the ink droplet ejected from the nozzle can be measured.

As shown in FIGS. 19 and 20, the velocity measuring drive signal TS is sent to the print head 36 for actuating a corresponding nozzle while the latch signal LAT supplied at an appropriate controlled timing is taken as a trigger. In this case, a plurality of velocity measuring drive signals TS are supplied at given intervals.

When passing through the ink droplet passage space S, at least one of the ejected ink droplets interrupts the light. As a result, receipt of light performed by the light receiver 40b is interrupted, whereby the light receiver 40b outputs a pulse waveform P having a width corresponding to an interruption duration.

Preferably, the velocity calculator 114 derives x/t as the velocity of a droplet on the basis of a time "t" from a timing at which there is effected switching from the second gradient voltage section s3 to the second voltage holding section s4 to a timing at which a pulse waveform P rises, and a distance "x" between the nozzle orifice to the light trajectory L. When a plurality of ink droplets interrupt the light trajectory L, a mean value of ejection velocities is preferably calculated.

On the basis of the velocity of the ink droplet derived by the velocity calculator 114, the signal corrector 115 corrects the liquid jetting drive signal DS on the basis of the velocity of the ink droplet derived by the velocity calculator 114.

In this case, since a recording operation (liquid jetting operation) is performed while the nozzle orifice and the print paper PP against which an ink droplet ejected from the nozzle orifice impacts, the timing at which the drive signal DS is to be supplied can be corrected such that an ink droplet is ejected at an optimal timing during relative movement.

How to correct a supply timing is not limited to any particular way. For instance, there can be adopted a way in which a time period from when a latch signal is supplied until when the waveform of the drive signal DS rises is corrected.

In particular, if the waveform of the velocity measuring drive signal TS and the waveform of the liquid jetting drive signal DS are identical with each other or a correlation between ejection velocities defined by the waveforms has been ascertained beforehand, the timing at which the liquid jetting drive signal DS is to be supplied can be corrected with extremely high accuracy. As a result, chromatic deviation can be effectively prevented.

In this case, the timing at which the drive signal DS1 is to be supplied is corrected such that an ink droplet is ejected at an optimal timing when the print head 36 is moving in a forward direction MS1, while the timing at which the drive signal DS2 is to be supplied is corrected such that an ink droplet is ejected at an optimal timing when the print head 36 is moving in a return direction MS2.

As a result, occurrence of deviation of an impact position depending on the scanning direction can be prevented effectively.

In other words, the expression "ink droplet detection space" of the laser beam L signifies a space in the optical path of a laser beam L, the path having an optical intensity per unit area such that the light receiver 40b can detect a decrease in the quantity of light, which would otherwise arise when an ink droplet; i.e., an object of inspection, enters the space, to thereby interrupt light by an area corresponding to the projected area of the ink droplet.

As has been described, the velocities of ink droplets ejected from all the nozzles are measured until nozzle #1 provided at the front end of the group of black-ink nozzles $K_D$ passes the area located above the laser beam L.

Even when the print head 36 is actuated in any direction with respect to the main scanning direction, similar measurement operation can be effected. Here, the print head 36 is sent in the main scanning direction along the guide rails 34 while being towed on the carriage 38 (FIG. 23) by the traction belt 32 driven by the stepping motor 30. The print head 36 may be independently equipped with a head scan drive device for inspection purpose (measuring a velocity). Specifically, the printer may be equipped with a feed mechanism for changing a relative position between the nozzle and the inspector by moving at least one of them. If a device for effecting main scanning of the head during a printing operation and another device for effecting scanning action during an inspection operation are embodied by a single mechanism, the device can be made compact. If a device for effecting scanning operation during inspection is provided independently, the ejection velocity measuring device can be equipped with an optimal device suitable for the purpose of inspection, such as an inspection involving high positional accuracy.

There will now be described grouping of nozzles and ejection inspection to be performed on a per-inspection-group basis (measurement of an ejection velocity).

In the embodiment, nozzles provided in the print head 36 are divided into six inspection groups. Not all nozzles are subjected to sequential inspection of ejection of ink droplets. Nozzles are subjected to inspection of ejection on a per-inspection-group basis.

Figure 29:
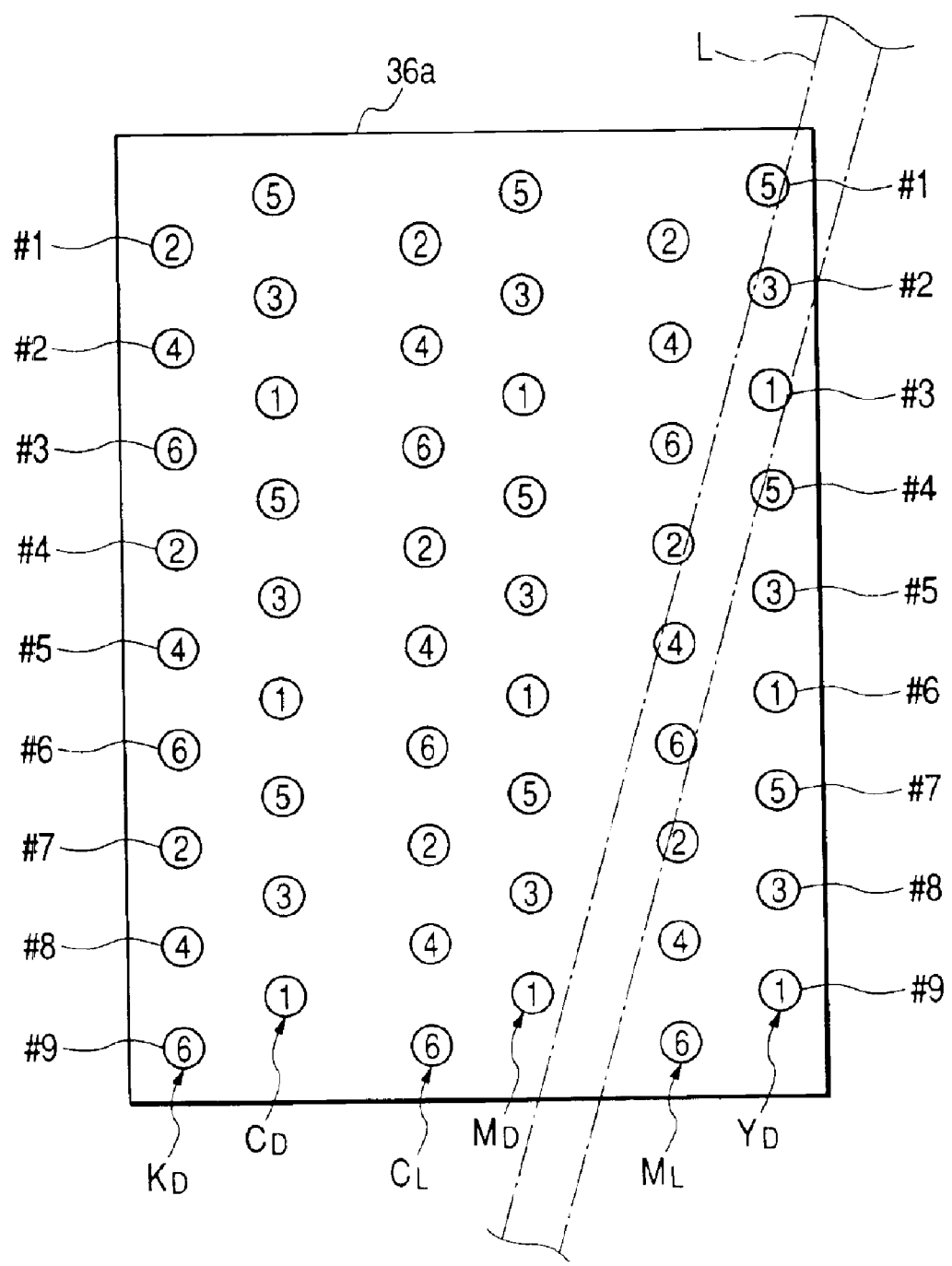
FIG. 29 is a descriptive view showing a state in which nozzles provided on a print head are divided into groups.

FIG. 29 is a descriptive view showing grouping of nozzles of a print head 36a. For the sake of simplicity, there will now be described grouping of nozzles with use of a print head 36a having six rows of nozzles, each nozzle row comprising nine nozzles, in lieu of the print head 36 having six rows of nozzles, each nozzle row comprising 48 nozzles. In FIG. 29, respective nozzles are assigned circled numbers 1 through 6 of an inspection group to which the nozzles pertain. The print head 36a is made different from the print head 36 by changing the number of nozzles provided in one row from 48 to nine. In other respects, the print head 36a is identical in configuration with the print head 36. When the print head 36a crosses the laser beam L by first actuating operation, nozzle #9 of the nozzle row $Y_D$ first crosses the laser beam L, as in the case of the foregoing case. Eventually, nozzle #1 of the nozzle row $K_D$ crosses the laser beam L. FIG. 29 is a descriptive view showing grouping of nozzles. Actual sizes are not reflected on a nozzle pitch and an interval between nozzle rows.

The nozzles in six rows, each row comprising nine nozzles, are divided into six groups, each group comprising nine nozzles. Specifically, a first inspection group comprises, among others, nozzles #9, #6 and #3 of the nozzle row $Y_D$, the nozzle row $M_D$, and the nozzle row $C_D$. A third inspection group comprises, among others, nozzles #8, #5 and #2 of the nozzle row $Y_D$, nozzle, the nozzle row $M_D$, and the nozzle row $C_D$. A fifth inspection group comprises, among others, nozzles #7, #4 and #1 of the nozzle row $Y_D$, the nozzle row $M_D$, and the nozzle row $C_D$. All nozzles belonging to the nozzle rows $Y_D$, $M_D$, $C_D$ belong to these inspection groups.

A second inspection group comprises, among others, nozzles #1, #4 and #7 of the nozzle row $K_D$, the nozzle row $C_L$, and the nozzle row $M_L$. A fourth inspection group comprises, among others, nozzles #2, #5 and #8 of the nozzle row $K_D$, the nozzle row $C_L$, and the nozzle row $M_L$. A sixth inspection group comprises, among others, nozzles #3, #6 and #9 of the nozzle row $K_D$, the nozzle row $C_L$, and the nozzle row $M_L$. All nozzles belonging to the nozzle rows $K_D$, $C_L$, $M_L$ belong to these inspection groups.

Even in the case of the print head 36 in which each row has 48 nozzles, each of inspection groups can be constituted by nozzles provided in every other nozzle row, such as $Y_D$, $M_D$, $C_D$ and $K_D$, $C_L$, $M_L$, and at every two positions in each nozzle row. In a forward travel path and a return path with respect to the main scanning direction, nozzles can be subjected to inspection of ejection of an ink droplet on a per-inspection-group basis.

By reference to FIG. 25, there will now be described a relationship between a forward travel path and a return path with respect to the main scanning direction and inspection of ejection of an ink droplet to be performed on a per-inspection-group basis. A laser beam has been emitted from the light emitter 40a toward the light receiver 40b beforehand in the space located above the waste ink receiver 46. For instance, if the print head 36 is transported to the area located above the waste ink receiver 46 after the first main scanning operation has been performed in the print region PR (i.e., the print head has traveled over a forward travel path), an instruction for ejecting ink droplets so as to cross the laser beam is issued to the nozzles belonging to the first inspection group. As mentioned previously, the ejection velocities of ink droplets are measured. Specifically, the velocities of ink droplets ejected from the nozzles of the first inspection group are measured. When the print head 36 again passes through the area located above the waste ink receiver 46 (i.e., when the print head travels along a return path), an instruction for ejecting ink droplets so as to cross the laser beam is issued to the nozzles belonging to the second inspection group, thereby measuring the ejection velocities of ink droplets. Specifically, the nozzles of the first inspection group and those of the second inspection group are subjected to an ink droplet ejection inspection during a round trip performed by the print head 36 through main scanning operation.

Subsequently, when the print head 36 has been transported back to the adjustment region AJ, nozzles of the third inspection group are subjected to ink droplet ejection velocity measurement. In a return path, nozzles of the fourth inspection group are subjected to ink droplet ejection velocity measurement. Similarly, nozzles of the fifth and sixth inspection groups are subjected to ejection velocity measurement.

Namely, each time the print head 36 is transported once in a forward travel path or return path with respect to the main scanning direction, nozzles of one inspection group are subjected to ink droplet ejection velocity measurement. When the print head 36 is traveled back and forth once with respect to the main scanning direction, nozzles of two inspection groups are subjected to ejection velocity measurement. When the print head 36 is transported back and forth three times, all nozzles provided on the print head 36 are subjected to ejection velocity measurement. Specifically, the operations are realized by the system controller (FIG. 24) controlling the carriage motor 30, the dot ejection inspector 40, and the print head 36 by way of respective drivers.

Figure 30:
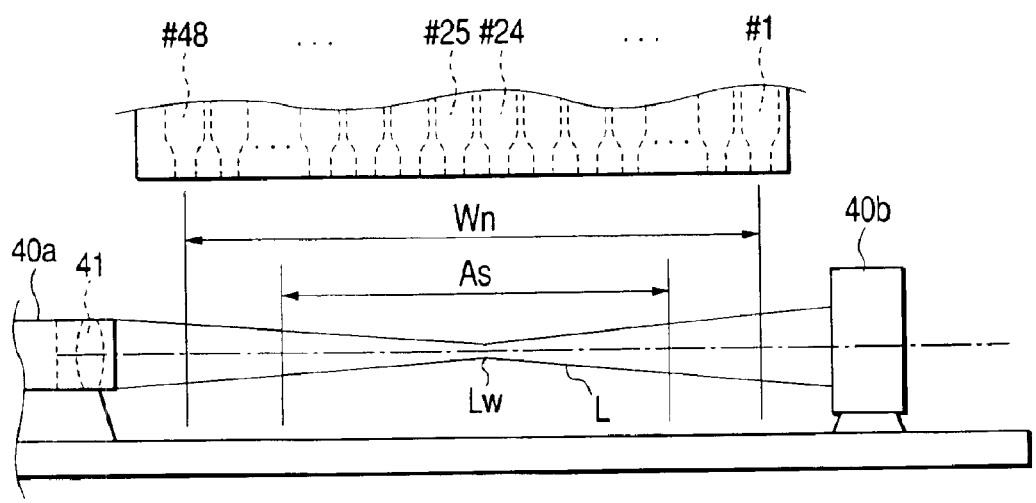
FIG. 30 is a descriptive view showing a change in the size of a laser beam when the beam is converged by only a lens.
Figure 31:
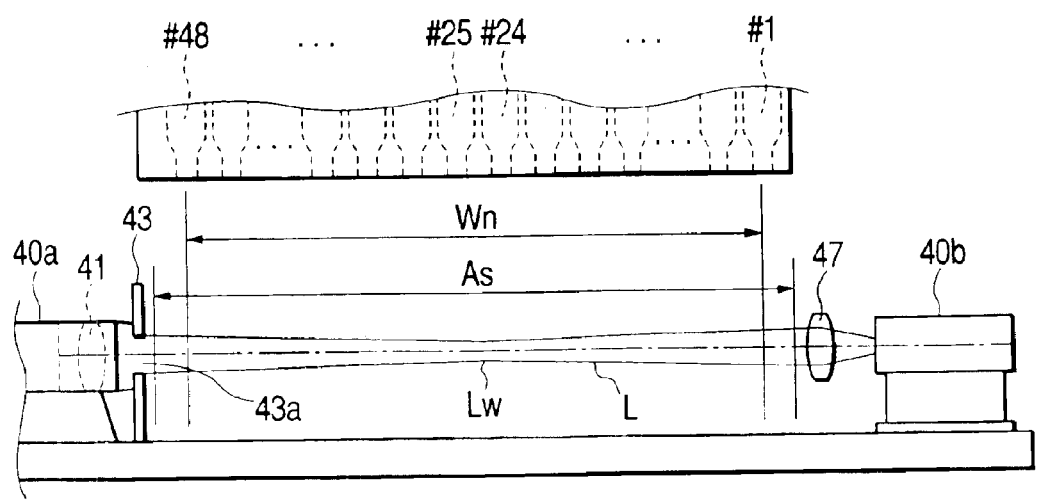
FIG. 31 is a descriptive view showing a change in the size of the laser beam.
Figure 32:
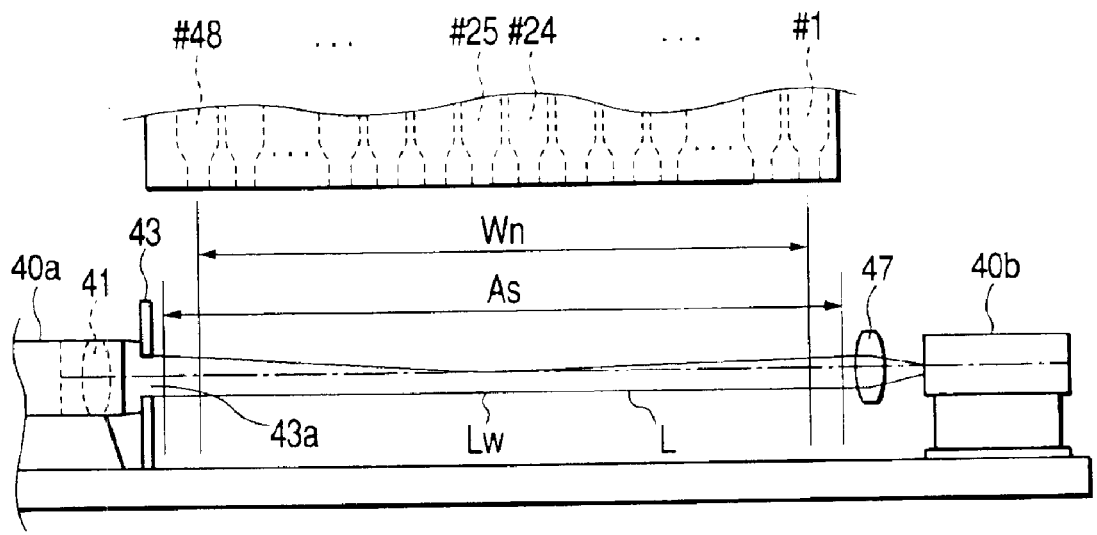
FIG. 32 is a descriptive view showing an optical path of the laser beam when the direction of the laser beam is offset from an expected direction.

FIG. 30 is a descriptive view showing a change in the size of the laser beam L when the laser is converged by use of only a lens. FIG. 31 is a descriptive view showing a change in the size of a laser beam according to the embodiment. Unlike the case shown in FIG. 30, in the embodiment the laser beam is not converged by use of only the lens. As shown in FIG. 32, the laser beam is converged even by the convergence aperture 43a formed in the shading plate 43. When having passed through the convergence aperture 43a, the laser beam becomes narrow (i.e., the marginal portion of the light trajectory is interrupted). Concurrently, an angle at which the laser beam is to be converged becomes shallow. In contrast with a case where the laser beam L is converged by use of only the lens 41 (see FIG. 30), the size of a beam waist Lw becomes larger. Consequently, a change in the diameter of the laser beam L in the axial direction becomes smaller than that arising in the case where the laser beam is converged by use of only the lens 41.

Resultantly, the laser beam becomes closer to a uniform beam with respect to the axial direction. For this reason, a difference between a requirement for inspecting a nozzle in the vicinity of the beam waist Lw and a requirement for inspecting a nozzle at a position spaced from the beam waist Lw becomes smaller than the case where the laser beam is converged by use of only a lens. Therefore, so long as an output of a laser beam from the light emitter 40a and an inspection gain of the light receiver 40b are adjusted appropriately, the ejection velocity of an ink droplet can be measured with smaller variation in the detection (measurement) accuracy of respective nozzles.

A light beam to be converged by a lens has a range As in which the laser beam can be utilized for measuring the velocity of an ink droplet within a predetermined range of a difference in inspection requirements. The range As is a predetermined range in the axial direction centered on the beam waist. The reason why such a range As is present is as follows:

A light beam has a given intensity profile which takes the optical axis as the maximum intensity, within a cross section perpendicular to the light beam. Under the requirement; that is, profile intensity "p" of the beam required for actually measuring the ejection velocity of an ink droplet, the size of a "range in which the profile intensity in the cross section of a light beam in the direction perpendicular to the optical axis assumes 'p' or more" becomes greater as the cross section approaches the beam waist Lw. Conversely, in a portion of a light beam of a laser beam distant from the beam waist Lw by a predetermined distance or more, the ink droplet detection space becomes too narrow and hence cannot be used for measuring the ejection velocity of an ink droplet.

For these reasons, a light beam to be converged by the lens has a range As in which the velocity of an ink droplet can be measured within a range of a difference existing in predetermined inspection requirements. In the embodiment, axial variations in an intensity profile in a cross section perpendicular to the optical axis are reduced by use of the convergence aperture 43a. As a result, the range As can be set widely by reducing the axial changes in the size of the ink droplet detection space.

More specifically, if variations in measurement accuracy in respective nozzles are reduced to substantially the same level as in the case where light is converged by use of only the lens 41, the range As that can be utilized for measuring the velocity of an ink droplet can be made wider in the embodiment shown in FIG. 31. Accordingly, the ejection velocities of ink droplets of a long nozzle row can be measured by use of a single laser beam. In FIGS. 30 and 31, Wn denotes a range in which nozzles to be inspected are present. In the embodiment shown in FIG. 31, the range As which can be utilized for measuring the velocity of an ink droplet becomes wider than the range Wn in which nozzles to be inspected are present.

The position of the beam waist is moved toward the light emitter 40a by diffraction of the light exiting the convergence aperture 43a. For this reason, the range As utilized for measuring the velocity of an ink droplet can be made close to the light emitter 40a. Hence, a distance between the light emitter 40a and the light receiver 40b can be made shorter. In short, the structure of the apparatus can be made more compact.

FIG. 32 is a descriptive view showing an optical path of a laser beam when an outgoing direction of the laser beam is deviated from an expected direction. In the embodiment, the laser beam is not received directly by the light receiver 40b but by way of a lens 47 having a light receiving region of predetermined area. Accordingly, even when the outgoing direction of the laser beam is deviated from an expected direction for reason of misalignment, the laser beam can be converged by the lens 47, unless a position against which the beam is to impact deviates from the light receiving range of the lens 47. Therefore, even if the laser beam has deviated slightly from an expected direction, the ejection velocity measurement function is not readily lost.

In the embodiment, the emitter-side shielding plates 45a, 45b, 45c, and 45d are provided between the region in which the print head 36 travels in the main scanning direction and the space in which the light emitter 40a, the lens 41, and the shading plate 43 are provided. The outer periphery of the space having the light emitter 40a, the lens 41, and the shading plate 43 provided therein, except for a portion of the space in which the emitter-side shielding plate is provided, is covered with the outer peripheral wall 40v, and an upper portion of the space is covered with an emitter-side ceiling plate. As a result, ink mist stemming from ejection of ink droplets tends not to adhere to the light emitter 40a, the lens 41, and the shading plate 43.

Similarly, the receiver-side shielding plates 49a, 49b are provided between the region in which the print head 36 travels in the main scanning direction and the space having the light receiving element 40 and the lens 47 provided therein. An upper portion of the space in which the light receiver 40b and the lens 41 are provided is covered with the receiver-side ceiling plate, and the remaining portion of the space is covered with the outer peripheral wall 40v. As a result, ink mist stemming from ejection of ink droplets tends not to adhere to the lens 47 and the light receiver 40b.

Since a plurality of shielding plates are provided, light having a superior rectilinear characteristic can pass through the apertures 45a1, 45b1, 45c1, 45d1, 49a1, and 49b1. The ink mist conveyed by an air current falls between the shielding plates or adheres to the shielding plates, thus failing to pass through the apertures. Accordingly, there is only a small chance of deterioration of performance of optical system equipment, which would otherwise be caused by ink mist, and hence the ejection velocity of an ink droplet can be measured with stable accuracy over a long period of time.

Figure 33:
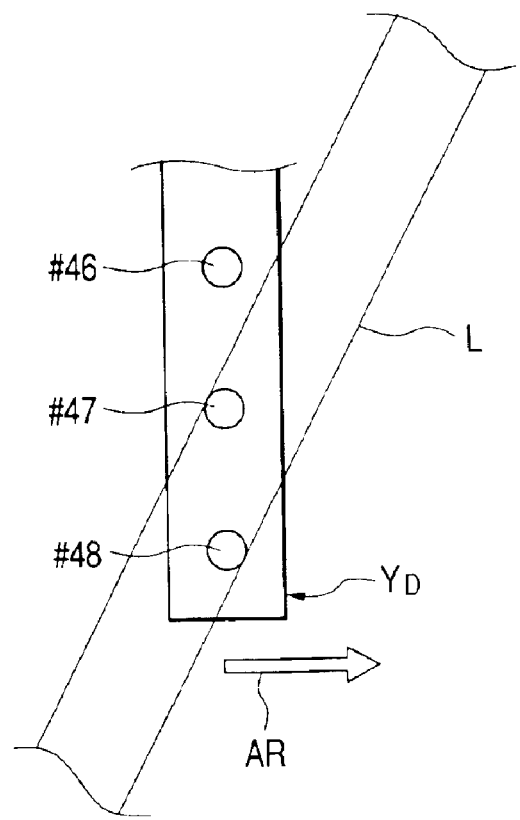
FIG. 33 is descriptive view showing a relationship between an optical path of a laser beam and the nozzles.

FIG. 33 is a descriptive view showing a relationship between the ink droplet detection space of the laser beam L and nozzles. In the embodiment, each of inspection groups is constituted of nozzles provided in every other nozzle row and at every two positions in each nozzle row. In a forward travel path or return path with respect to the main scanning direction, ejection velocities of ink droplets are measured on a per-inspection-group basis. Hence, when compared with a case where all nozzles provided in the print head are to be measured, nozzles which constitute one inspection group and are located closest to each other are spaced by a threefold distance in a nozzle-row direction and a twofold distance between the nozzle rows. Therefore, the ink droplet passage spaces of two or more nozzles to be measured simultaneously cross the ink droplet detection space, as shown in FIG. 33, and hence there is little probability of ink droplets ejected from respective nozzles being mixed during measurement of ejection velocity of an ink droplet. Therefore, there is little probability of deterioration of measurement accuracy of velocity of an ink droplet, which would otherwise be caused by influence of an ink droplet ejected from another nozzle.

The foregoing effect will now be described specifically by use of an example of the print head 36a. For instance, a state shown in FIG. 29 shows inspection of nozzle #3 of the nozzle row $Y_D$. FIG. 29 shows that an intersection exists between the ink droplet passage space of nozzle #3 of the nozzle row $Y_D$ pertaining to the first inspection group and the ink droplet detection space L of the laser beam. The ink droplet passage space of nozzle #6 of the nozzle row $Y_D$ which crosses the ink droplet detection space L before nozzle #3 does not cross the ink droplet detection space L. Moreover, nozzle #9 of the nozzle row $M_D$ which crosses the ink droplet inspection space L after the nozzle #3 also does not cross the ink droplet detection space L. Hence, an ink droplet ejected from nozzle #6 of the nozzle row YD and an ink droplet ejected from nozzle #3 of the nozzle row YD, which are continuously subjected to ejection inspection in the first inspection group, and an ink droplet ejected from nozzle #9 of the nozzle row MD are not mixed during measurement of ejection velocity. In FIG. 29, nozzles included in the laser beam L indicated by a dashed line are assumed to cross the ink droplet detection space of the laser beam and the ink droplet passage space.

As the inclination of the laser beam with reference to a direction in which the nozzle rows are arranged (i.e., a subscanning direction), the shadow of the range As which can be used for detecting an ink droplet becomes shorter in the direction in which the nozzle rows are arranged. For this reason, when the inclination of the laser beam with reference to the direction in which the nozzle rows are arranged is small, even a laser beam which can cause all the nozzles of the nozzle rows to fall within the range As fails to cause all the nozzles in the nozzle rows to fall into the range As if the inclination of the laser beam relative to the direction in which the nozzles are arranged is large. For this reason, under the condition that a constant laser beam is used, the inclination of the laser beam with reference to the direction in which the nozzle rows are arranged is preferably small to such an extent that all nozzles of the nozzle rows can be caused to fall within the range As.

However, if the inclination of the laser beam with reference to the direction in which the nozzle rows are arranged is small, the ink droplet detection space of the laser beam and ink droplet passage spaces of a plurality of ink droplets cross each other simultaneously. As a result, the possibility of ink droplets being mixed during measurement of ejection velocity of an ink droplet is increased. For this reason, in order to cause all the nozzles provided in the nozzle rows to fall within the range As and prevent mixing of ink droplets during measurement of the ejection velocity of an ink droplet, reducing inclination of a laser beam and subjecting nozzles to ink droplet ejection velocity measurement on a per-inspection-group basis, such as that described in connection with the embodiment, are very effective. However, if the inclination of the laser beam is made small, the number of inspection groups must be increased to prevent mixing of ink droplets of respective nozzles. Consequently, the time required for measuring ejection velocities of respective nozzles becomes longer. Therefore, the inclination of the laser beam with reference to the direction in which nozzle rows are arranged preferably ranges from 20° to 35°, more preferably 23° to 30°.

In the embodiment, a laser beam has been employed as light to be used for measuring the ejection velocity of an ink droplet. However, the light which can be used for measuring an ejection velocity is not limited to a laser beam. For instance, light of a light-emitting diode may be used through convergence. In other words, any mode may be employed, so long as the mode has a light emitter for emitting light and a light receiving element for receiving the light and enables measurement of an ejection velocity, by utilization of whether or not light is interrupted by an ink droplet ejected from an ink droplet.

The member to be used for partitioning the region in which ink droplets are to be ejected from the light emitter 40a, the lens 41, and the shading plate 43 is not limited to a plate-like wall or a ceiling plate to be provided around the light emitter 40a, the lens 41, and the shielding plate 43. For example, the partition member may be a dome-shaped wall for converging an entire area around the light emitter 40a, the lens 41, and the shading plate 43.

The member for partitioning the region in which ink droplets are to be ejected, the light emitter 40a, the lens 41, and the shading plate 43 may be formed from a thin wall. More specifically, the partition member may be embodied as having any thickness or shape, so long as the member is provided in at least a direction in which the light having passed through the convergence aperture 43a travels, and interrupts a region in which a nozzle ejects an ink droplet toward the optical path of laser and a region in which the lens 41 and the shading plate 43 are provided, if an aperture enabling passage of at least portion of light is provided in the direction in which a laser beam exists. The same also applies to the member for partitioning a region in which ink droplets are ejected from the lens 47 and the light receiver 40b.

Figure 34:
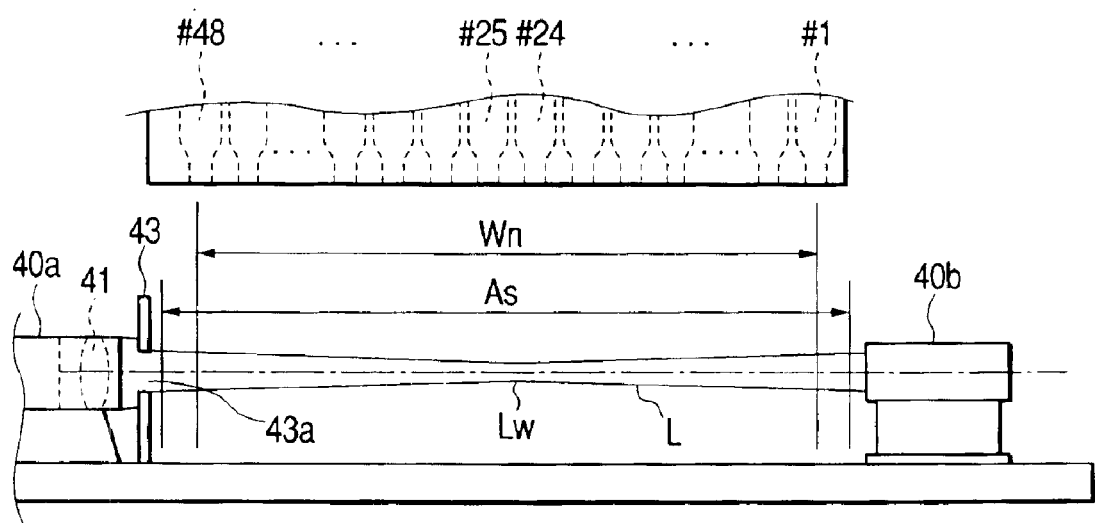
FIG. 34 is a descriptive view showing a liquid jetting apparatus according to an eleventh embodiment of the invention.

FIG. 34 is a descriptive view showing a liquid ejection device according to an eleventh embodiment. In this embodiment, the receiver-side lens 47 is not provided. In other respects, the eleventh embodiment is identical with that described in connection with the tenth embodiment. Even in the case of such a configuration, the laser beam is converged by the convergence aperture 43a in the same manner as in the tenth embodiment. Hence, when compared with a case where a laser beam is converted by use of only a lens, changes in the size of an ink droplet detection space can be made small, thereby reducing a difference in inspection requirements.

Here, nozzles constituting each inspection group are not limited to nozzles provided in every other nozzle row and at every two positions in each nozzle row. More specifically, each inspection group can be constituted of nozzles periodically selected at one every "n" ("n" is an integer of two or more) nozzles in a nozzle row. Each inspection group can also be constituted of nozzles periodically selected at one every "m" ("m" is an integer of two or more) nozzle rows.

Here, "n" and "m" are set to appropriate values in accordance with a nozzle pitch, an interval between nozzle rows, the shape of an ink droplet detection space, and the orientation of an optical axis. If only nozzles of one inspection group are taken as objects of measurement in one scanning operation, there can be prevented interference between the ink droplet detection space of the laser beam L and the paths of ink droplets ejected from a plurality of nozzles (i.e., a passage space). If the ink droplet detection space of the laser beam does not simultaneously cross ink droplet passage spaces of a plurality of nozzles, there is no necessity of measuring the ejection velocity of an ink droplet on a per-nozzle-group basis by dividing the nozzles on the print head into nozzle groups.

Figure 35:
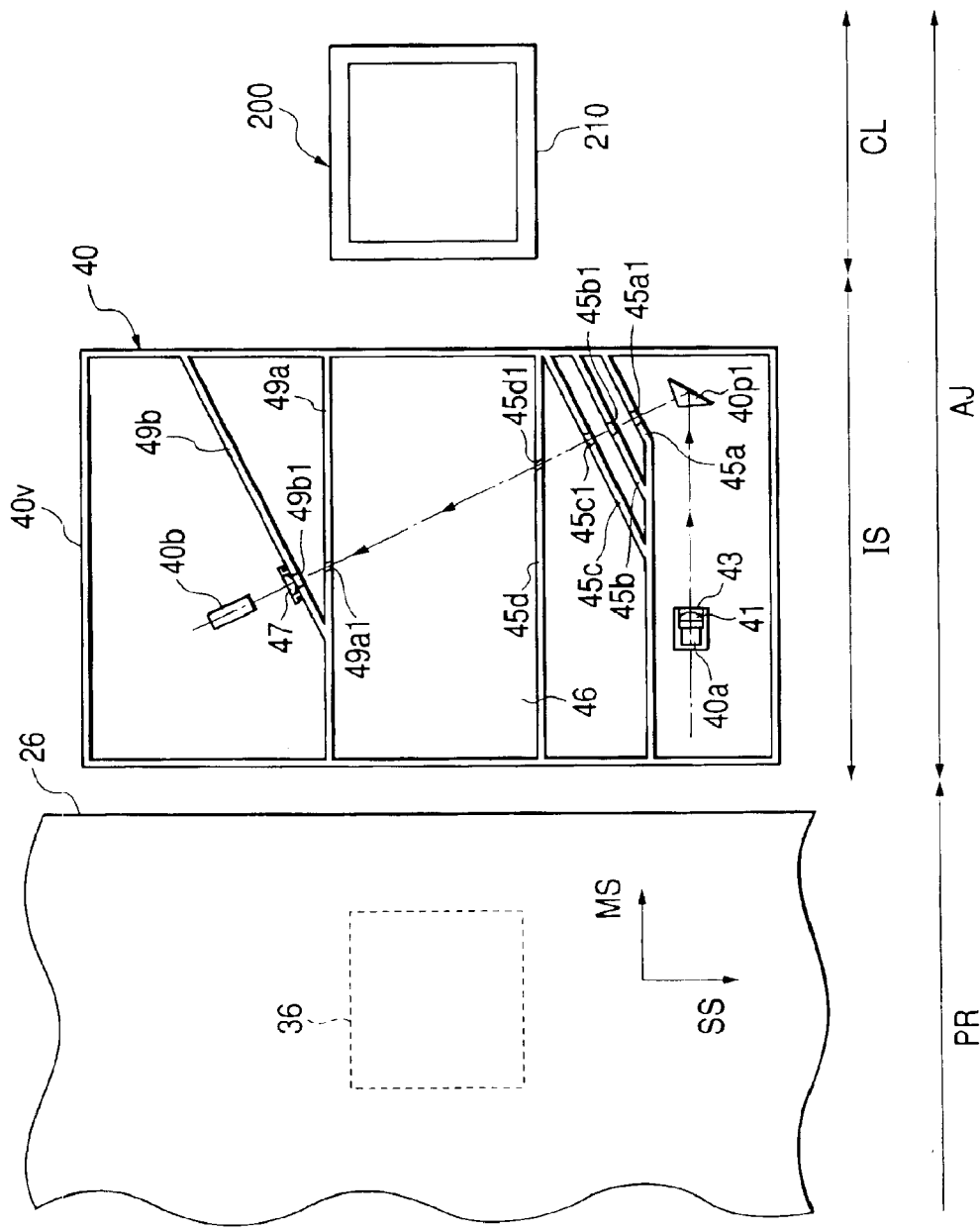
FIG. 35 is a descriptive view showing a liquid jetting apparatus according to a twelfth embodiment of the invention.

FIG. 35 is a descriptive view showing an liquid ejection device according to a twelfth embodiment of the invention. In the case of the embodiment, a prism 40p1 is disposed at the position where the light emitter 40a, the lens 41, and the shading plate 43 are disposed in the tenth embodiment. The light emitter 40a, the lens 41, and the shading plate 43 are disposed at predetermined positions close to the platen plate 26 rather than to the prism 40p1. In other respects, the liquid ejection device is identical with that described in connection with the tenth embodiment. A laser beam is emitted from the light emitter 40a, passes through the lens 41 and the convergence aperture 43a of the shading plate 43, reflected by the prism 40p1 and reaches the light receiver 40b. A process during which the laser beam reaches the light receiver 40b after having been reflected from the prism 40p1 is substantially the same as that described in connection with the tenth embodiment.

In relation to the laser beam to be converged by a lens, in order to reduce variations in optical intensity profile in an optical path (hereinafter called an "inspection optical path") in the direction of an optical axis to be used for measuring the ejection velocity of an ink droplet, an optical path length between the light emitter 40a and the inspection optical path is preferably long. If the distance between the light emitter 40a and a beam waist provided in the inspection optical path becomes longer, variations in intensity profile per unit length in the direction of an optical axis become smaller.

In the embodiment, the laser beam is reflected by the prism 40p1, thereby deflecting an optical path. Variations in optical intensity profile in the inspection optical path in the direction of an optical axis are smaller than those arising in the tenth embodiment. Concurrently, upsizing of the liquid jetting apparatus, which would otherwise be caused in association with an increase in the optical path length, is prevented by deflecting an optical path. Any material may be employed as the prism 40p1, so long as the prism can reflect a laser beam. For instance, the prism 40p1 may be embodied as a mirror formed by depositing aluminum on a transparent substrate.

Figure 36:
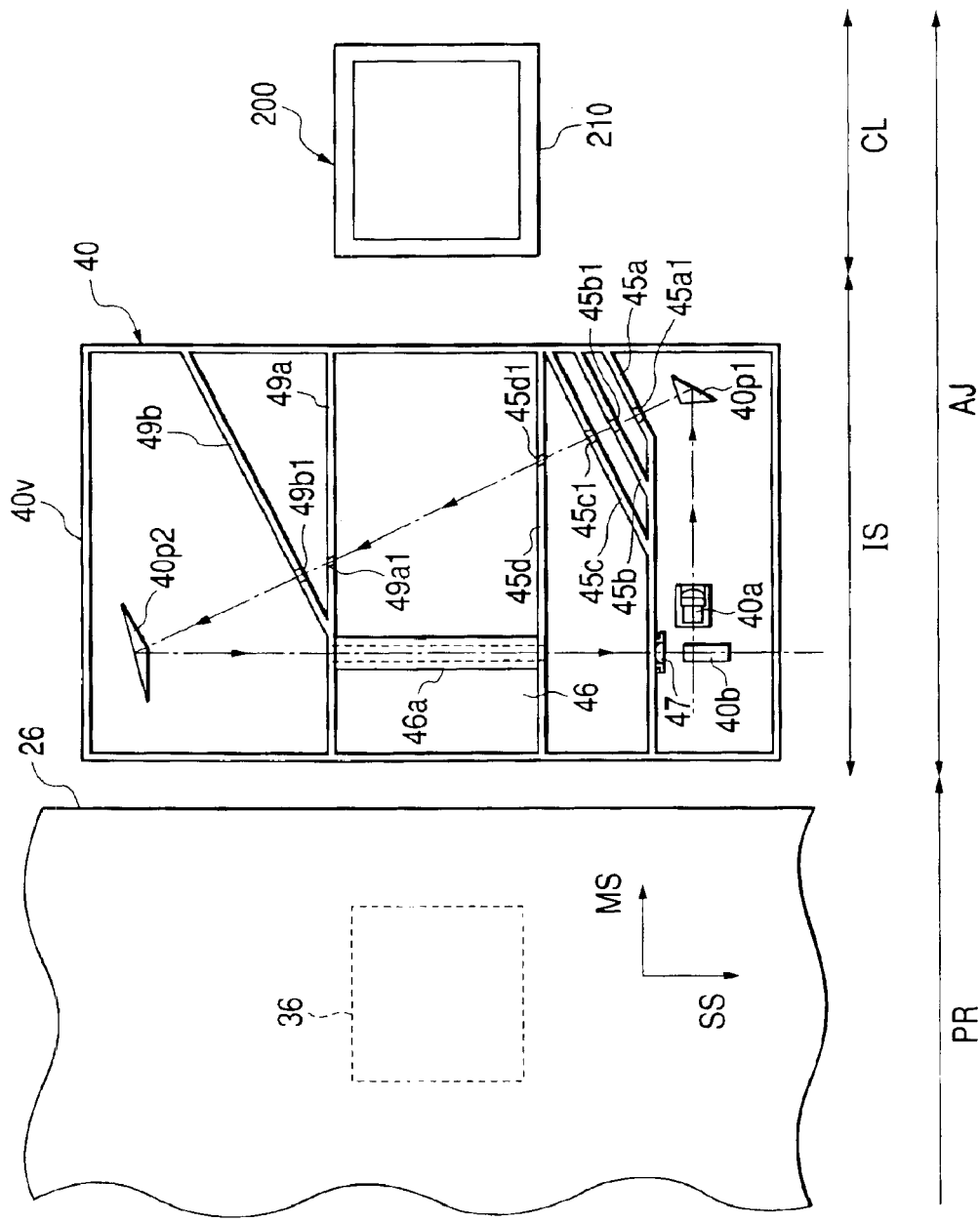
FIG. 36 is a descriptive view showing a liquid jetting apparatus according to a thirteenth embodiment of the invention.

FIG. 36 is a descriptive view showing liquid jetting according to a thirteenth embodiment of the invention. In the embodiment, the light emitter 40a, the lens 41, the shading plate 43, and the prism 40p1 are disposed in the same manner as in the case of the twelfth embodiment. Here, a light receiver 40b and a lens 47 are disposed on the same side as that of the light emitter 40a and close to the same with respect to the first shielding plate 45a. A prism 40p2 is disposed in the position where the light receiver 40b is disposed in the tenth and twelfth embodiments. Further, in the waste ink receiver 46, a protective tube 46a in which a laser beam passes is provided on a line connecting the prism 40p2 and the light receiver 40b.

In the embodiment, a process in which the laser beam is emitted from the light emitter 40a and the thus-emitted beam reaches the area located above the waste ink receiver 46 is substantially the same as that described in connection with the twelfth embodiment. After having passed through the area located above the waste ink receiver 46, the laser beam is reflected from the prism 40p2 and reaches the lens 47 and the light receiver 40b by way of a protective tube 46a. By such a configuration, the light emitter 40a and the light receiver 40b can be disposed closely to each other. Hence, the light emitter 40a and the light receiver 40b can be formed on a single substrate.

Figure 37:
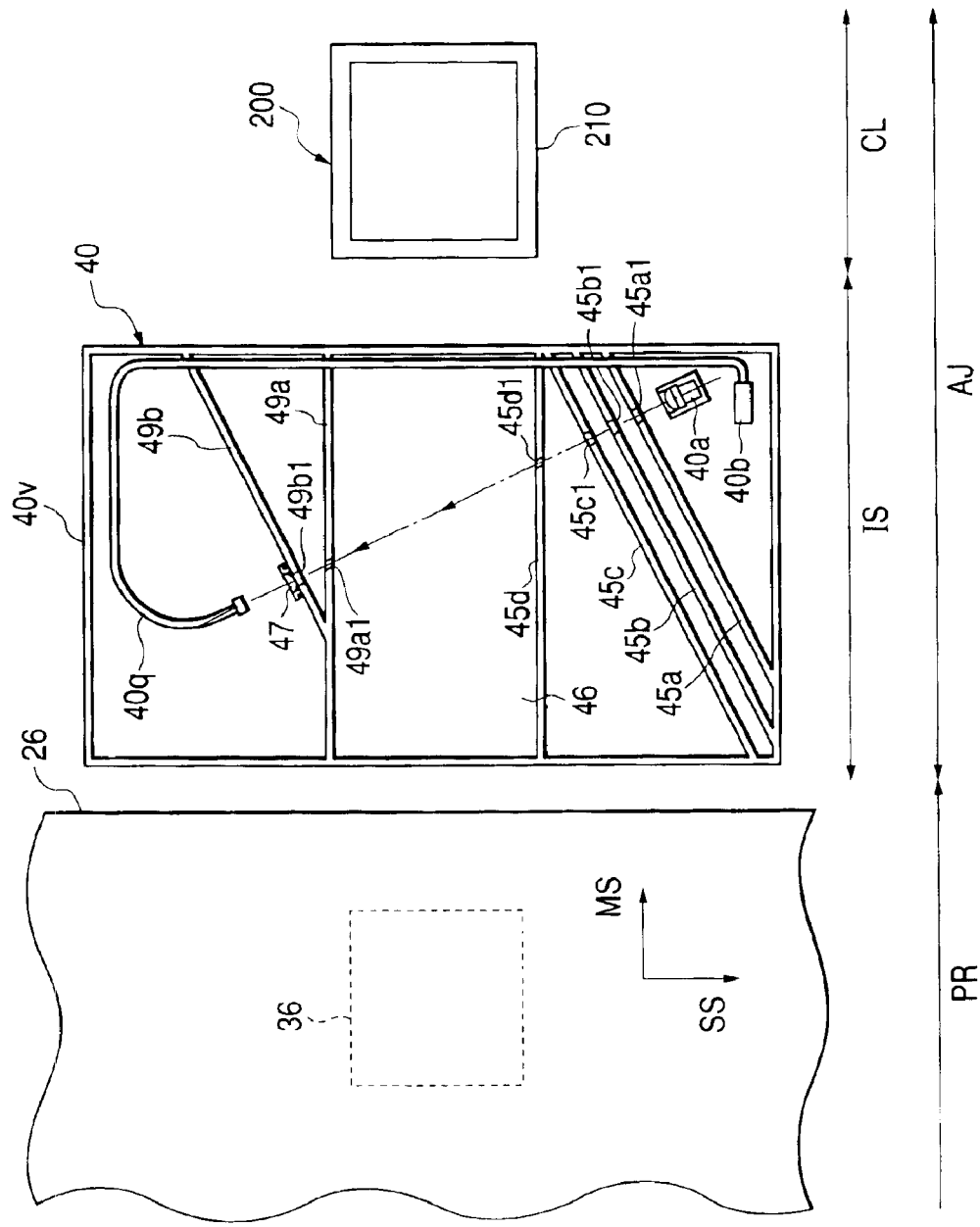
FIG. 37 is a descriptive view showing a liquid jetting apparatus according to a fourteenth embodiment of the invention.

FIG. 37 is a descriptive view showing a liquid jetting apparatus according to a fourteenth embodiment of the invention. Here, the light receiver 40b is disposed on the same side as the light emitter 40a and close to the same with respect to the first shielding plate 45a. Further, there is provided an optical fiber 40q stretching from the back of the lens 47 to the light receiver 40b. In other respects, the liquid jetting apparatus is identical with that described in connection with the tenth embodiment.

By such a configuration, the light emitter 40a and the light receiver 40b can be disposed closely to each other. Further, the light emitter 40a and the light receiver 40b can be formed on a single substrate. Since reflection of light, which would be caused by a prism or mirror, is not utilized, the accuracy of receipt of a laser beam performed by the light receiver 40b is not affected. In the embodiment, the optical fiber 40q readily, accurately leads a laser beam to the light receiver 40b which is disposed in close proximity to the light emitter 40a and is not located in a direction in which the laser beam emitted from the light emitter 40a travels.

Figure 38:
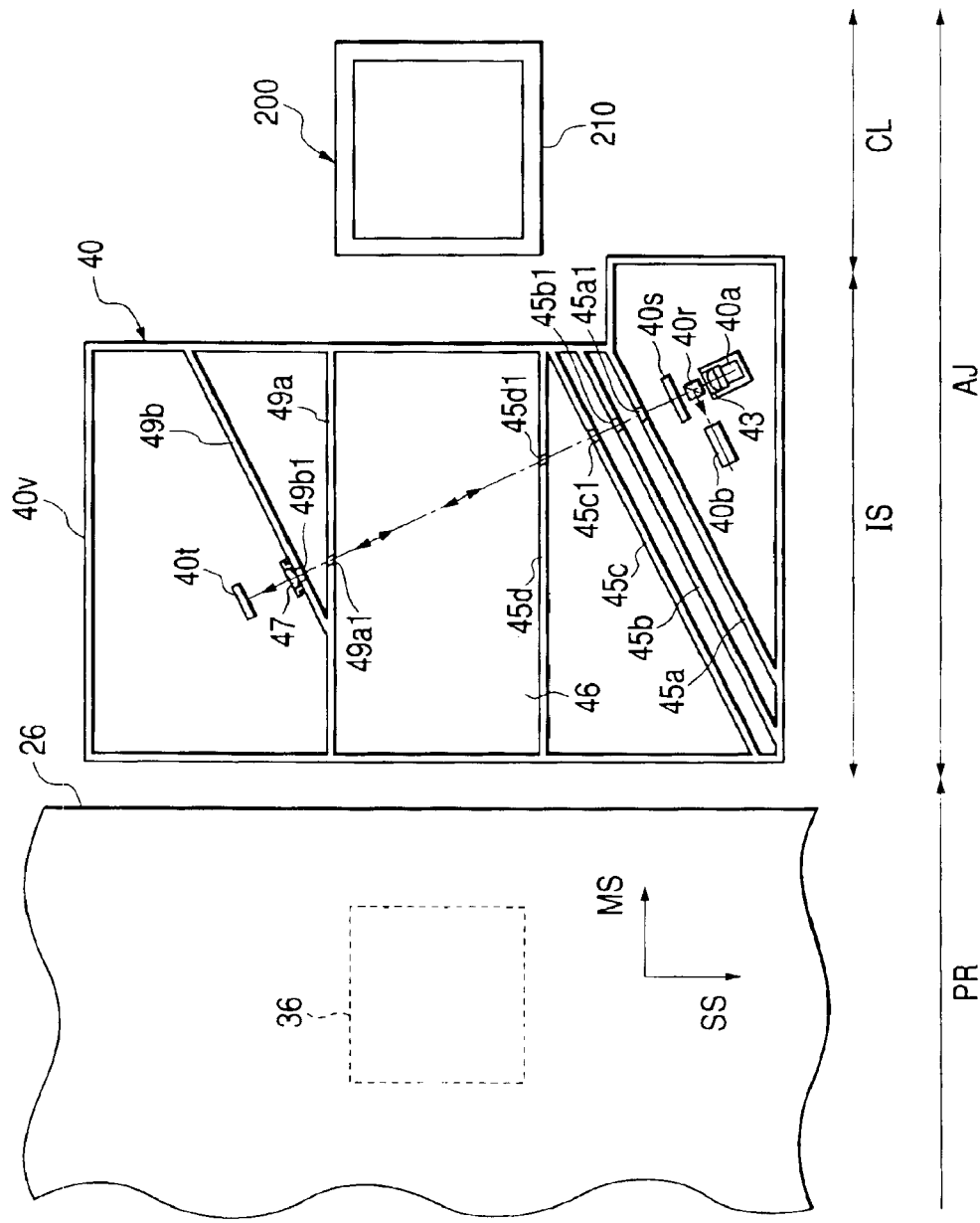
FIG. 38 is a descriptive view showing a liquid jetting apparatus according to a fifteenth embodiment of the invention.

FIG. 38 is a descriptive view showing a liquid jetting apparatus according to a fifteenth embodiment of the invention. Here, a beam splitter 40r and a quarter wavelength plate 40s are disposed in that order between the light emitter 40a and the first shielding plate 45a in a direction in which a laser beam travels. The beam splitter 40r has a polarized-light separation film and is arranged such that the polarized-light separation film makes an angle of 45° with respect to an optical axis of the laser beam. The light receiver 40b is provided on the same side as the light emitter 40a with respect to the first shielding plate 45a and at a predetermined position from the polarized-light separation film of the beam splitter 40r and in a direction of 90° with respect to the optical axis of the laser beam. In the tenth embodiment, a mirror 40t is disposed at the position where the light receiver 40b is disposed in the tenth embodiment. In other respects, the liquid jetting apparatus is identical with that described in connection with the tenth embodiment.

In the embodiment, the laser beam that has been emitted from the light emitter 40a passes through the beam splitter 40r by way of the lens 41 and the shading plate 43. The laser beam having passed through the beam splitter 40r is formed from only a polarization component. The laser beam passes through the quarter wavelength plate 40s and is converted into circularly-polarized light. The laser beam is reflected from a mirror 40t and again passes through the quarter wavelength plate 40s. At that time, the laser beam becomes linearly-polarized light whose plane of polarization differs 90° from incident light. Subsequently, when the laser beam reaches the beam splitter 40r, the laser beam fails to pass through the polarized-light separation film and is reflected by the same. As a result, the thus-reflected laser beam travels toward and is received by the light receiver 40b.

By such a configuration, the light emitter 40a, the light receiver 40b, the beam splitter 40r, and the quarter wavelength plate 40s can be provided collectively in the region where the ejection velocity of an ink droplet is to be measured (i.e., the area located above the waste ink receiver 46).

Figure 39:
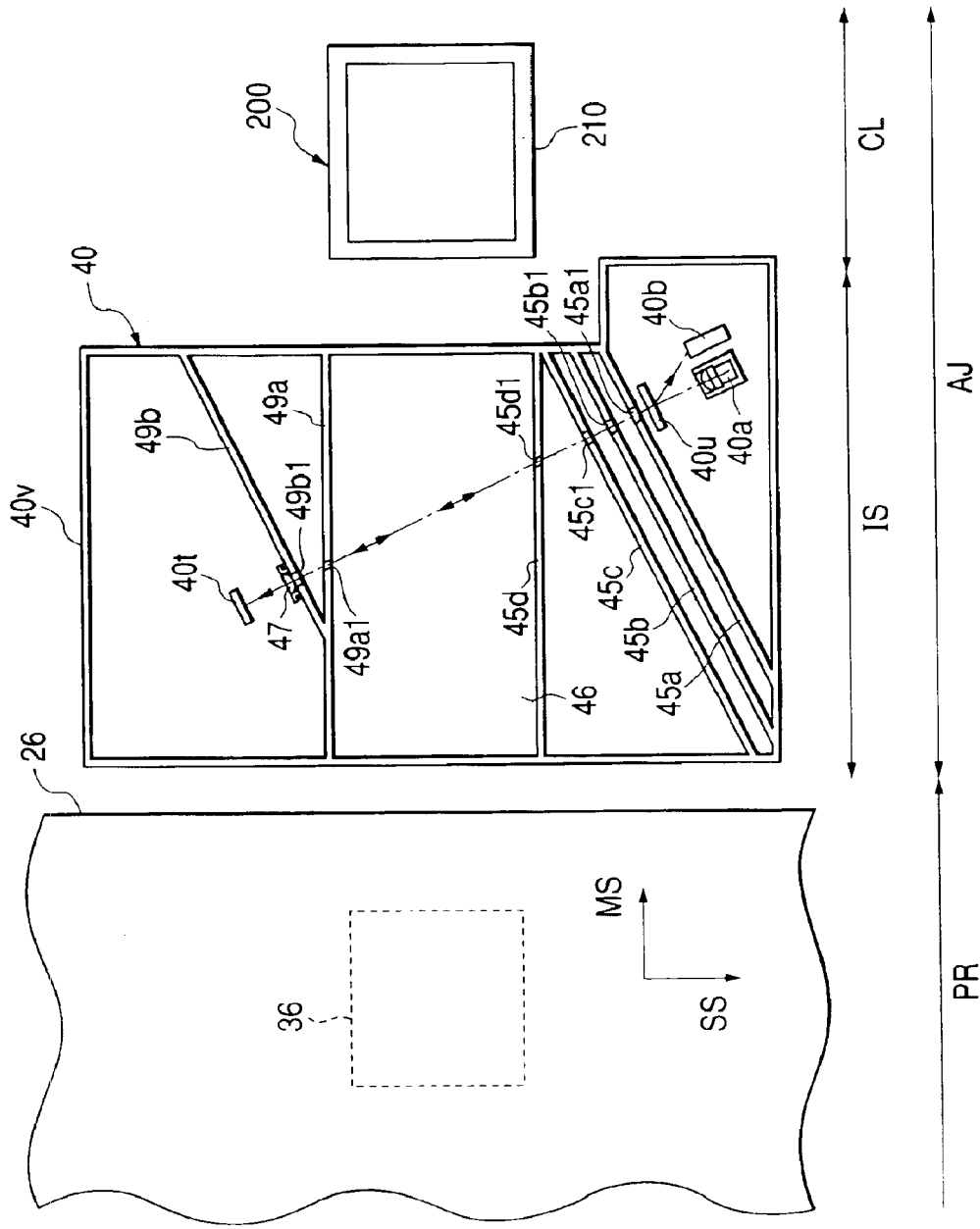
FIG. 39 is a descriptive view showing a liquid jetting apparatus according to a sixteenth embodiment of the invention.

FIG. 39 is a descriptive view showing a liquid jetting apparatus according to a sixteenth embodiment of the invention. Here, a hologram 40u is placed at the position of the beam splitter 40r and that of the quarter wavelength plate 40s, which are employed in the fifteenth embodiment, in lieu of the beam splitter 40r and the quarter wavelength plate 40s. The light receiver 40b is provided on the same side as the light emitter 40a with respect to the first shielding plate 45a and close to the same. In other respects, the liquid jetting apparatus is identical in configuration with that described in connection with the fifteenth embodiment.

In the embodiment, a process (a laser beam is emitted from the light emitter 40a, passes through the aperture 45a1 formed in the first shielding plate 45a, the aperture 45b1 formed in the first shielding plate 45b, and the aperture 45c1 formed in the first shielding plate 45c, is reflected by the mirror 40t, and again reaches the aperture 45a1 of the first shielding plate 45a) is the same as that described in connection with the fifteenth embodiment. The laser beam then reaches the hologram 40u. The hologram 40u permits passage of the laser beam reflected from the mirror 40t by deflecting the laser beam at a predetermined angle within an angle of 90° or less with respect to the direction in which the laser beam is to travel. Consequently, the laser beam that has been reflected form the mirror 40t is received by the light receiver 40b disposed closely to the light emitter 40a. The light emitter 40a, the light receiver 40b, and the hologram 40u are usually distributed in the form of a single "hologram laser." More specifically, if a hologram laser is used in the embodiment, the structure of an inspector can be made simple, thereby diminishing the number of parts.

Figure 40:
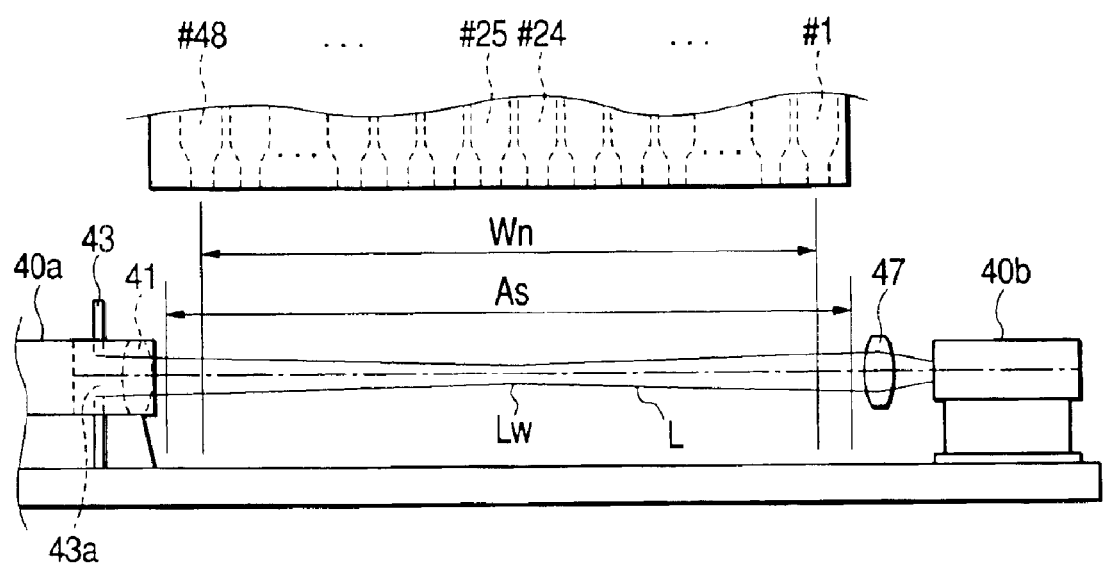
FIG. 40 is a descriptive view showing the layout of a shading plate and a lens in the liquid jetting apparatus according to a seventeenth embodiment of the invention.

FIG. 40 is a descriptive view showing a layout of the shading plate 43 and the lens 41 in a liquid jetting apparatus according to a seventeenth embodiment of the invention. In the above embodiments, the lens 41 is interposed between the light emitter 40a and the shading plate 43. However, as shown in FIG. 40, a shading plate 43 may be interposed between the light emitter 40a and the lens 41.

Although the embodiments of the invention have been described, the invention can be implemented in various forms within the scope of the invention. For instance, drive signals DS may be corrected on a per-nozzle-row basis in place of the drive signals DS being corrected on a per-nozzle basis.

The liquid jetting apparatus is not limited to a color printer and may be embodied as a monochrome printer. Alternatively, the liquid jetting apparatus may be a coloring material jetting apparatus to be used for manufacturing a color filter of a liquid-crystal display, an organic EL display, an electrode material jetting apparatus to be used for manufacturing electrodes such as FEDs or a bio-organic substance jetting apparatus to be used for manufacturing bio-chips. A glue or nail polish as well as ink may be used as liquid.

What is claimed is:

1. A liquid ejection apparatus comprising:
   a liquid ejection head, provided with a plurality of nozzle orifices each of which is communicated with a pressure chamber, and associated with an actuator which generates pressure fluctuations in liquid contained in the pressure chamber to eject a liquid droplet therefrom;
   a driver, which generates a drive signal to drive the actuator to eject a plurality of liquid droplets from each of the nozzle orifices;

a carriages, which carries the liquid ejection head in a first direction;

a first regions, at which the liquid ejection head ejects at least one of the liquid droplets with respect to a target member, a second region, adjacent to the first region in the first direction;

a photo emitter, which emits a light beam so as to intersect a space through which at least another one of the liquid droplets passes, the photo emitter being disposed in the second region;

a photo receiver, which receives the light beam which has been passed through the space, the photo receiver being disposed in the second region; and a calculator, which calculates an ejection velocity of the liquid droplet based on a timing at which the actuator is driven and a change in a photo-receiving state of the photo receiver, wherein:

the nozzle orifices are arranged so as to form a plurality of nozzle arrays;

the light beam diagonally intersects the space relative to the first direction, so as to oppose to plural of the nozzle orifices in plural of the nozzle arrays simultaneously;

the nozzle orifices are divided into a plurality of groups so that nozzle orifices belonging to the same group are subjected to the ejection velocity calculation during a single scanning operation of the carriage in the first direction; and the nozzle orifices simultaneously opposing to the light beam include only one nozzle orifice for each of the groups.

2. The apparatus as set forth in claim 1, wherein the change in the photo-receiving state is so configured that a reception of the light beam in the photo receiver is interrupted when the liquid droplets intersects the light beam.

3. The apparatus as set forth in claim 2, wherein the photo receiver generates a pulse signal having a pulse width corresponding to a time period during which the reception of the light beam is interrupted.

4. The apparatus as set forth in claim 3, wherein the calculator calculates the ejection velocity based on the timing at which the actuator is driven and a timing of an initial edge of the pulse signal.

5. The apparatus as set forth in claim 3, wherein the calculator calculates the ejection velocity based on the timing at which the actuator is driven and a timing of a center portion the pulse width.

6. The apparatus as set forth in claim 1, further comprising a position adjuster, which adjusts a distance between the nozzle orifice and the light beam.

7. The apparatus as set forth in claim 6, wherein:

the position adjuster provides a first distance and a second distance;

the driver drives the actuator each of when the first distance is provided and when the second distance is provided; and the calculator calculates the ejection velocity based on a change in a photo-receiving state of the photo receiver when the first distance is provided and a change in a photo-receiving state of the photo receiver when the second distance is provided.

8. The apparatus as set forth in claim 1, further comprising a shutter disposed between the photo emitter and the space to prevent liquid mist from going to the photo emitter.

9. The apparatus as set forth in claim 1, further comprising a shutter disposed between the photo receiver and the space to prevent liquid mist from going to the photo receiver.

10. The apparatus as set forth in claim 1, wherein the photo emitter is provided with a semiconductor laser.

11. The apparatus as set forth in claim 1, wherein the photo receiver is provided with a photo diode.

12. The apparatus as set forth in claim 1, wherein:

the photo emitter includes a first photo emitter, which emits a first light beam so as to intersect a first space which is away from one of the plurality of nozzle orifices at a first distance, and a second photo emitter, which emits a second light beam so as to intersect a second space which is away from the one of the plurality of nozzle orifices at a second distance;

the photo receiver includes a first photo receiver, which receives the first light beam which has been passed through the first space, and a second photo receiver, which receives the second light beam which has been passed through the second space; and the calculator calculates the ejection velocity based on a change in a photo-receiving state of the first photo receiver and a change in a photo-receiving state of the second photo receiver.

13. The apparatus as set forth in claim 1, wherein the liquid is ink containing a coloring material.

14. The apparatus as set forth in claim 3, wherein the calculator calculates the ejection velocity based on the pulse width of the pulse signal.

15. The apparatus as set forth in claim 14, wherein the calculator calculates the ejection velocity based on a pulse signal having the largest pulse width among pulse signals obtained within a predetermined time period.

16. The apparatus as set forth in claim 1, wherein:

the driver generates a plurality of drive signals so as to eject the plurality of liquid droplets under a plurality of conditions; and the calculator calculates the ejection velocity with respect to each of the conditions.

17. The apparatus as set forth in claim 16, wherein:

each of the drive signals has a first waveform element which decompresses the pressure chamber, a second waveform element which holds a decompressed state of the pressure chamber, and a third waveform element which compress the pressure chamber; and the plurality of conditions are defined by varying a duration of the second waveform element.

18. The apparatus as set forth in claim 1, further comprising a signal corrector which corrects the drive signal based on the ejection velocity calculated by the calculator.

19. The apparatus as set forth in claim 18, wherein the drive signal includes a first drive signal which is used to calculate the ejection velocity and a second drive signal which is adjustable by the signal corrector.

20. The apparatus as set forth in claim 18, wherein:

the calculator calculates the ejection velocity with respect to each of the nozzle orifices; and the signal corrector corrects the drive signal with respect to each of the nozzle orifices.

21. The apparatus as set forth in claim 18, wherein:

the liquid election head device is provided with a plurality of nozzle rows each including more than one of the plurality of nozzle orifices;

the calculator calculates the ejection velocity with respect to each of the nozzle rows; and the signal corrector corrects the drive signal with respect to each of the nozzle rows.

22. The apparatus as set forth in claim 21, wherein nozzle orifices of the plurality of nozzle orifices forming an identical nozzle row eject an identical kind of liquid.

23. The apparatus as set forth in claim 21, wherein nozzle orifices of the plurality of nozzle orifices forming an identical nozzle row eject an identical color of ink.

24. The apparatus as set forth in claim 18, further comprising:
- a support, which supports a target member onto which the liquid drop is landed; and
- a mechanism, which reciprocally moves the liquid ejection head with respect to the target member, in a first direction and a second direction opposite to the first direction,
- wherein the signal corrector separately corrects the drive signal used in the movement of the liquid ejection head in the first direction and the drive signal used in the movement of the liquid ejection head in the second direction.

25. The apparatus as set forth in claim 18, further comprising a mechanism, which reciprocally moves the liquid ejection head in a first direction and a second direction opposite to the first direction, wherein:
- the liquid ejection head is provided with a plurality of nozzle rows each including a plurality of the nozzle orifices;
- the nozzle orifices are divided into a plurality of groups, each including nozzle orifices which are periodically selected from every n nozzles (n is an integer not less than 2) among all the nozzle orifices in nozzle rows which are periodically selected from m nozzle rows (m is an integer not less than 2) among all the nozzle orifice rows; and
- the calculator calculates the ejection velocity of the nozzle orifices belonging to one of the groups, every time when the liquid ejection head is once moved in either the first direction or the second direction.

26. The apparatus as set forth in claim 1, wherein the photo emitter includes:
- a light emitter, which emits the light beam;
- a condenser, which converges the light beam; and
- a shade, which shades a periphery of a cross section of the light beam.

27. The apparatus as set forth in claim 1, wherein the photo receiver includes:
- a photo receiving element, which receives the light beam; and
- a condenser, which converges the light beam onto the photo receiving element.

* * * * *